(12) United States Patent
Spears et al.

(10) Patent No.: US 8,930,234 B2
(45) Date of Patent: Jan. 6, 2015

(54) METHOD AND SYSTEM FOR MEASURING INDIVIDUAL PRESCIENCE WITHIN USER ASSOCIATIONS

(75) Inventors: Joseph L. Spears, Hayward, CA (US); Jeffrey D. Brandstetter, San Francisco, CA (US)

(73) Assignee: Ipar, LLC, San Francisco, CA (US)

( * ) Notice: Subject to any disclaimer, the term of this patent is extended or adjusted under 35 U.S.C. 154(b) by 905 days.

(21) Appl. No.: 13/070,548

(22) Filed: Mar. 24, 2011

(65) Prior Publication Data

US 2012/0245887 A1 Sep. 27, 2012

Related U.S. Application Data

(63) Continuation of application No. 13/069,942, filed on Mar. 23, 2011.

(51) Int. Cl.
*G06Q 30/02* (2012.01)

(52) U.S. Cl.
CPC ...................................... *G06Q 30/02* (2013.01)
USPC .......................... 705/7.29; 705/7.31; 707/748

(58) Field of Classification Search
USPC ................. 705/7.29, 7.31; 707/748
See application file for complete search history.

(56) References Cited

U.S. PATENT DOCUMENTS

| | | | |
|---|---|---|---|
| 5,664,133 A | 9/1997 | Malamud et al. | |
| 5,737,527 A | 4/1998 | Shiels et al. | |
| 5,802,361 A | 9/1998 | Wang et al. | |
| 7,136,853 B1 | 11/2006 | Kohda et al. | |
| 7,464,058 B2 | 12/2008 | Yen et al. | |
| 7,806,329 B2 | 10/2010 | Dmitriev et al. | |
| 8,140,402 B1 * | 3/2012 | Mesaros | 705/26.1 |
| 8,645,187 B1 * | 2/2014 | Harris et al. | 705/7.29 |
| 2002/0120501 A1 | 8/2002 | Bell et al. | |
| 2002/0184314 A1 | 12/2002 | Riise | |
| 2004/0267604 A1 * | 12/2004 | Gross | 705/10 |
| 2005/0131762 A1 | 6/2005 | Bharat et al. | |
| 2006/0020596 A1 | 1/2006 | Liu et al. | |
| 2006/0235723 A1 | 10/2006 | Millard | |
| 2006/0278064 A1 | 12/2006 | Lourdeaux | |
| 2007/0073596 A1 | 3/2007 | Alexander et al. | |
| 2007/0106551 A1 | 5/2007 | McGucken | |
| 2007/0156594 A1 | 7/2007 | McGucken | |

(Continued)

FOREIGN PATENT DOCUMENTS

WO 2008094616 A1 8/2008

OTHER PUBLICATIONS

Article entitled "Everyone's an Influencer: Quantifying Influence on Twitter" by Bakshy et al., dated Feb. 12, 2011.*

(Continued)

*Primary Examiner* — Mahesh Dwivedi
(74) *Attorney, Agent, or Firm* — Jones Day

(57) ABSTRACT

Systems and methods are provided for identifying an influencer from a pool of people based on past interactions with one or more items. A popularity metric is determined for a particular item, and an earliness of interaction metric is determined for a person in the pool based on an interaction with the particular item by the person. A prescience metric is calculated for the person based on the popularity metric and the earliness of interaction metric for the person, and the influencer is identified based on the prescience metric for the person and prescience metrics calculated for other people in the pool.

14 Claims, 42 Drawing Sheets

(56) References Cited

U.S. PATENT DOCUMENTS

| | | |
|---|---|---|
| 2007/0169165 A1 | 7/2007 | Crull et al. |
| 2007/0204308 A1 | 8/2007 | Nicholas et al. |
| 2007/0214179 A1 | 9/2007 | Hoang |
| 2007/0288308 A1 | 12/2007 | Chen et al. |
| 2008/0034329 A1 | 2/2008 | Posner et al. |
| 2008/0040475 A1 | 2/2008 | Bosworth et al. |
| 2008/0066099 A1 | 3/2008 | Brodersen et al. |
| 2008/0071688 A1 | 3/2008 | Corbett et al. |
| 2008/0090513 A1 | 4/2008 | Collins et al. |
| 2008/0114750 A1 | 5/2008 | Saxena et al. |
| 2008/0140506 A1* | 6/2008 | Christianson et al. .......... 705/10 |
| 2008/0201225 A1 | 8/2008 | Maharajh et al. |
| 2008/0235216 A1 | 9/2008 | Ruttenberg |
| 2009/0037355 A1 | 2/2009 | Brave et al. |
| 2009/0063254 A1* | 3/2009 | Paul et al. ................... 705/10 |
| 2009/0171748 A1* | 7/2009 | Aven et al. ................... 705/10 |
| 2009/0197681 A1 | 8/2009 | Krishnamoorthy et al. |
| 2009/0199227 A1 | 8/2009 | Kennedy |
| 2009/0217036 A1 | 8/2009 | Irwin et al. |
| 2009/0240586 A1 | 9/2009 | Ramer et al. |
| 2009/0299877 A1* | 12/2009 | Vadon ........................ 705/27 |
| 2010/0058485 A1 | 3/2010 | Gonzalez |
| 2010/0086283 A1 | 4/2010 | Ramachandran et al. |
| 2010/0094878 A1 | 4/2010 | Soroca et al. |
| 2010/0121707 A1* | 5/2010 | Goeldi ...................... 705/14.49 |
| 2010/0205628 A1 | 8/2010 | Davis et al. |
| 2010/0228631 A1* | 9/2010 | Zhang et al. ............... 705/14.66 |
| 2010/0263005 A1 | 10/2010 | White |
| 2010/0318611 A1* | 12/2010 | Curtin et al. .................. 709/206 |
| 2011/0145719 A1 | 6/2011 | Chen et al. |
| 2011/0219394 A1 | 9/2011 | Lueth et al. |
| 2011/0246574 A1 | 10/2011 | Lento et al. |
| 2011/0265113 A1 | 10/2011 | Apfel et al. |
| 2011/0289084 A1 | 11/2011 | Fisher |
| 2011/0295626 A1* | 12/2011 | Chen et al. .................. 705/7.11 |
| 2012/0089996 A1 | 4/2012 | Ramer et al. |
| 2012/0131171 A1 | 5/2012 | Samuel et al. |
| 2012/0136812 A1 | 5/2012 | Brdiczka |
| 2012/0143665 A1* | 6/2012 | Swain et al. ............... 705/14.16 |
| 2012/0209920 A1* | 8/2012 | Neystadt et al. ............. 709/205 |
| 2012/0215597 A1* | 8/2012 | Ross ........................ 705/14.1 |
| 2012/0226748 A1* | 9/2012 | Bosworth et al. ............. 709/204 |

OTHER PUBLICATIONS

Article entitled "From Obscurity to Bestseller: Examining the Impact of Oprah's Book Club Selections", by Butler et al., dated 2005.*
Article entitled "The Role of Celebrity Endorsements in Politics: Oprah, Obama, and the 2008 Democratic Primary", by Garthwaite et al., dated Aug. 2008.*
International Search Report; PCT/US2011/022865; Apr. 2011.
Written Opinion of the International Searching Authority; PCT/US2011/022865; Apr. 2011.
Written Opinion of the International Searching Authority; PCT/US2011/022871; 2012.
International Search Report; PCT/US2011/022902; Apr. 2011.
Written Opinion of the International Searching Authority; PCT/US2011/022902; Apr. 2012.
PR Newswire; Press Release; Mar. 12, 2011.
Spears, Joseph; GMANE Article, Beginner Questions on Clustering & M/R; Jul. 15, 2010.
Spears, Joseph; GMANE Article, Recommending Items for Anonymous Users; Apr. 19, 2010.
International Search Report; PCT/US2012/047520; Dec. 2012.
Written Opinion of the International Searching Authority; PCT/US2012/047520; Dec. 2012.
International Search Report; PCT/US2011/022877; Oct. 2011.
Written Opinion of the International Searching Authority; PCT/US2011/022877; Oct. 2011.

* cited by examiner

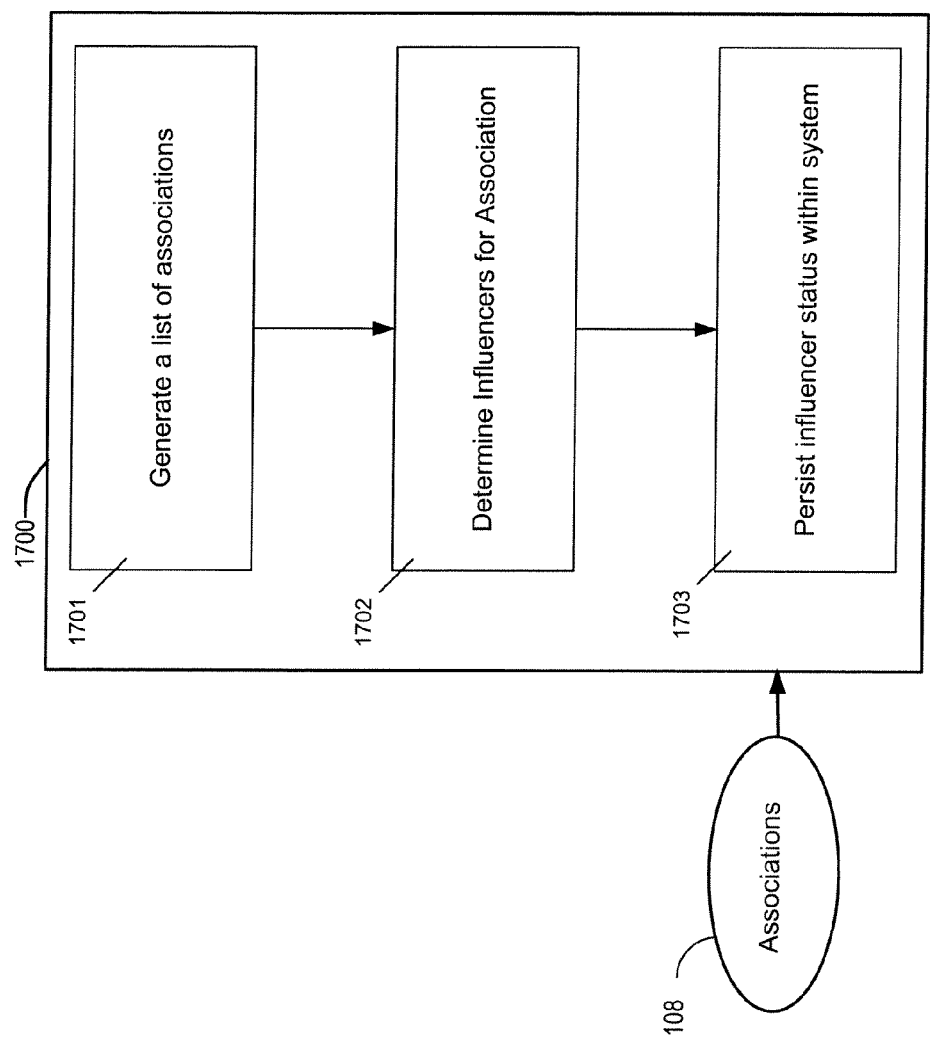

FIG. 22

Contact Point

Type: Self ▽
Method: Website ▽
Website URL: http:// ▽
Description: [        ]

☐ Show this content only to industry insiders

[Cancel] [Save]

METHOD AND SYSTEM FOR MEASURING INDIVIDUAL PRESCIENCE WITHIN USER ASSOCIATIONS

CROSS REFERENCE TO RELATED APPLICATIONS

This application is a continuation of U.S. patent application Ser. No. 13/069,942 filed on Mar. 23, 2011, entitled "Method and System for Predicting Association Item Affinities Using Second Order User Item Associations," the entirety of which is herein incorporated by reference.

TECHNICAL FIELD

The present disclosure relates generally to computer-implemented systems and methods for detection of clusters of users within larger user communities. More specifically, the disclosure relates to methods of predicting an affinity that a subset of users will have for a particular content item based on existing artifacts of users within a closed system.

BACKGROUND

Within any communication medium, there is always a trade-off between reaching a broad audience and ensuring the relevance of a message for its individual recipients within that audience. If the message is one that is relevant for a very large user community, and the user community is well defined, then the message originator can efficiently deliver the message to that community through conventionally defined and understood methods. However, when the message is relevant for only a subset of the large, well-defined user community, then delivery of an appropriate message is much more challenging and less efficient.

A real-world analogy of this concept is related to announcements at a dinner party. If an announcement is made to signal the beginning of a toast, then the message is efficient because most of the recipients of the message will find it relevant. If, on the other hand, the announcement is made that a particular vehicle's lights have been left on, then the message is considered very inefficient in that only a few recipients in the room (the driver and any potential passengers) will find the message relevant.

More generally, because of the diminished efficiency that is involved in sending limited relevance messages, limited relevance message senders may have a desire to discover the subset of users within the community that will find the message relevant. The traditional mechanisms used to discover that particular subset of users within the community are more difficult or less efficient than sending the limited-relevance message to the broader audience because the message sender must first define criteria to determine whether a message would be relevant to a potential message recipient and then the message sender must evaluate each potential message recipient against the criteria.

To continue the analogy, the message sender could potentially attempt to discover the relevant recipient of the message in a number of ways. The sender could, for example, make an announcement to the crowd that he is looking for the owner of a particular car. Of course, this message adds complexity to the conversation because this new message is no more efficient than the "headlight" message, and, in fact, adds another communication round trip to the message sequence. Another approach that the sender might take is to question each member of the party individually. When defining the criteria used to evaluate the message relevance, the message sender may ask individual guests if they arrived in the particular model of car whose headlights are on. Then the message sender could ask each person attending the party what model of car they arrived in, and based on that result, may decide to inform that particular attendee that their headlights should be checked. From an efficiency perspective, the number of recipients of an unrelated message would be, on average, ½*(number of guests), which is more efficient in one measure (the number of people receiving the message), but the time to deliver the message would be, on average, (time to deliver message)*½*(number of guests), as compared to (time to deliver message) when broadcast once to the room of guests. From a time perspective, this approach is very inefficient.

What is needed, in the general case, is a way to identify (1) the subgroup for which the message is relevant, and (2) incentives for relaying messages to intended recipients. This identification can be performed by analysis of (a) associative artifacts not necessarily related to the conversation at hand, but which can be collected from the surrounding environment, (b) any communications history that might already be available, or (c) some combination of both (a) and (b). These artifacts can then be synthesized in a way that allows the message sender to change the communications medium or message in order to ensure that the message delivery is efficient.

SUMMARY

In accordance with the teachings provided herein, systems and methods are provided for identifying an influencer from a pool of people based on past interactions with one or more items. A popularity metric may be determined for a particular item, and an earliness of interaction metric may be determined for a person in the pool based on an interaction with the particular item by the person. A prescience metric may be calculated for the person based on the popularity metric and the earliness of interaction metric for the person, and the influencer may be identified based on the prescience metric for the person and prescience metrics calculated for other people in the pool.

As another example, a system for identifying an influencer from a pool of people based on past interactions with one or more items may include one or more data processors and a computer-readable medium encoded with instructions for commanding the one or more data processors to execute a method. In the method, a popularity metric may be determined for a particular item, and an earliness of interaction metric may be determined for a person in the pool based on an interaction with the particular item by the person. A prescience metric may be calculated for the person based on the popularity metric and the earliness of interaction metric for the person, and the influencer may be identified based on the prescience metric for the person and prescience metrics calculated for other people in the pool.

As a further example, a computer-readable medium may be encoded with instructions for commanding one or more data processors to execute a method for identifying an influencer from a pool of people based on past interactions with one or more items. In the method, a popularity metric may be determined for a particular item, and an earliness of interaction metric may be determined for a person in the pool based on an interaction with the particular item by the person. A prescience metric may be calculated for the person based on the popularity metric and the earliness of interaction metric for the person, and the influencer may be identified based on the prescience metric for the person and prescience metrics calculated for other people in the pool.

BRIEF DESCRIPTION OF THE DRAWINGS

FIG. 17 is a block diagram depicting the granting of special status within the system to an influencer.

FIG. 22 shows exemplary interface with another example associations report.

FIG. 30B shows an exemplary interface.

FIG. 33 shows an exemplary interface for use by an industry insider.

FIG. 36 shows an exemplary permissions interface enabling a first user of the system to assign permissions for a second user of the system to perform a broad set of transactional and promotion activities for a particular content item.

FIG. 38 shows an exemplary permissions interface enabling a first user of the system to assign exclusive permissions for a second user of the system to perform a broad set of transactional and promotion activities for a particular content item.

DETAILED DESCRIPTION

Figure 1:
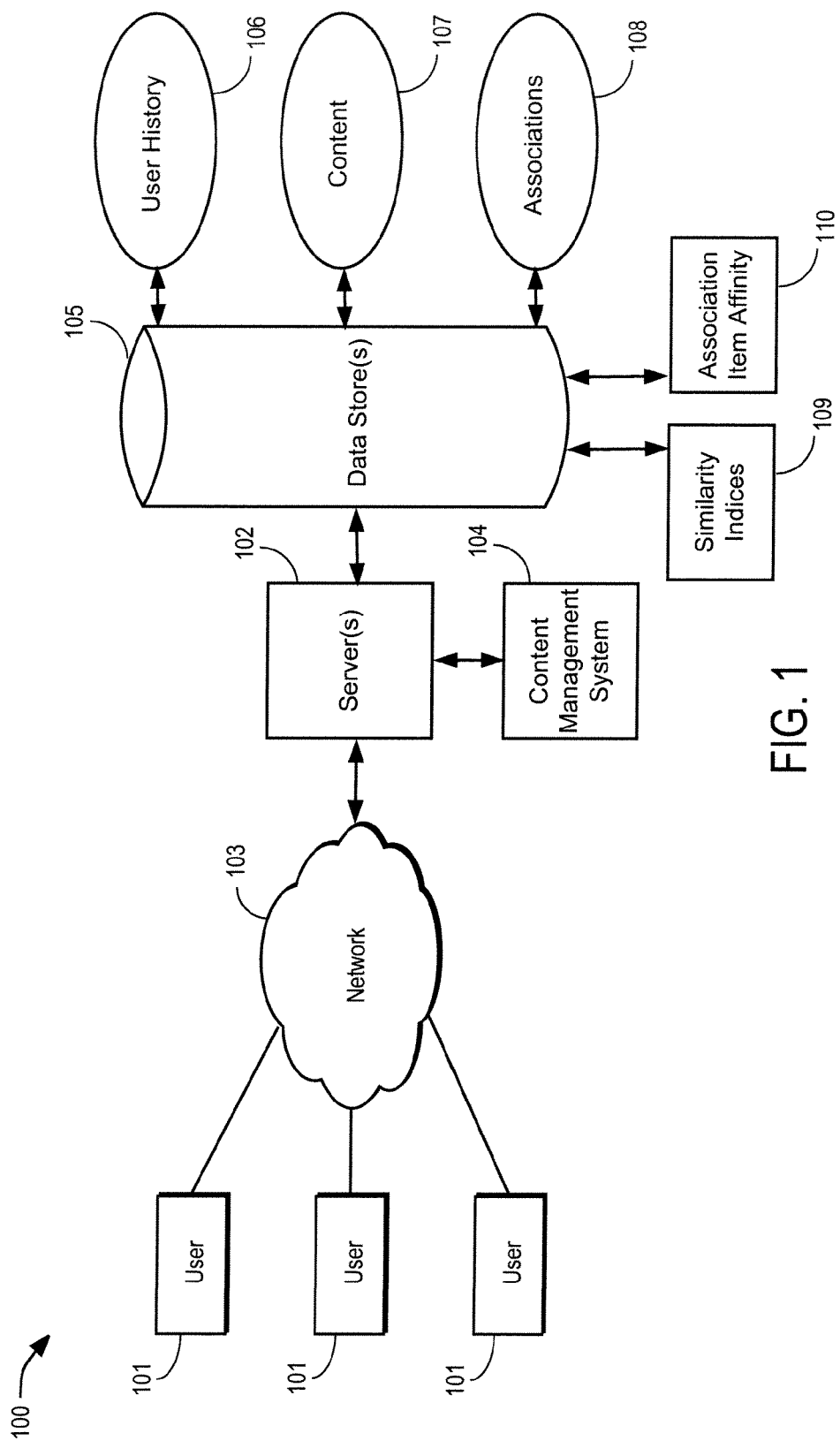
FIG. 1 is a block diagram of an example computer-implemented environment for allowing a user to interact with a content management system.

FIG. 1 is a block diagram of an example computer-implemented environment for allowing a user to interact with a content management system. System 100 can be a computer-implemented environment wherein one more users 101 can interact with a content management system 104 hosted on one or more servers 102 through a network 103. The content management system 104 contains software operations or routines for solving a content management problem. The users 101 can interact with the content management system in a number of ways, such as over one or more networks 103. One or more servers 102 accessible through the network(s) 102 can host the content management system 104. It should be understood that the content management system 104 could also be provided on a stand-alone computer for access by a user.

The content management system 104 can be an integrated web-based analysis tool that provides users flexibility and functionality for performing content management determinations and analysis or can be a wholly automated system. One or more data stores 105 can store the data to be analyzed by the content management system 104 as well any intermediate or final data generated by the content management system 104. Data store(s) 105 can store raw or derived content-related data (e.g., metadata) for use in determining actions to be taken (e.g., based on particular analysis or constraints). Examples of data store(s) 105 can include relational database management systems (RDBMS), or a multi-dimensional database (MDDB), such as an Online Analytical Processing (OLAP) database, etc.

Data stored in the data store(s) 105 includes a user history 106 that can contain historical interactions of users 101 of the content management system 104. User history 106 data can include monetary transaction histories, ratings, reviews, tags of content managed by the content management system 104. Data stored in the data store(s) 105 includes content 107. Content 107 can include objects such as films, music, new articles, services provided by a service provider, descriptions of physical products, a calendar of upcoming events, or other users of the content management system for use in finding new social relationships such as friends or dating. Data stored in the data store(s) also includes associations 108 of users. Associations 108 would be artifacts collected by the content management system 104 regarding information identified by users 101 that other users 101 might share or for which a group of users 101 have identified as a factor that sets them apart from other users 101. Examples of associations 108 could include items that a user has stated that they like, the name of an employer, the name of a school that they attended, their favorite music, book or artist, professional, religious or social organization to which they are members. Data stored in the data store(s) 105 includes one or more similarity indices 109 that have been synthesized from the user history 106, content 107 or associations 108.

In some implementations, an association item affinity 110 can be stored in the data store(s) 105. The association item affinity 110 represents associations 108 whose users 101 have an affinity with content 107 due to the user history 106. In some implementations, the association item affinity 110 can be generated as new user history 106 and associations 108 are created in the system. In some implementations, the association item affinity 110 can be generated dynamically in response to some event in the system.

In some implementations, the system can be used to identify a subgroup of users for whom a message would be relevant. For example, the message may be an advertisement denoting a sale for a content item in a particular genre. One method of directing the message would be to send the message to all users who have expressly stated that they have an interest in the particular genre. However, such a method may not account for all users who would be interested in receiving such a message. For example, some users who would be interested may not have taken the time to express an interest in the particular genre. To better account for all users who would be interested in receiving the message, analysis may be performed based on associative artifacts not necessarily related to the direct item-to-association relationships at hand, but which can be derived indirectly from user associations and user-to-item interactions.

Such implementations are useful in the case where a user having some responsibility for an item (e.g., a seller) wishes to identify more users with a predisposition for the item (e.g., buyers). Because of privacy concerns, sharing a list of individual "potential buyers" may not be an ideal system function, but alternatively, the seller could be given a list of associations that "potential buyers" share. The seller could then identify an appropriate way to expose their item to the "potential buyers" (e.g., by identifying websites to advertise on, by contacting a spokesperson for their group, etc.).

Such implementations can infer, based on the data gathered or other artifacts present, relevant relationships between the buyer's item and user associations. To state an example of such an inference: A seller may be selling visors for motorcycle helmets. The visors may have been previously advertised in a magazine read by people who like "chopper" style motorcycles. If users of the system who like "racing" style motorcycles also like "chopper" style motorcycles (even if no person who ever liked a "racing" style motorcycle has yet bought the visor), then the system may identify the fans of "racing" style motorcycles as "potential buyers." The seller of the visor may then decide to sponsor a motorcycle racer in order to promote their product.

Figure 2:
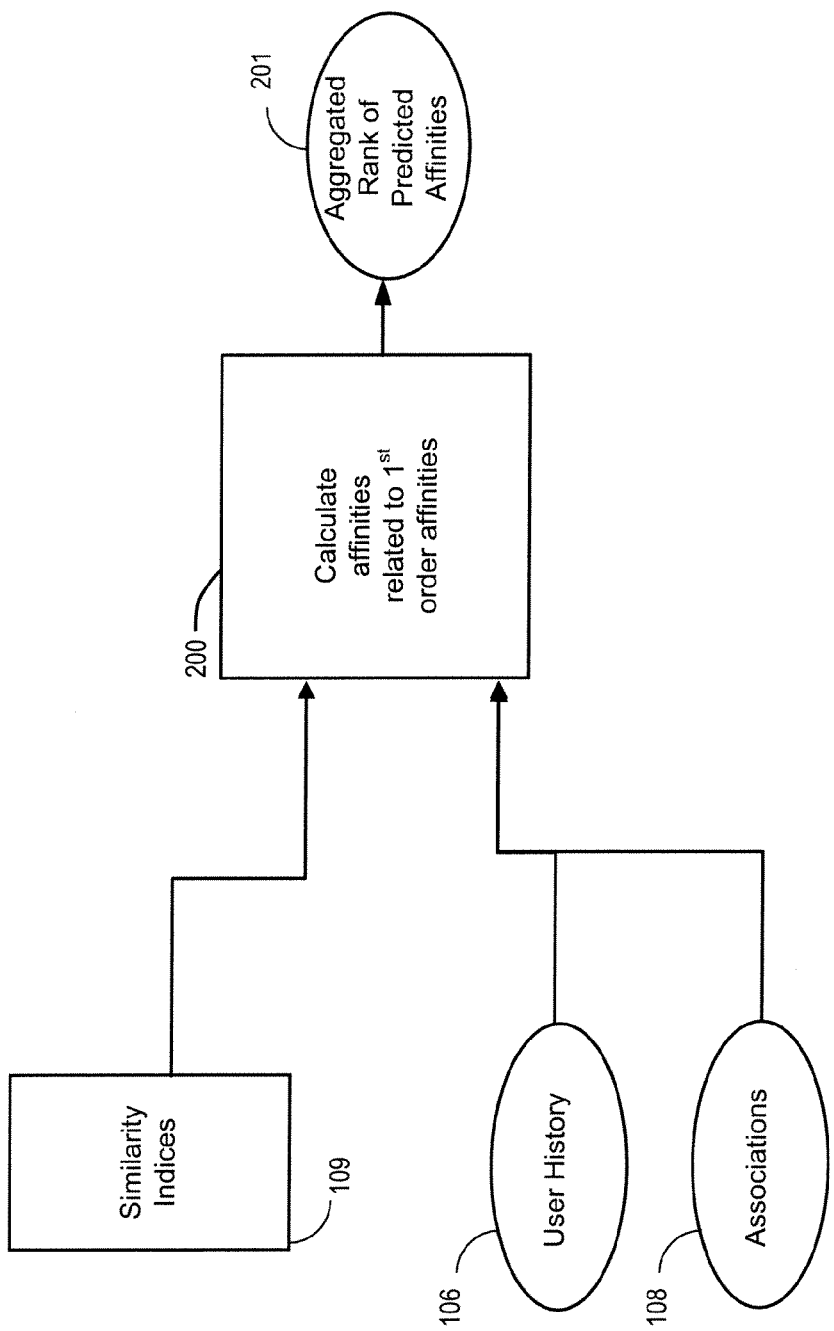
FIG. 2 is a block diagram depicting the high level process of Prediction of Association Item Affinities Using 2nd Order User Item Associations.

FIG. 2 is a block diagram depicting the high level process of Prediction of Association Item Affinities Using 2nd Order User Item Associations. The process of creating first and second order affinities are further explained in detail in later parts of this document, but this figure provides a general overview of the process from a macro level.

Using user history 106 and associations 108, an association, item or user first level affinity can be determined. This first level affinity can then be compared to existing similarity indices 109 to calculate affinities that are related to the first order affinities 200 previously calculated. These affinities can then be used to create an aggregated rank of predicted affinities 201 which represents the second order calculation of either item to association affinities or association to item affinities. The affinity between an item and an association is a measurement of how likely or strongly a particular item will be preferred or liked by members of a particular association. A rank of item affinities for an association is a list (which may or may not be ordered) of items that are have a higher probability of being preferred by a particular association. For example, a rank of item affinities for a group of users who are "motorcyclists" could be "motorcycle", "motorcycle helmet", "motorcycle jacket", and "bandana". Such a rank of item affinities could also be represented as a tuple with a matching numeric value that describes the level of affinity between the item and the particular group. Using our previous example, the list may be expressed as ("motorcycle", "0.87"), ("motorcycle helmet", "0.78"), ("motorcycle jacket", "0.63"), and ("bandana", "0.51").

A rank of association affinities for an item is a list (which may or may not be ordered) of associations that have a higher probability of preferring a particular item. For example, a rank of association affinities for a "motorcycle" could be "motorcyclist", "mechanic", and "college student". Such a ranking could also be represented as a tuple with a matching numeric value that describes the level of affinity between the item and the particular group.

An aggregated rank is the combination of ranks that may have been derived in multiple ways (e.g., different algorithms) or from multiple sources in order to extrapolate an affinity based on both direct and indirect information. In our motorcycle example, we may have direct information that motorcyclists would have a high affinity for motorcycles and motorcycle helmets, but could infer from our system that there is an affinity for bandanas because other groups that buy motorcycle helmets also buy bandanas. This would be important in the case of a person communicating a message about a new type of bandana who was not previously aware that there was an affinity between motorcyclists and their product due to the lack of direct evidence.

Figure 3:
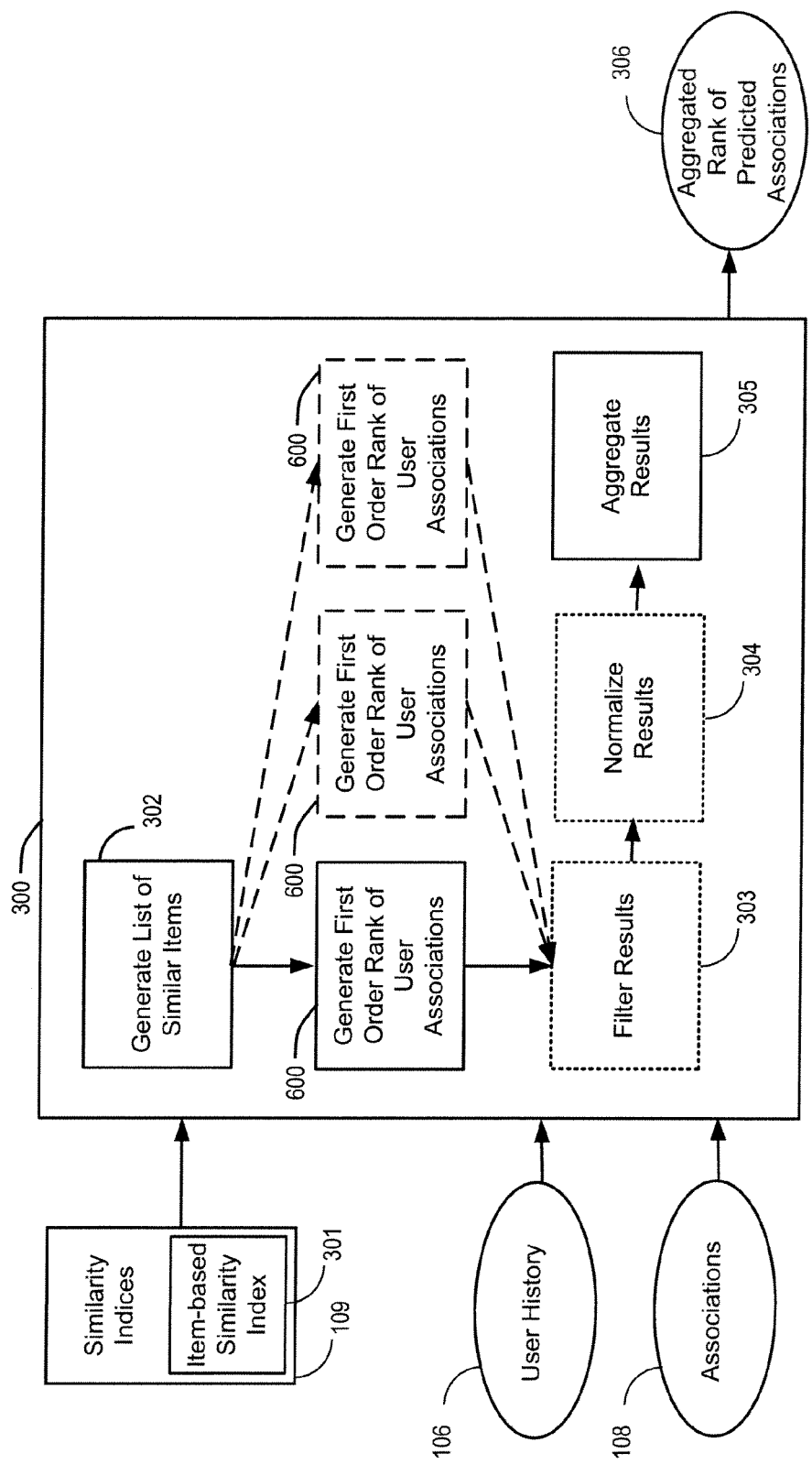
FIG. 3 is a block diagram depicting the generation of a second order rank of user associations that have a predicted affinity to a particular item.

FIG. 3 is a block diagram depicting the generation of a second order rank of user associations that have a predicted affinity to a particular item. More specifically, FIG. 3 depicts this process as generating the rank of user associations based upon item-to-item similarities. The similarity indices 109 may contain an item-based similarity index 301 that has been computed using a subsystem, such as one of the subsystems described at 700 in FIG. 7 or at 800 in FIG. 8. The item-based similarity index 301 is used to generate list of similar items 302 that is based upon how closely related a candidate item correlates to a particular item.

An item-centered query is a set of instructions that is used by a data retrieval system to extract data from the system that is related to a particular item. Some implementations of an item-centered query could be a Standard Query Language (SQL) query such as "select purchase.user from purchase_history purchase where purchase.item='motorcycle';". Other implementations of an item-centered query could be based on other query language implementations (e.g., HQL, XPath, RDQL). Other implementations of an item-centered query could be computer programming instructions that use an alternate approach (such as a scan of raw data) where the results of the search are a list or rank of users that have interacted with a particular item.

For each similar item in the list of similar items 302, an item-centered query is dynamically created and will define the search parameters used as inputs to process(es) that generate first order rank(s) of user associations 600. Each first order rank of user associations 600 may be calculated by querying or searching the user history 106 and associations 108.

Based on the generated list of similar items 302 (e.g., an array of values identifying the similarity of an item identified in a row of the array with each of a number of items identified in columns of the array), one or more first order rank of user associations 600 (e.g., as described in FIG. 6) are generated. Each individual first order rank of user associations 600 can be calculated serially or in parallel.

In some implementations, results may be filtered at 303. In some implementations, results may be normalized at 304. In implementations where filtering 303 or normalization 304 occur, such steps 303, 304 may be performed serially or in parallel. Results may be filtered 303 removing results that do not meet a particular threshold or are otherwise insignificant in the overall aggregated rank of predicted associations 306.

Result normalization 304 may change the values in the rank of user associations to account for a relative weight of the association in the overall aggregated rank of predicted associations 306. In implementations containing a result normalization step 304, result normalization can use a normalization factor that is computed by generating a matrix of items to associations where the values of each cell in the matrix contain the affinity score of an item and corresponding association. In these implementations, the resulting generation of first order rank of users associations may generate a table such as this:

|  | Similarity | Assoc1 (e.g., motorcyclists) | Assoc2 (e.g., mechanics) | Assoc3 (e.g., college students) |
| --- | --- | --- | --- | --- |
| Item1 (e.g., motorcycle) | .67 | .89 | .32 | 0 |
| Item2 (e.g., motorcycle helmet) | .62 | .55 | 0 | .84 |

In these implementations, the similarity scores of all of the items (e.g., the similarity scores for the motorcycle and the motorcycle helmet) can be used to compute a normalization constant:

$$\text{Resulting normalization constant} = \text{sqrt}(\text{item1\_similarity}^2 + \text{item2\_similarity}^2)$$

$$= \text{sqrt}(.67^2 + .62^2)$$

$$= \text{sqrt}(.45 + .38)$$

$$= .91$$

This normalization constant can then be used to recalculate the associative values of the table such that the following values are generated:

|  | Assoc1 | Assoc2 | Assoc3 |
| --- | --- | --- | --- |
| Item1 | .89* (.67/.91) = .66 | .32* (.67/.91) = .23 | 0 |
| Item2 | .55* (.62/.91) = .37 | 0 | .84* (.62/.91) = .57 |

Whether the results are filtered and normalized, results can be aggregated in the aggregate results step 305. The aggregate results 305 step will generate a single set of association affinity values where each association's affinity value is computed from the collective values of the affinity values of the same associations for related items. This can be done in a number of different ways.

In some implementations, the affinity values for each association can be based from the association's commonality (e.g., the number of data samples that appear within the queried data). This is accomplished by storing a value related to the number of times an association has occurred as having an affinity with similar items. The vector representation of such an aggregate result would be:

|  | Similarity | Assoc1 | Assoc2 | Assoc3 |
| --- | --- | --- | --- | --- |
| Item1 | .67 | .89 | .32 | 0 |
| Item2 | .62 | .55 | 0 | .84 |
| # of times appearing |  | 2 | 1 | 1 |

Because Assoc1 appears two times in the data sample, Assoc1 has a commonality of '2', while Assoc2 and Assoc3, having appeared one time in the sample data, would have a commonality value of '1'. In these implementations, the association Assoc1 has the highest affinity and would be ranked higher than the associations Assoc2 and Assoc3.

In some implementations, association affinity values can be the sum of the affinity values for each association. This is accomplished by storing a value that is generated by adding the sum of all of the association affinity values together and storing this value as the predicted affinity for this association. The vector representation of such an aggregate result would be:

|       | Similarity | Assoc1 | Assoc2 | Assoc3 |
|-------|------------|--------|--------|--------|
| Item1 | .67        | .89    | .32    | 0      |
| Item2 | .62        | .55    | 0      | .84    |
| Sum of values |    | 1.44   | .32    | .84    |

When these implementations also include results that have undergone normalization in the normalize results 304 step, the affinity values can be computed in the same way:

|       | Assoc1 | Assoc2 | Assoc3 |
|-------|--------|--------|--------|
| Item1 | .89 * (.67/.91) = .66 | .32* (.67/.91) = .23 | 0 |
| Item2 | .55 * (.62/.91) = .37 | 0 | .84* (.62/.91) = .57 |
| Sum of values | 1.03 | .23 | .57 |

In yet another implementation, the association affinity values can be the sum of the affinity values for each association when multiplied by the item similarity score. The vector representation of such an aggregate result would be:

|       | Similarity | Assoc1 | Assoc2 | Assoc3 |
|-------|------------|--------|--------|--------|
| Item1 | .67 | .89 | .32 | 0 |
| Item2 | .62 | .55 | 0 | .84 |
| Sum of weighted values | | (.67 * .89) + (.62 *.55) = .82 | (.67 * .32) = .21 | (.62 * .84) = .52 |

In some implementations, more precise measurements of predicted affinity may be desired. In such scenarios, an additional prediction measurement can be made. Such measurements include Slope One, Single Value Decomposition, and K-Nearest Neighbors.

In some implementations, the aggregate results 305 step will (also) normalize the resulting affinity values in order to create a continuous range of values [0 . . . 1]. The aggregated rank of predicted associations 306 can be stored in persistent storage such as in an RDBMS, in a disk storage system, in random access memory ("RAM") or other storage.

Figure 4:
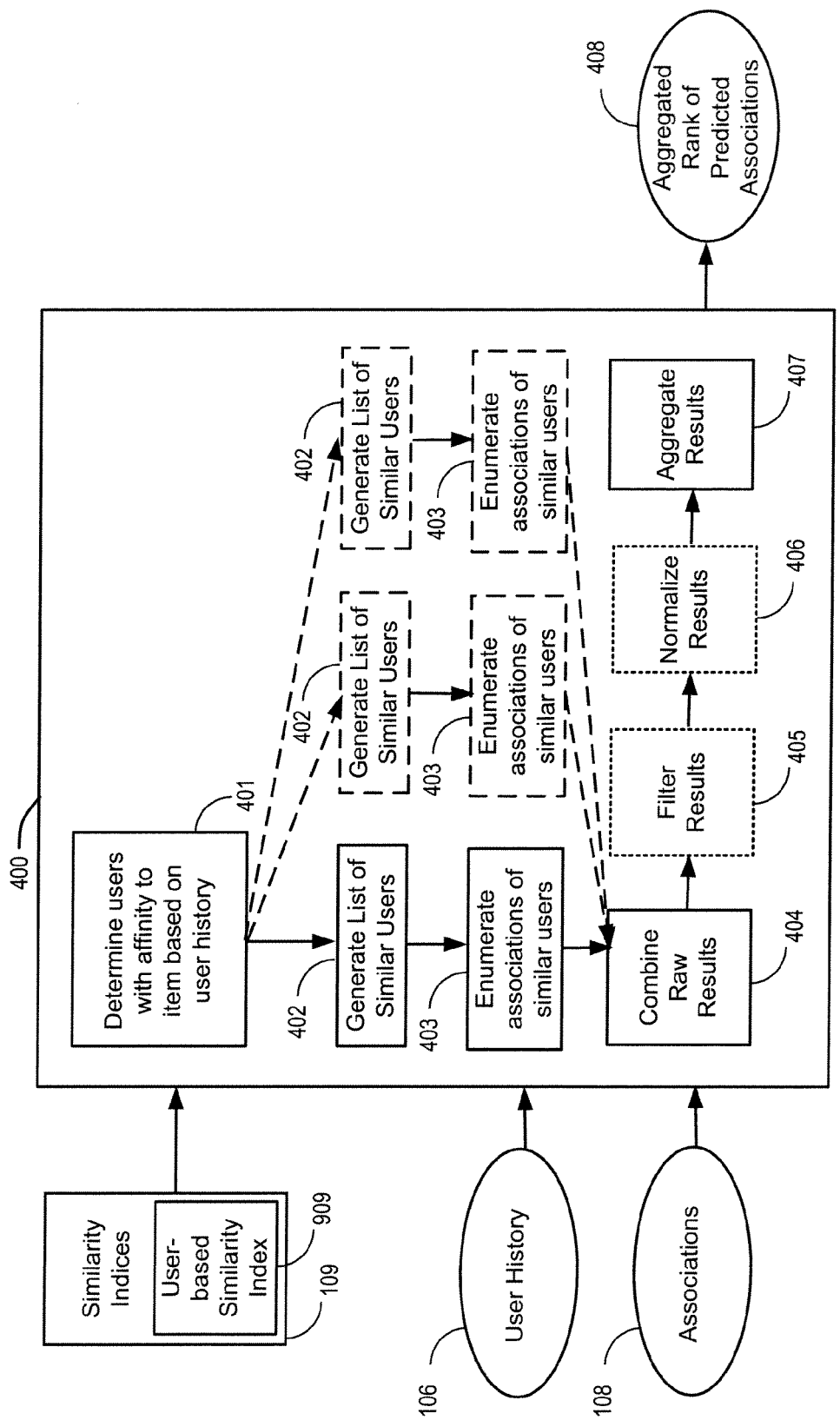
FIG. 4 is a block diagram depicting the generation of a second order rank of user associations that have a predicted affinity to a particular item.

FIG. 4 is a block diagram depicting the generation of a second order rank of user associations that have a predicted affinity to a particular item. More specifically, FIG. 4 depicts this process as generating the rank of user associations based upon similarities between users of the system. The similarity indices 109 may contain a user-based similarity index 909, such as one that has been computed using subsystem 900 in FIG. 9.

Subsystem 400 determines users with affinity to an item based on user history 401. This determination may be based on user interactions that have been stored in the user history 106 that are related to the item. In some implementations, the list of user interactions can contain an affinity score (such as a rating, price paid, number of times watched, etc.). In some implementations, the list of user interactions does not contain a score and the inclusion of a user in the list assumes that the score is constant (e.g., 1).

Once the system processes the user history to generate a list of users with affinity to an item 401, each individual user within the list serves as the original user (e.g., reference user or source user) in the computation of a distinct list of similar users 402. Each individual list of similar users 402 (i.e., list of users with similarity to an original user) can be calculated serially or in parallel. For each list of similar users 402, a list of the associations of the similar users is generated 403. The list of associations 403 of similar users can be constructed either serially or in parallel.

In some implementations, the user similarity score from the list of similar users can be propagated directly as a ranking or affinity value for each association. For instance, if the following list of similar users is constructed:

|       | Similarity to original user |
|-------|------------------------------|
| User1 | .85 |
| User2 | .79 |

And the each user has the following association memberships:

|       | Association1 | Association2 | Association3 | Association4 |
|-------|--------------|--------------|--------------|--------------|
| User1 | Member | Member | | |
| User2 | | | Member | Member |

Then the affinity of the associations to the content would be as follows:

|       | Association1 | Association2 | Association3 | Association4 |
|-------|--------------|--------------|--------------|--------------|
| User1 | .85 | .85 | | |
| User2 | | | .79 | .79 |

In some implementations, the affinity for the original user based on the user history from which the list of similar users is generated will have a discrete value. In these instances, the affinity can be propagated through the enumerated associations of similar users. For instance, if the original user has an affinity of 0.92 with the item, the following similarities to original user can be calculated:

|       | Similarity to original user | Predicted Affinity |
|-------|------------------------------|--------------------|
| User1 | .85 | .92 * .85 = .78 |
| User2 | .79 | .92 * .79 = .73 |

In the case of these implementations, the predicted affinity value can be carried forward as the value for the predicted affinity in each association:

|       | Association1 | Association2 | Association3 | Association4 |
|-------|--------------|--------------|--------------|--------------|
| User1 | .78 | .78 | | |
| User2 | | | .73 | .73 |

In some implementations, the predicted affinity can be determined using other methods that employ broad data sampling techniques. Such techniques include K-Nearest Neighbors, Single Value Decomposition, or Slope One.

When the system generates each list of associations of similar users 403, each is combined 404. In some implementations, each list of associations of similar users 403 will contain associations that are globally unique. In this case, the list of associations of similar users 403 can be merged into a single list of results.

In some implementations, it is possible for each list of associations of similar users to contain associations that are common to one or more of the lists. In these cases, the non-unique elements may be combined into the single list of results as a single entry.

In some implementations, merging the non-unique elements with a binary value (such as "member" or "1") can be done simply by discarding the duplicate entries.

Merging of non-unique elements with a discrete affinity value can be done in a number of ways. In some implementations, the average affinity score can be calculated and a unique association with the affinity score of the average can be added into the single list of results. In some implementations, the maximum or minimum affinity score can be selected as the association's affinity score as it is added to the single list of results. In some implementations, the similarity score of the user can be used to weight the affinity score so that the calculated affinity score in the single list of results can be more heavily tied to the results that are due to more similar users. One example of this is as follows:

this process as generating the rank of user associations based upon similarities between different associations. The similarity indices 109 may contain an association-based similarity index 1009 that has been computed using a system such as subsystem 1000 in FIG. 10.

Figure 6:
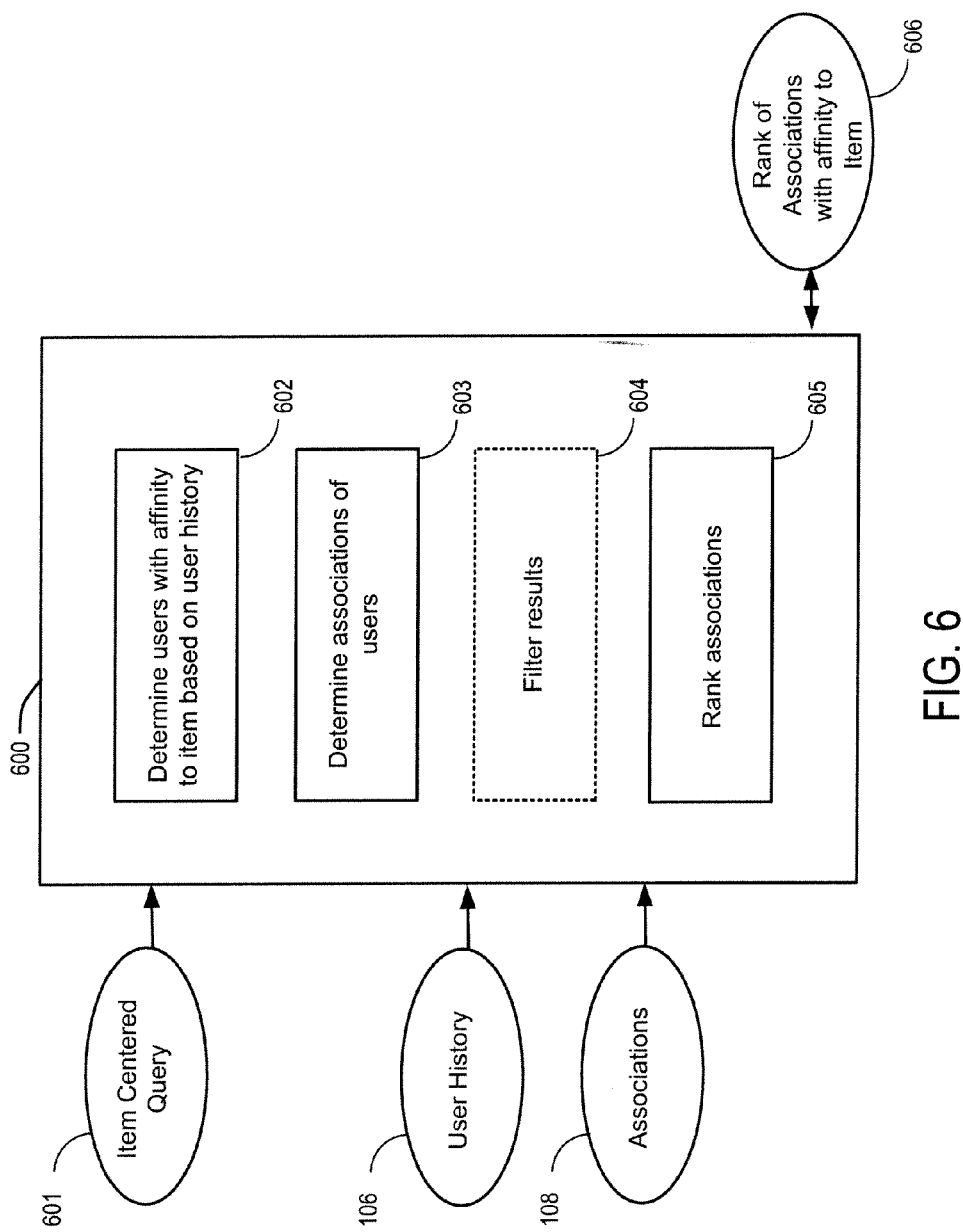
FIG. 6 is a block diagram depicting the generation of a first order rank of user associations that have an affinity to a particular item.

Subsystem 500 determines the first order rank of user associations 600 by using a method such as the one described in FIG. 6. Each unique association in the first order rank of user associations 600 is an original association (e.g., source association or reference association). A list of similar associations 502 (i.e., a list of associations having similarity to the original association) is generated for each original association by finding associations similar to the original association in the association based similarity index 1009. Each list of similar associations 502 can be calculated serially or in parallel.

Upon generation of the lists of similar associations at 502, the raw results can then be combined in a manner similar to that discussed in connection with FIG. 4. Once the raw results are combined, the combined results can be filtered, normalized, or aggregated in a manner similar to that discussed in connection with FIG. 3, where the raw results are filtered to remove results not meeting a particular criteria, normalized to a continuous range of values (i.e., a range from 0 to 1) or aggregated to ensure that duplicate results are combined and weighted to a value representing the weight of the individual results.

|  | User Similarity | User Affinity | Association 1 Affinity | Association2 Affinity | Association3 Affinity | Association4 Affinity |
|---|---|---|---|---|---|---|
| User1 | .85 | .78 | .78 | .78 | | |
| User2 | .79 | .73 | | | .73 | .73 |
| User3 | .88 | .62 | .62 | .62 | .62 | |
| Weighted affinity | | | =(.78 * .85) + (.62 * .88) = 1.02 | =(.78 * .85) + (.62 * .88) = 1.02 | =(.73 * .79) + (.62 * .88) = 1.12 | .73 * .79 = .58 |

In some implementations, more precise measurements of predicted affinity need to be calculated so that an additional prediction measurement can be made. Such measurements include Slope One, Single Value Decomposition, and K-Nearest Neighbors.

The raw results can then be filtered, normalized, and aggregated in a manner similar to that discussed in connection with FIG. 3, where the raw results are filtered to remove results not meeting a particular criteria, normalized to a continuous range of values (i.e., a range from 0 to 1) and aggregated to ensure that duplicate results are combined and weighted to a value representing the weight of the individual results.

Scale of the affinity may sometimes be of greater priority than precision of the affinity. Thus, some implementations may favor determining a large association with moderate affinity (e.g., likeliness of buying a filmmaker's films) for targeting purposes, rather than small associations that have a high affinity. By way of example, if there are 1000 members in a first association that has a 0.43 affinity to a particular film but 2000 members in a second association that has a 0.25 affinity to the second film, the filmmaker may prefer to target members of the second association rather than the first association, because although the likeliness of any individual user in the second association being willing to purchase their film may be slightly more than one-half as likely when compared to the first association, there are exactly twice as many users who can be exposed to the film).

Figure 5:
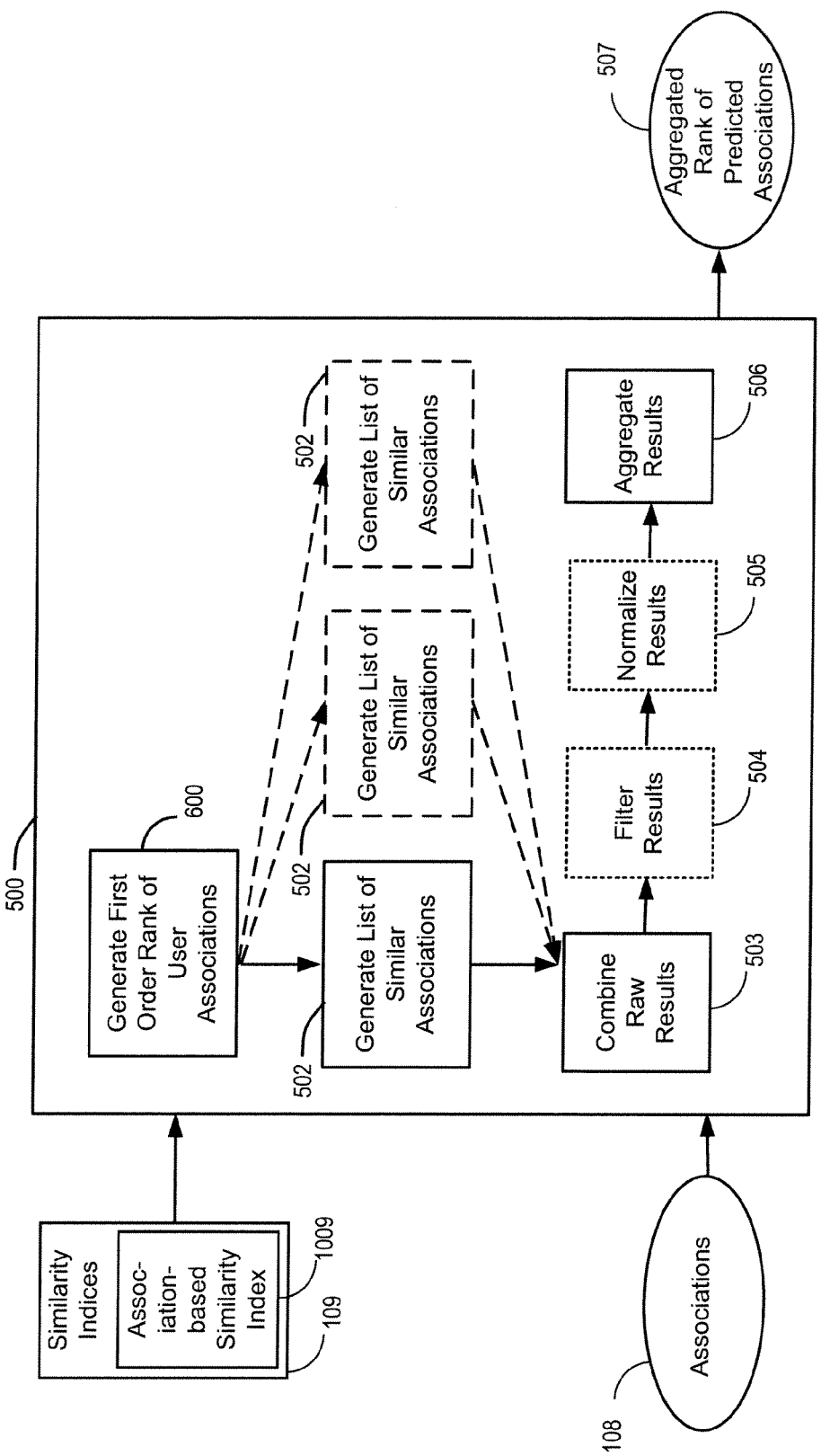
FIG. 5 is a block diagram depicting the generation of a second order rank of user associations that have a predicted affinity to a particular item.

FIG. 5 is a block diagram depicting the generation of a second order rank of user associations that have a predicted affinity to a particular item. More specifically, FIG. 5 depicts FIG. 6 is a block diagram depicting the generation of a first order rank of user associations that have an affinity to a particular item. The user history 106 and associations 108 are synthesized in accordance with the item-centered query 601 by following the steps in system 600. The output from the system 600 is a rank of associations with affinity to the item 606. In some implementations, the rank of associations with affinity to the item 606 will be an ordered list of user associations. In some implementations, the rank of associations with affinity to the item 606 will contain a score that depicts the relative affinity that each association has with the particular item.

The item-centered query 601 is provided to the system 600. Users who have an affinity to the item (e.g., have rated, reviewed, bookmarked, "liked", or purchased, etc.) will be retrieved from the user history 106 in step 602. Once the list of users has been generated, we can determine the associations of users 603 by retrieving the list of associations 108 for the users. In some implementations, the system can optionally filter the results 603 by reducing the records in either the user history 106 or associations 108 that are retrieved.

As each resulting association is stored in the results, a value corresponding to each user's affinity from the user history 106 will be added to the affinity score of the association's affinity score for the item. The system will then rank the associations 605 so that the rank of associations with affinity to the item produces 606.

In some implementations, this rank of associations would be calculated as the frequency of a particular association being tied to a user with affinity to the content and would result in a table similar to the following:

|  | Association1 | Association2 | Association3 | Association4 |
|---|---|---|---|---|
| Affinity | 5 | 3 | 2 | 1 |

In some implementations, the rank could be a normalized representation of the data. In these implementations, and given the above table, the following normalization constant can be derived:

$$\begin{aligned}\text{norm} &= \text{sqrt}(5\wedge 2 + 3\wedge 2 + 2\wedge 2 + 1\wedge 2) \\ &= \text{sqrt}(25 + 9 + 4 + 1) \\ &= \text{sqrt}(39) \\ &= 6.24\end{aligned}$$

The values of the table are then divided by the normalization function to generate the following normalized table:

|  | Association1 | Asscoiation2 | Association3 | Association4 |
|---|---|---|---|---|
| Affinity | 5/6.24 = .80 | 3/6.24 = .48 | 2 = .32 | 1 = .16 |

FIGS. 7-10 depict methods to generate various similarity indices. Such processes may be used in systems, such as those described above. For example, the item similarity index, shown in FIG. 7 may be utilized in the method of FIG. 3, as shown at 301, to produce a list of items that are similar to a selected item (i.e., an original item) based upon the similarity of terms used to describe each item. As another example, the item similarity index shown in FIG. 8, may be utilized in the method of FIG. 3, as shown at 301, in order to produce a list of items that are similar to a selected item based upon the similarity of the preference for the items as assigned by users of the system. As another example, the user similarity index shown in FIG. 9, may be utilized in the method of FIG. 4, as shown at 909, in order to produce a list of users that are similar to a selected user (i.e., an original user) based upon the recording of user preferences for items stored in the system. As another example, the association similarity index shown in FIG. 10, may be utilized in the method of FIG. 5, as shown in 1009, in order to produce a list of associations that are similar to a selected association (i.e., original association) based upon the association membership of users recorded in the system.

Figure 7:
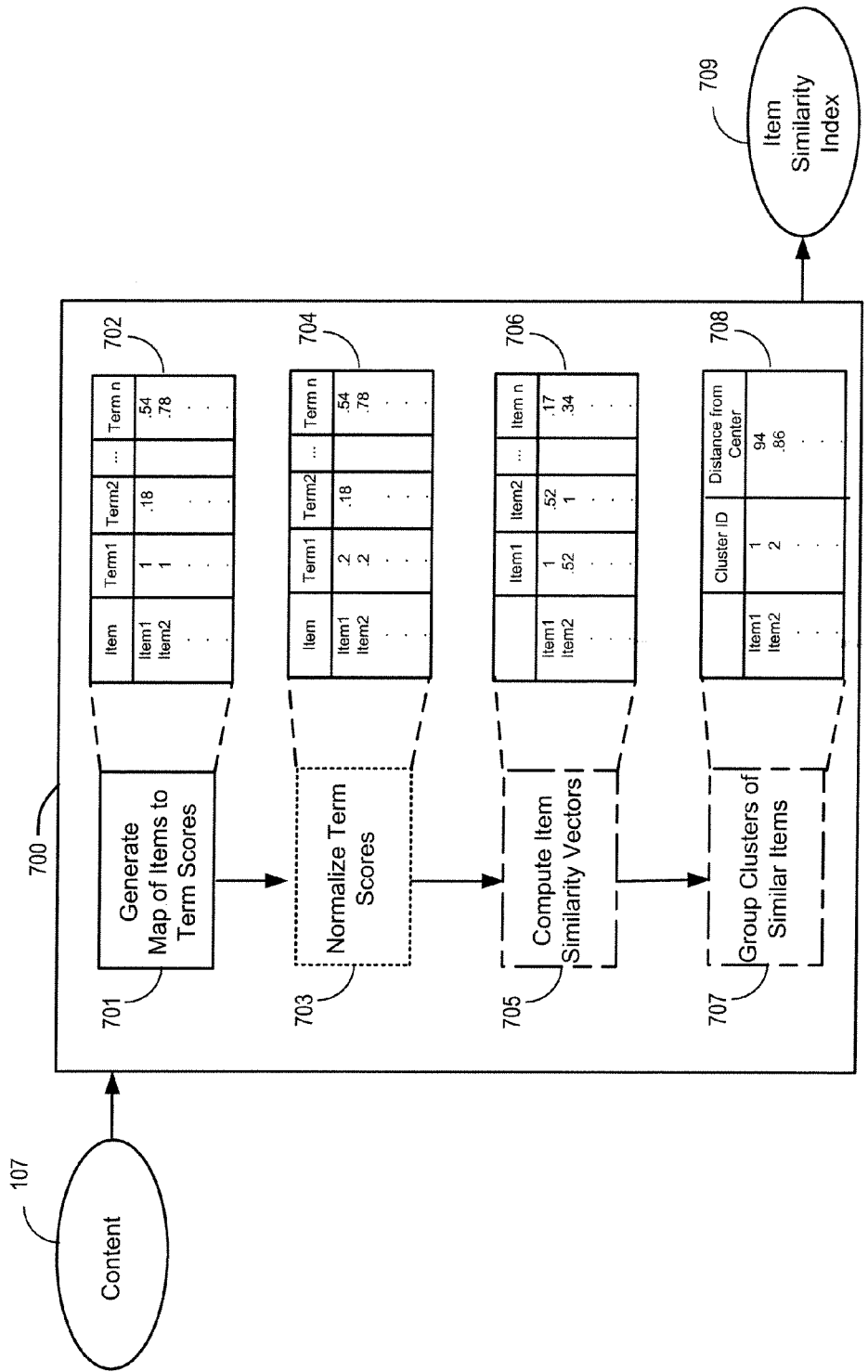
FIG. 7 is a block diagram depicting the generation of an item similarity index through calculation and comparison of terms and term frequencies within the content ontology.

FIG. 7 is a block diagram depicting the generation of an item similarity index through calculation and comparison of terms and term frequencies within the content ontology. The content 107 is synthesized by following the steps in system 700. The content 107 is used as an input to generate a map of item to term scores 701 whose format may be a 2D array of values 702 with unique items of the content management system forming one axis and unique terms within the corpus of item taxonomy forming the other axis. The map of item to term scores 701 may contain a numeric value signifying the affinity between the unique item and the unique term.

In some implementations, the values in the map of item to term scores 701 will be the tf–idf scores for a plurality of the fields used to describe each item. The tf–idf (Term Frequency–Inverse Data Frequency) can be computed as follows:

tf–idf=(term frequency/terms in document)*log(# of items in corpus/# items containing term in corpus)

For example, assume that content 107 contains 500 films. A particular item could have been written and directed by and starring the very talented Joe Spears. In addition, there were 14 other total film credits for this film. Furthermore, assume that the corpus of content has a total of 7000 film credits. In addition, in this example, Joe Spears has film credits in 5 of the films in the corpus.

In this example, the tf–idf score of the term "Joe Spears" could be computed as follows:

tf–idf=(3/17)*log(7000/5)=(0.176)*log (1400)=0.176*3.146=0.554

In some implementations, the content 107 can be represented in a formal taxonomy. Such implementations allow the map of item to term scores 701 to be optionally recalculated to normalize term scores 703. In these implementations, the normalized term scores 703 format may be a 2D array of values 704 with unique items of the content management system forming one axis and unique terms within the corpus of item taxonomy forming the other axis. The normalized term scores 703 may contain a numeric value signifying the normalized affinity between the unique item and the unique term. The normalized affinity is computed by transforming the value generated in the map of item to term scores 701 by a transformation function that is appropriate for the specific taxonomy (and field within the taxonomy). For example, if the item in the content 107 has fields "genre" and "artist", the specific taxonomy may support the supposition that a similar "artist" is 3 times as important as a similar "genre" (or conversely, that a similar "genre" is ⅓ as important as a similar "artist").

Applying the example normalization function to a map of item to term scores 701 of:

|  | Artist1 | Artist2 | Artist3 | Genre1 |
|---|---|---|---|---|
| Item1 | .45 | .37 | .19 | .66 | yields the following normalized term scores 703:

|  | Artist1 | Artist2 | Artist3 | Genre1 |
|---|---|---|---|---|
| Item1 | .45 | .37 | .19 | .22 |

Data in the map of items to term scores 701 and normalized term scores 703 can be generated dynamically every time or can be regenerated based on some event such as a refresh schedule, data update or a signal from the system. Data in the map of items to term scores 701 and normalized term scores 703 can be stored in volatile memory or in a non-volatile storage device such as a hard-drive or RDBMS.

Once the term score values have been generated (whether from the map of item term scores 701 or the normalized term scores 703), the system can then compute item similarity vectors 705. The format of the item similarity vectors 705 can be a 2D array of values 706 with each unique item forming both the X and Y axes. The values of the 2D array of values 706 represents a similarity between one item and another as can be determined through many different mathematical formulas.

For example, the item similarity vectors 705 between the items may calculated by using a Euclidean distance calculation. A Euclidean distance for two items would be computed as follows:

Assuming the following table of item term scores:

|  | Term1 (e.g., light) | Term2 (e.g., farm) | Term3 (e.g., candle) | Term4 (e.g., book) |
|---|---|---|---|---|
| Item1 | .41 | .27 | — | .68 |
| Item2 | .46 | — | .46 | .46 |

The similarity between Item1 and Item2 would be the sum of the product of all terms where both items share a result:

$$similarity = (.41 * .46) + (.68 * .46)$$

$$= (.19) + (.31)$$

$$= .5$$

The 2D array of values would then look like this:

|  | Item1 | Item2 |
|---|---|---|
| Item1 | 1 | .5 |
| Item2 | .5 | 1 |

In some implementations, other distance calculation processes may also be implemented as a similarity calculation. For example, the item similarity vectors 905 can be a Pearson Correlation, Spearman Correlation, Cosine Similarity, Jaccard Coefficient, Tanimoto Coefficient or Uncentered Cosine Similarity.

Data in the item similarity vectors 705 can be generated dynamically every time or can be regenerated based on some event such as a refresh schedule, data update or a signal from the system. Data in the item similarity vectors 705 can be stored in volatile memory or may be stored in a non-volatile storage device such as a hard-drive or RDBMS.

Alternatively, group clusters of similar items 707 can be generated instead of or alongside the item similarity vectors 705. The format of the group clusters of similar items can be a cluster table 708 that contains at least one row for each item. In these example implementations, each row in the cluster table 708 can have a field for the item represented by the row, the ID of a cluster to which that item belongs and the distance that the item has from the center of the cluster. In some implementations, the cluster table 708 will have only one row per item and in other implementations, the cluster table 708 can have multiple rows for items. The latter case would signify that a item can maintain association with more than one cluster. The group clusters of similar items 707 can be generated through different mathematical formulas.

For example, the group clusters of similar items may be generated by using a K-means clustering algorithm. K-means clusters can be computed as follows:
Given an initial set of randomly generated centroid points,
  repeat the following steps until the membership of items within a cluster no longer changes and the centroid points no longer change:
    Assignment Step: Assign each item to a cluster represented by the centroid point with the closest Euclidean distance to it.
    Update Step Calculate the new centroid point based on the mean position of all items within the cluster.

In some implementations, other clustering algorithms may also generate the group clusters of similar items 707. For example, the group clusters of similar items 707 can be derived by using the variations of the K-means algorithm such as the Expectation-Maximization algorithm, K-means++, or Fuzzy k-means algorithm. This group clusters of similar items 707 can also be derived by using other algorithms such as Fuzzy C-means algorithm, QT clustering algorithm, Locality-sensitive hashing, Mean Shift Clustering algorithm and the Canopy Clustering Algorithm.

In some implementations, a K-nearest neighbor algorithm can be used to dynamically create clusters relative to the individual items as a way to generate group clusters of similar items 707.

Figure 8:
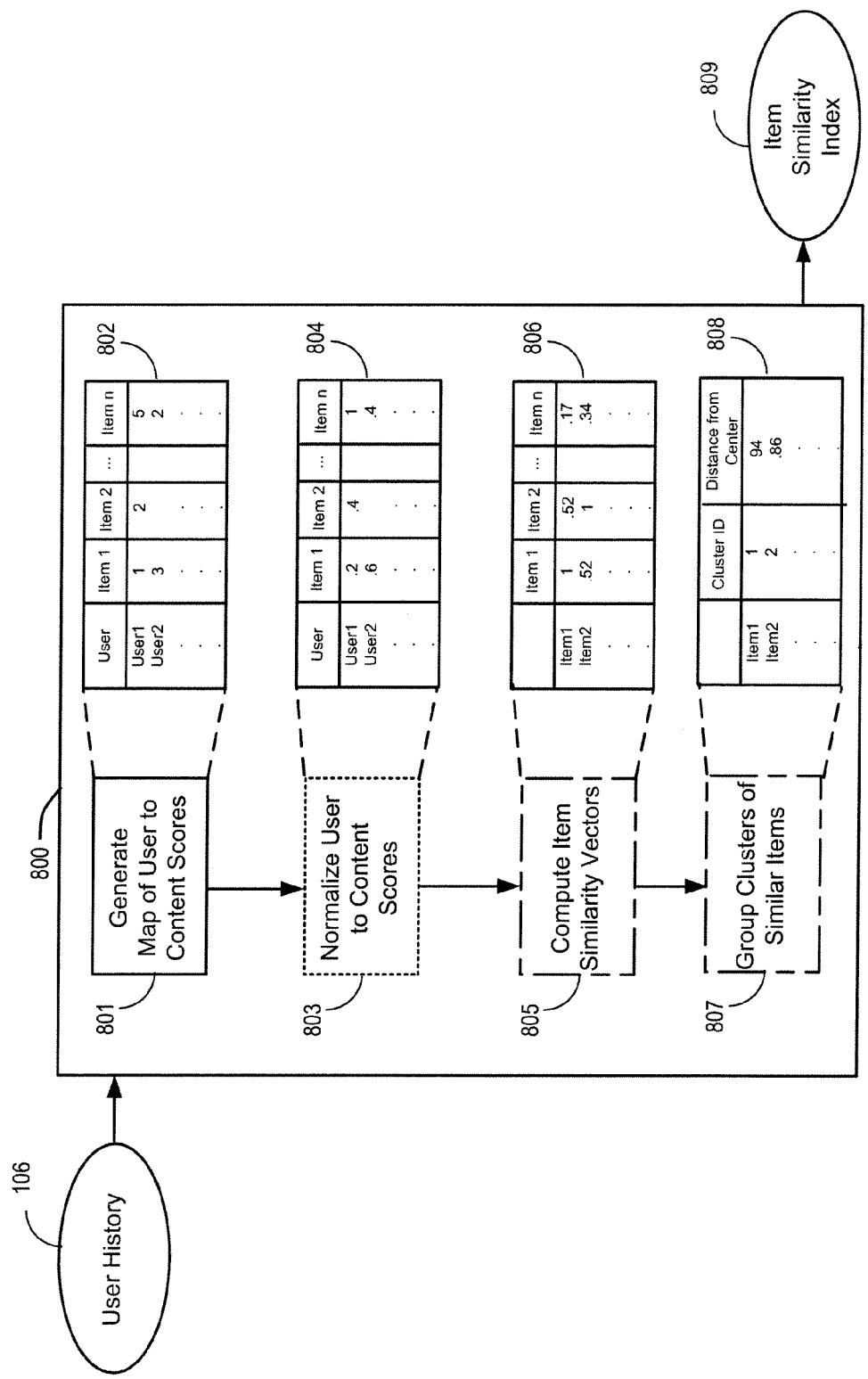
FIG. 8 is a block diagram depicting the generation of a item similarity index through synthesis of user history.

FIG. 8 is a block diagram depicting the generation of a item similarity index through synthesis of user history. The user history 106 is synthesized by following the steps in system 800. The user history 106 is used as an input to generate a map of user scores 801 whose format may be a 2D array of values 902 with unique users of the content management system forming one axis and unique items of the content management system forming the other axis. The map of user scores 801 may contain a numeric value signifying the affinity between the unique user and the unique item. This value could be a metric such as number of times viewed, price paid, number of tags, rating, number of references to content, etc. If there is no measurable affinity between a particular item and a particular user, the value can be left empty.

The map of user scores 801 may also be binary values such as 0/1 representing a true/false relationship between a particular user and a particular item. Data in the map of user scores 801 can be generated dynamically every time or can be regenerated based on some event such as a refresh schedule, data update or a signal from the system. Data in the map of user scores 801 can be stored in volatile memory or may be stored in a non-volatile storage device such as a hard-drive or RDBMS. Values in the map of user scores 801 can be generated based on all data available in the system or from partial data based on some sort of a filter. These filters may include user history during a certain period, the top or bottom set of users or items in the system or from a random sampling.

Optionally, the map of user scores 801 can further be synthesized to contain normalized user to content scores 803. The format of the user to content scores 803 may be a 2D array of values 804 with unique users of the content management system forming one axis and unique items of the content management system forming the other axis. The normalized user to content scores 803 may contain a numeric value with a range between 0 and 1 that is synthesized by applying a mathematical function to the scores stored in the map of user scores 801. One such normalization function is to compute the normalization value for each row in the following manner:

normalization value=square root((value in column 1)^2+(value in column 2)^2+ ... (value in column $n$)^2)

Once the normalization value is calculated, each value in the row is divided by the normalization value. For example, take the following table:

| Row A | 3 | 2 | 4 | 5 |
|---|---|---|---|---|
| Row B | 3 | 4 | 3 | 3 |

For Row A, the normalization value=sqrt(3^2+2^2+4^2+5^2)=sqrt(9+4+16+25)=sqrt(54)=7.348

For Row B, the normalization value=sqrt($3^2+4^2+3^2+3^2$)=sqrt(9+16+9+9)=sqrt(43)=6.557

Dividing the values in each row by the row's normalization value results in the following normalized table

| Row A | .41 | .27 | .54 | .68 |
|---|---|---|---|---|
| Row B | .46 | .61 | .46 | .46 |

Data in the normalized user to content scores 803 can be generated dynamically every time or can be regenerated based on some event such as a refresh schedule, data update or a signal from the system. Data in the normalized user to content scores 803 can be stored in volatile memory or may be stored in a non-volatile storage device such as a hard-drive or RDBMS.

Once the user content score values have been generated (whether from the map of user scores 801 or the normalized user scores 803) the system can then compute item similarity vectors 805. This process is similar to the process described in the computation of item similarity vectors 705 of FIG. 7. For example, instead of the X-axis of the similarity matrix being a set of terms, the X-axis will be the user content score values.

As with FIG. 7, at step 707, item similarities using user content score values can be clustered using similar means.

Figure 9:
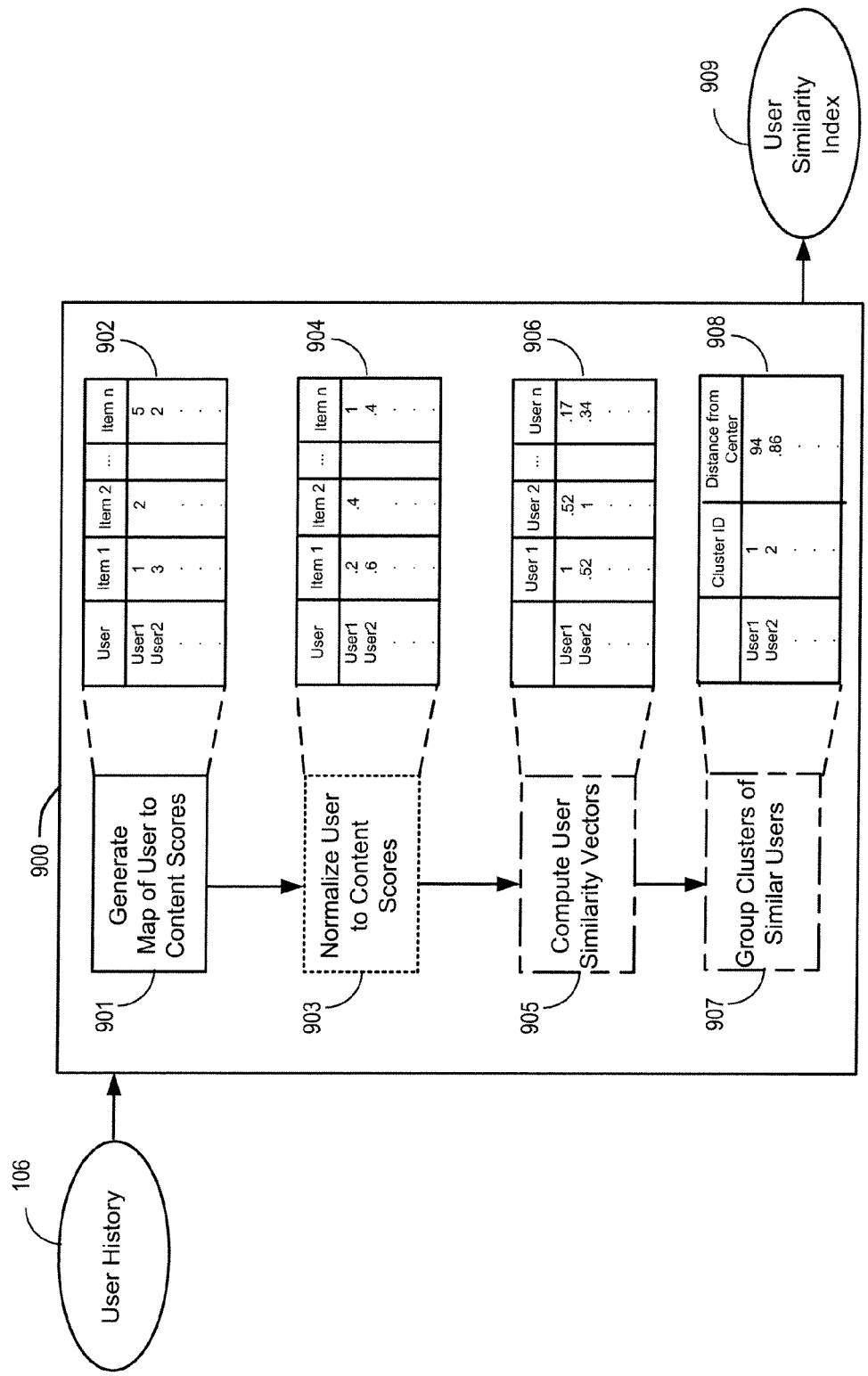
FIG. 9 is a block diagram depicting the generation of a user similarity index through synthesis of user history.

FIG. 9 is a block diagram depicting the generation of a user similarity index through synthesis of user history. The user history 106 is synthesized by following the steps in system 900. The user history 106 is used as an input to generate a map of user scores 901 whose format may be a 2D array of values 902 with unique users of the content management system forming one axis and unique items of the content management system forming the other axis. The map of user scores 901 may contain a numeric value signifying the affinity between the unique user and the unique item. This value could be a metric such as number of times viewed, price paid, number of tags, rating, number of references to content, etc. If there is no measurable affinity between a particular item and a particular user, the value can be left empty.

The map of user scores 901 may also be binary values such as 0/1 representing a true/false relationship between a particular user and a particular item. Data in the map of user scores 901 can be generated dynamically every time or can be regenerated based on some event such as a refresh schedule, data update or a signal from the system. Data in the map of user scores 901 can be stored in volatile memory or in a non-volatile storage device such as a hard-drive or RDBMS. Values in the map of user scores 901 can be generated based from all data available in the system or from partial data based on some sort of a filter. These filters may include user history during a certain period, the top or bottom set of users or items in the system or from a random sampling.

Optionally, the map of user scores 901 can further be synthesized to contain normalized user to content scores 903. The format of the user to content scores 903 may be a 2D array of values 904 with unique users of the content management system forming one axis and unique items of the content management system forming the other axis. The normalized user to content scores 903 may contain a numeric value with a range between 0 and 1 that is synthesized by applying a mathematical function to the scores stored in the map of user scores 901. One such normalization function is to compute the normalization value for each row in the following manner:

normalization value=square root((value in column 1)$^2$+(value in column 2)$^2$+ . . . (value in column $n$)$^2$)

Once the normalization value is calculated, each value in the row is divided by the normalization value. For example, take the following table:

| Row A | 3 | 2 | 4 | 5 |
|---|---|---|---|---|
| Row B | 3 | 4 | 3 | 3 |

For Row A, the normalization value=sqrt($3^2+2^2+4^2+5^2$)=sqrt(9+4+16+25)=sqrt(54)=7.348

For Row B, the normalization value=sqrt($3^2+4^2+3^2+3^2$)=sqrt(9+16+9+9)=sqrt(43)=6.557

Dividing the values in each row by the row's normalization value results in the following normalized table

| Row A | .41 | .27 | .54 | .68 |
|---|---|---|---|---|
| Row B | .46 | .61 | .46 | .46 |

Data in the normalized user to content scores 903 can be generated dynamically every time or can be regenerated based on some event such as a refresh schedule, data update or a signal from the system. Data in the normalized user to content scores 903 can be stored in volatile memory or may be stored in a non-volatile storage device such as a hard-drive or RDBMS.

Once the user content score values have been generated (whether from the map of user scores 901 or the normalized user to content scores 903) the system can then compute user similarity vectors 905. The format of the user similarity vectors 905 can be a 2D array of values 906 with each unique user forming both the X and Y axis. The values of the 2D array of values 906 represents a similarity between one user and another as can be determined through many different mathematical formulas.

For example, the user similarity vectors 905 between the users may calculated by using a Euclidean distance calculation. A Euclidean distance for two users may be computed as follows:

Assuming the following table of user preference values:

|  | Item1 | Item2 | Item3 | Item4 |
|---|---|---|---|---|
| User 1 | .41 | .27 | — | .68 |
| User 2 | .46 | — | .46 | .46 | the similarity between User 1 and User 2 would be the sum of the product of all items where both users share a result:

$$similarity = (.41 * .46) + (.68 * .46)$$
$$= (.19) + (.31)$$
$$= .5$$

The 2D array of values would then look like this:

|  | User1 | User2 |
|---|---|---|
| User1 | 1 | .5 |
| User2 | .5 | 1 |

In some implementations, other distance calculation processes may also be implemented as a similarity calculation.

For example, the user similarity vectors 905 can be a Pearson Correlation, Spearman Correlation, Cosine Similarity, Jaccard Coefficient, Tanimoto Coefficient or Uncentered Cosine Similarity.

Data in the user similarity vectors 905 can be generated dynamically every time or can be regenerated based on some event such as a refresh schedule, data update or a signal from the system. Data in the user similarity vectors 905 can be stored in volatile memory or may be stored in a non-volatile storage device such as a hard-drive or RDBMS.

Alternatively, group clusters of similar users 907 can be generated instead of or alongside the user similarity vectors 905. The format of the group clusters of similar users can be a cluster table 908 that contains at least one row for each user. In these example implementations, each row in the cluster table 908 can have a field for the user represented by the row, the ID of a cluster to which that user belongs and the distance that the user has from the center of the cluster. In some implementations, the cluster table 908 will have only one row per user and in other implementations, the cluster table 908 can have multiple rows for users. The latter case would signify that a user can maintain association with more than one cluster. The group clusters of similar users 907 can be generated through many different mathematical formulas.

For example, the group clusters of similar users may be generated by using a K-means clustering algorithm. K-means clusters can be computed as follows:

Given an initial set of randomly generated centroid points, repeat the following steps until the membership of users within a cluster no longer changes and the centroid points no longer change:

Assignment Step Assign each user to a cluster represented by the centroid point with the closest Euclidean distance to it.

Update Step Calculate the new centroid point based on the mean position of all users within the cluster.

In some implementations, other clustering algorithms may also generate the group clusters of similar users 907. For example, the group clusters of similar users 907 can be derived by using the variations of the K-means algorithm such as the Expectation-Maximization algorithm, K-means++, or Fuzzy K-means algorithm. This group clusters of similar users 907 can also be derived by using other algorithms such as Fuzzy C-means algorithm, QT clustering algorithm, Locality-sensitive hashing, Mean Shift Clustering algorithm and the Canopy Clustering Algorithm.

In some implementations, a K-nearest neighbor algorithm can be used to dynamically create clusters relative to the individual users as a way to generate group clusters of similar users 907.

Figure 10:
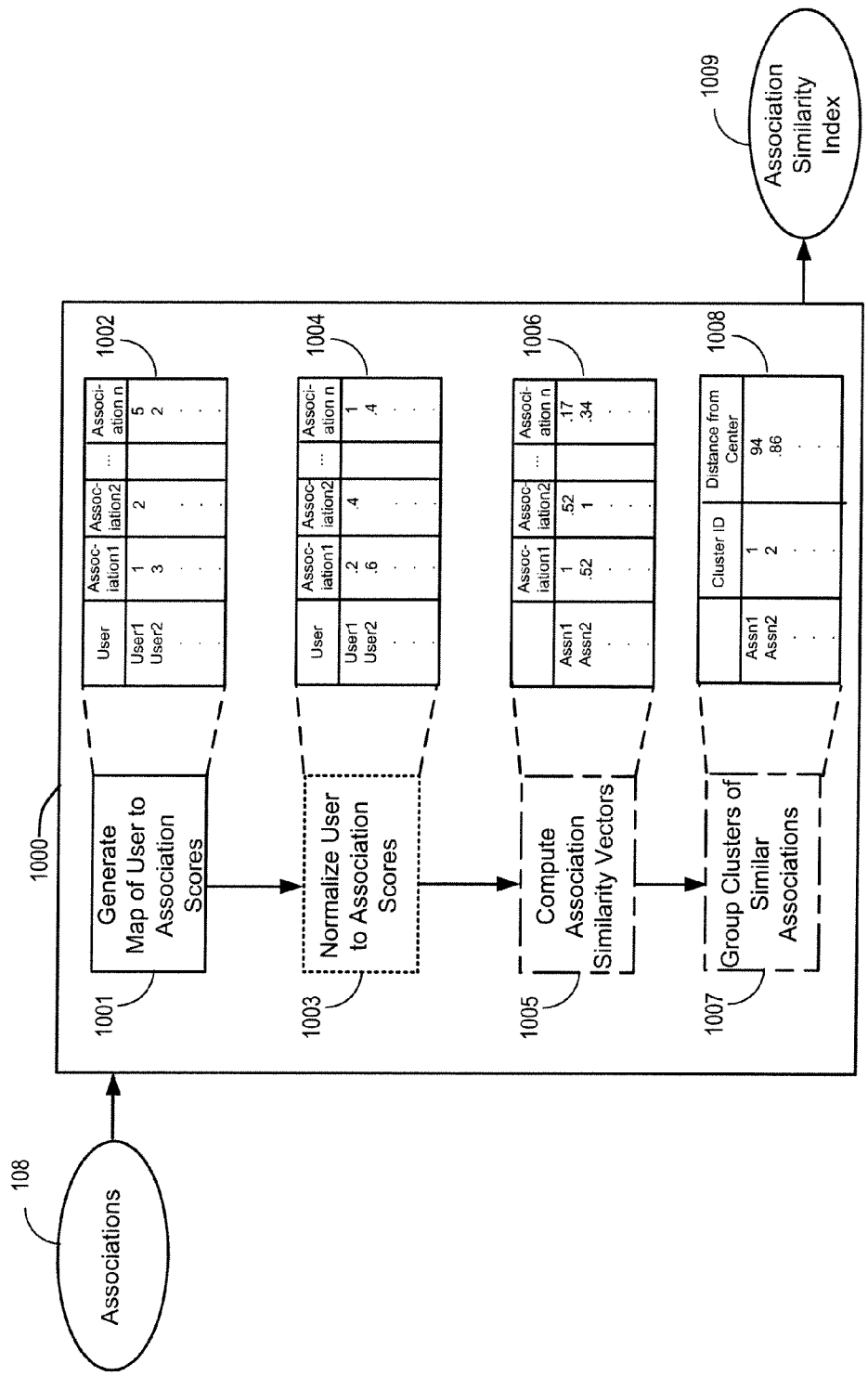
FIG. 10 is a block diagram depicting the generation of an association similarity index through synthesis of association memberships.

FIG. 10 is a block diagram depicting the generation of an association similarity index through synthesis of association memberships. The associations 108 are synthesized by following the steps in system 1000. The associations 108 are used as an input to generate a map of user association scores 1001 whose format may be a 2D array of values 1002 with unique users of the content management system forming one axis and unique associations of the content management system forming the other axis. The map of user association scores 1001 may contain a numeric value signifying the affinity between the unique user and the unique association. This value could be a metric such as the amount of time that a user has been a member of the association, frequency with which the user performs actions related to an association, rank or hierarchical relationship inside of an association, etc. If there is no measurable affinity between a particular association and a particular user, the value can be left empty.

The map of user association scores 1001 may also be binary values such as 0/1 representing a true/false relationship between a particular user and a particular association. Data in the map of user association scores 1001 can be generated dynamically every time or can be regenerated based on some event such as a refresh schedule, data update or a signal from the system. Data in the map of user association scores 1001 can be stored in volatile memory or may be stored in a non-volatile storage device such as a hard-drive or RDBMS. Values in the map of user association scores 1001 can be generated based from all data available in the system or from partial data based on some sort of a filter. These filters may include user history during a certain period, the top or bottom set of users or associations in the system or from a random sampling.

Optionally and in a means similar to the process described in FIGS. 7-9, the map of user association scores 1001 can further be synthesized to contain normalized user to association scores 1003. The format of the user to association scores 1003 may be a 2D array of values 1004 with unique users of the content management system forming one axis and unique associations of the content management system forming the other axis.

Once the user association score values have been generated (whether from the map of user association scores 1001 or the normalized user association scores 1003) the system can then compute association similarity vectors 1005. This process is similar to the process described in the computation of item similarity vectors 705 of FIG. 7 and in the computation of user similarity vectors 905 of FIG. 9. For example, instead of the X-axis of the similarity matrix being a set of terms and the Y-axis being a set of items (as described in FIG. 7, 705), the X-axis will be the users of the content management system and the Y-axis will be the associations of the content management system.

As with FIG. 7, at step 707, and FIG. 9 at step 907, association similarities using user association score values can be clustered using similar means.

Figure 11:
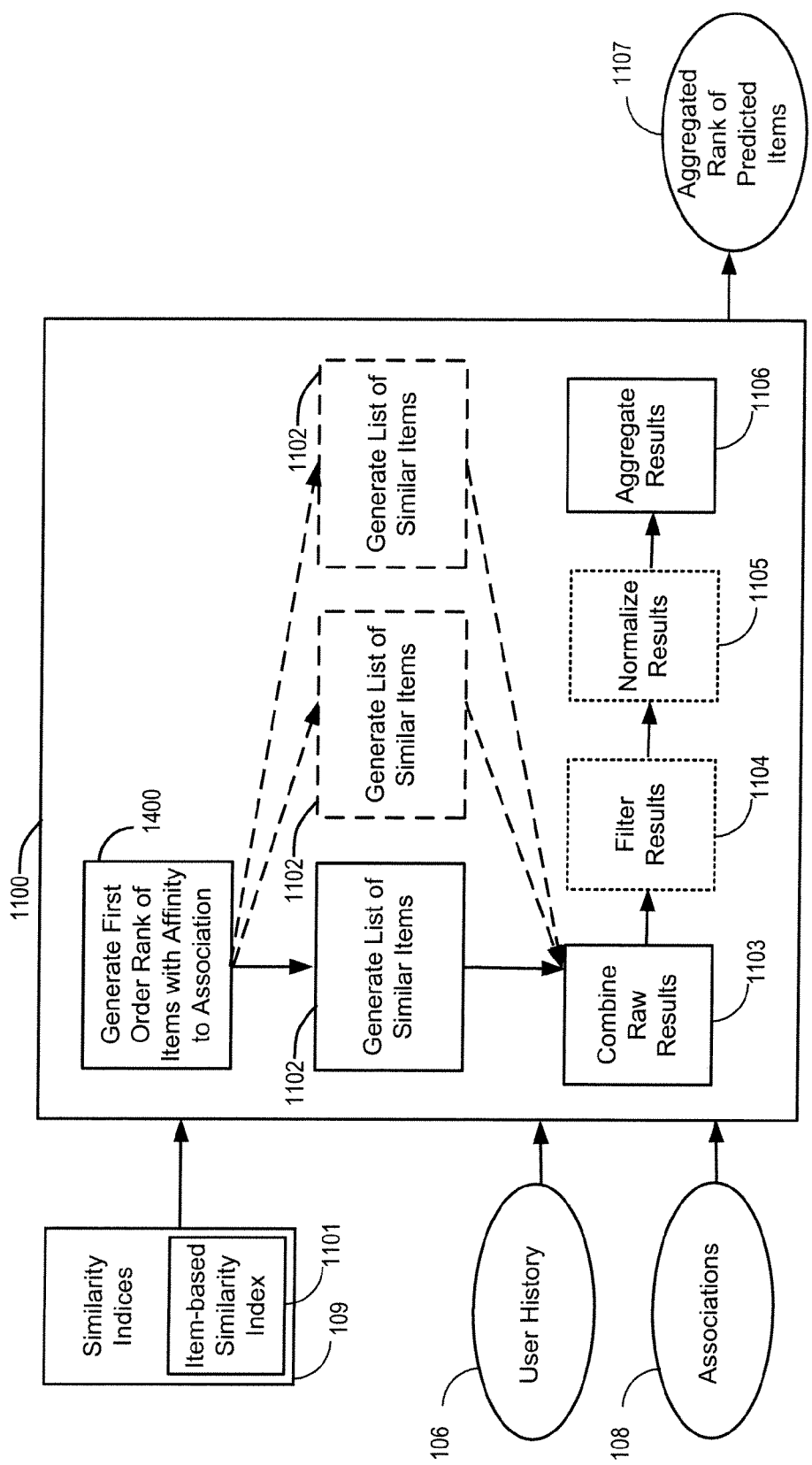
FIG. 11 is a block diagram depicting the generation of a second order rank of items that are predicted to have an affinity with a particular association.

FIG. 11 is a block diagram depicting the generation of a second order rank of items that are predicted to have an affinity with a particular association. More specifically, FIG. 11 depicts this process as generating the rank of items based upon an item-to-item similarities. The similarity indices 109 may contain an item-based similarity index 301 that has been computed using a system such as subsystem 300 in FIG. 3.

Figure 14:
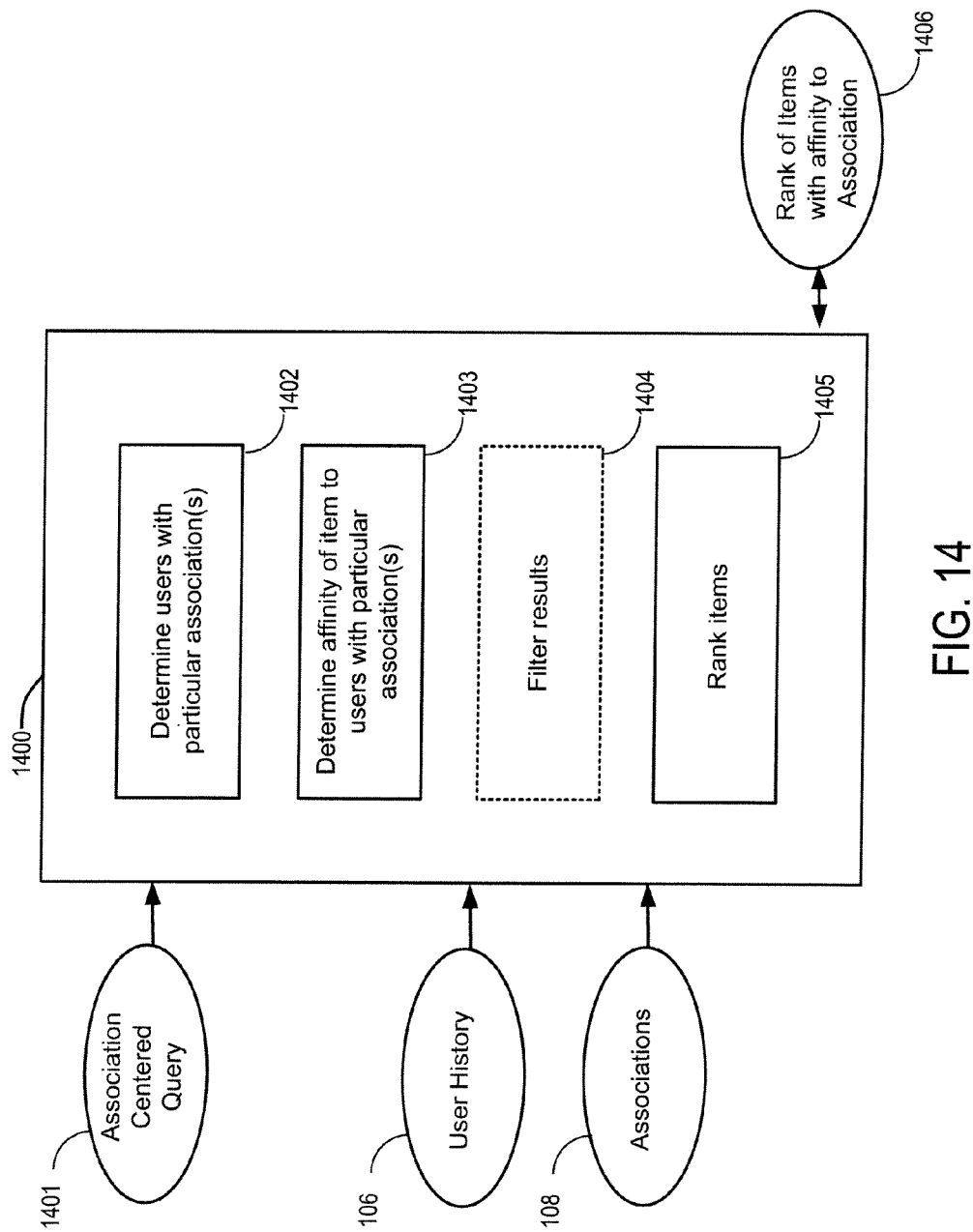
FIG. 14 is a block diagram depicting the generation of a first order rank of items that have an affinity to a particular association.

Subsystem 1100 generates a first order rank of items with affinity to association 1400 by using a method such as the one described in FIG. 14. Each unique item in the first order rank of items 1400 is an original item (e.g., a source item or reference item). A list of similar items 1102 (i.e., a list of items having a similarity to the original item) is generated for each original item by finding items similar to the original item in the item similarity index 1101. The item-based similarity index 1101 can be calculated using various methods. In some implementations, the item-based similarity index 1101 may be calculated using a system such as subsystem 700 in FIG. 7. In some implementations, the item-based similarity index 1101 may be calculated using a system such as subsystem 800 in FIG. 8. Each list of similar items 1102 can be calculated serially or in parallel.

When the system generates each list of similar items 1102, each is combined 1103. In some implementations, each list of similar items 1102 will contain items that are globally unique. In this case, the list of similar items 1102 can be merged into a single list of results.

In other implementations, it is possible for each list of similar items to contain items that are common to one or more of the lists. In these cases, the non-unique elements may be combined into the single list of results as a single entry.

In some implementations, merging the non-unique elements with a binary value (such as "item" or "1") can be done simply by discarding the duplicate entries.

Merging of non-unique elements with a discrete affinity value can be done in a number of ways. In some implementations, the average affinity score can be calculated and a unique item with the affinity score of the average can be added into the single list of results. In some implementations, the maximum or minimum affinity score can be selected as the item's affinity score as it is added to the single list of results. In some implementations, the similarity score of the item can be used to weight the affinity score so that the calculated affinity score in the single list of results can be more heavily tied to the results that are due to more similar associations. One example of this is as follows:

|  | Item Similarity | User Affinity | Association1 Affinity | Association2 Affinity | Association3 Affinity | Association4 Affinity |
|---|---|---|---|---|---|---|
| Item1 | .85 | .78 | .78 | .78 | | |
| Item2 | .79 | .73 | | | .73 | .73 |
| Item3 | .88 | .62 | .62 | .62 | .62 | |
| Weighted affinity | | | =(.78 * .85) + (.62 * .88) = 1.02 | =(.78 * .85) + (.62 * .88) = 1.02 | =(.73 * .79) + (.62 * .88) = 1.12 | .73 * .79 = .58 |

In some implementations, more precise measurements of predicted affinity need to be calculated so that an additional prediction measurement can be made. Such measurements include Slope One, Single Value Decomposition, and K-Nearest Neighbors.

In some implementations, results may be filtered at 1104. In some implementations, results may be normalized at 1105. In implementations where filtering 1104 or normalization 1105 occur, such steps 1104, 1105 may be performed serially or in parallel. Results may be filtered 1104 removing results that do not meet a particular threshold or are otherwise insignificant in the overall aggregated rank of predicted items 1107.

Result normalization 1105 may change the values in the rank of predicted items to account for a relative weight of the item in the overall aggregated rank of predicted items 1107. In implementations containing a result normalization step 1105, result normalization can use a normalization factor that is computed by generating a matrix of items to associations where the values of each cell in the matrix contain the affinity score of an item and corresponding association. In these implementations, the resulting generation of first order rank of items may generate a table such as this:

|  | Similarity | Item1 (e.g., motorcycle) | Item2 (e.g., motorcycle helmet) | Item3 (e.g., bandanas) |
|---|---|---|---|---|
| Assoc1 (e.g., motorcyclists) | .67 | .89 | .32 | 0 |
| Assoc2 (e.g., mechanics) | .62 | .55 | 0 | .84 |

In these implementations, the similarity scores of all of the associations (e.g., the similarity scores for the motorcyclists and the mechanics) can be used to compute a normalization constant:

$$\text{Resulting normalization constant} = \text{sqrt}(\text{assoc1\_similarity}^2 + \text{assoc2\_similarity}^2)$$

$$= \text{sqrt}(.67^2 + .62^2)$$

$$= \text{sqrt}(.45 + .38)$$

$$= .91$$

This normalization constant can then be used to recalculate the associative values of the table such that the following values are generated:

|  | Item1 | Item2 | Item3 |
|---|---|---|---|
| Assoc1 | .89 * (.67/.91) = .66 | .32* (.67/.91) = .23 | 0 |
| Assoc2 | .55 * (.62/.91) = .37 | 0 | .84* (.62/.91) = .57 |

Whether the results are filtered and normalized, results can be aggregated in the aggregate results step 1106. The aggregate results 1106 step will generate a single set of item affinity values where each item's affinity value is computed from the collective values of the affinity values of the same items for related associations. This can be done in a number of different ways.

In some implementations, the affinity values for each item can be based from the item commonality (e.g., the number of data samples that appear within the queried data). This is accomplished by storing a value related to the number of times an item has occurred as having an affinity with similar associations. The vector representation of such an aggregate result would be:

|  | Similarity | Item1 | Item2 | Item3 |
|---|---|---|---|---|
| Assoc1 | .67 | .89 | .32 | 0 |
| Assoc2 | .62 | .55 | 0 | .84 |
| # of times appearing | | 2 | 1 | 1 |

Because Item1 appears two times in the data sample, Item1 has a commonality of '2', while Item2 and Item3, having appeared one time in the sample data, would have a commonality value of '1'. In these implementations, the item Item1 has the highest affinity and would be ranked higher than the items Item2 and Item3.

In some implementations, item affinity values can be the sum of the affinity values for each item. This is accomplished by storing a value that is generated by adding the sum of all of the item affinity values together and storing this value as the predicted affinity for this item. The vector representation of such an aggregate result would be:

|         | Similarity | Item1 | Item2 | Item2 |
|---------|------------|-------|-------|-------|
| Assoc1  | .67        | .89   | .32   | 0     |
| Assoc2  | .62        | .55   | 0     | .84   |
| Sum of values |      | 1.44  | .32   | .84   |

When these implementations also include results that have undergone normalization in the normalize results 1105 step, the affinity values can be computed in the same way:

|         | Item1                    | Item2                    | Item3                     |
|---------|--------------------------|--------------------------|---------------------------|
| Assoc1  | .89 * (.67/.91) = .66    | .32* (.67/.91) = .23     | 0                         |
| Assoc2  | .55 * (.62/.91) = .37    | 0                        | .84* (.62/.91) = .57      |
| Sum of values | 1.03               | .23                      | .57                       |

In yet another implementation, the item affinity values can be the sum of the affinity values for each item when multiplied by the association similarity score. The vector representation of such an aggregate result would be:

|         | Similarity | Item1                          | Item2              | Item3              |
|---------|------------|--------------------------------|--------------------|--------------------|
| Assoc1  | .67        | .89                            | .32                | 0                  |
| Assoc2  | .62        | .55                            | 0                  | .84                |
| Sum of weighted values | | (.67 * .89) + (.62 *.55) = .82 | (.67 * .32) = .21 | (.62 * .84) = .52 |

In some implementations, more precise measurements of predicted affinity may be desired. In such scenarios, an additional prediction measurement can be made. Such measurements include Slope One, Single Value Decomposition, and K-Nearest Neighbors.

In some implementations, the aggregate results 1106 step will (also) normalize the resulting affinity values in order to create a continuous range of values [0 . . . 1]. The aggregated rank of predicted items 1107 can be stored in persistent storage such as in an RDBMS, in a disk storage system, in RAM or other storage.

Figure 12:
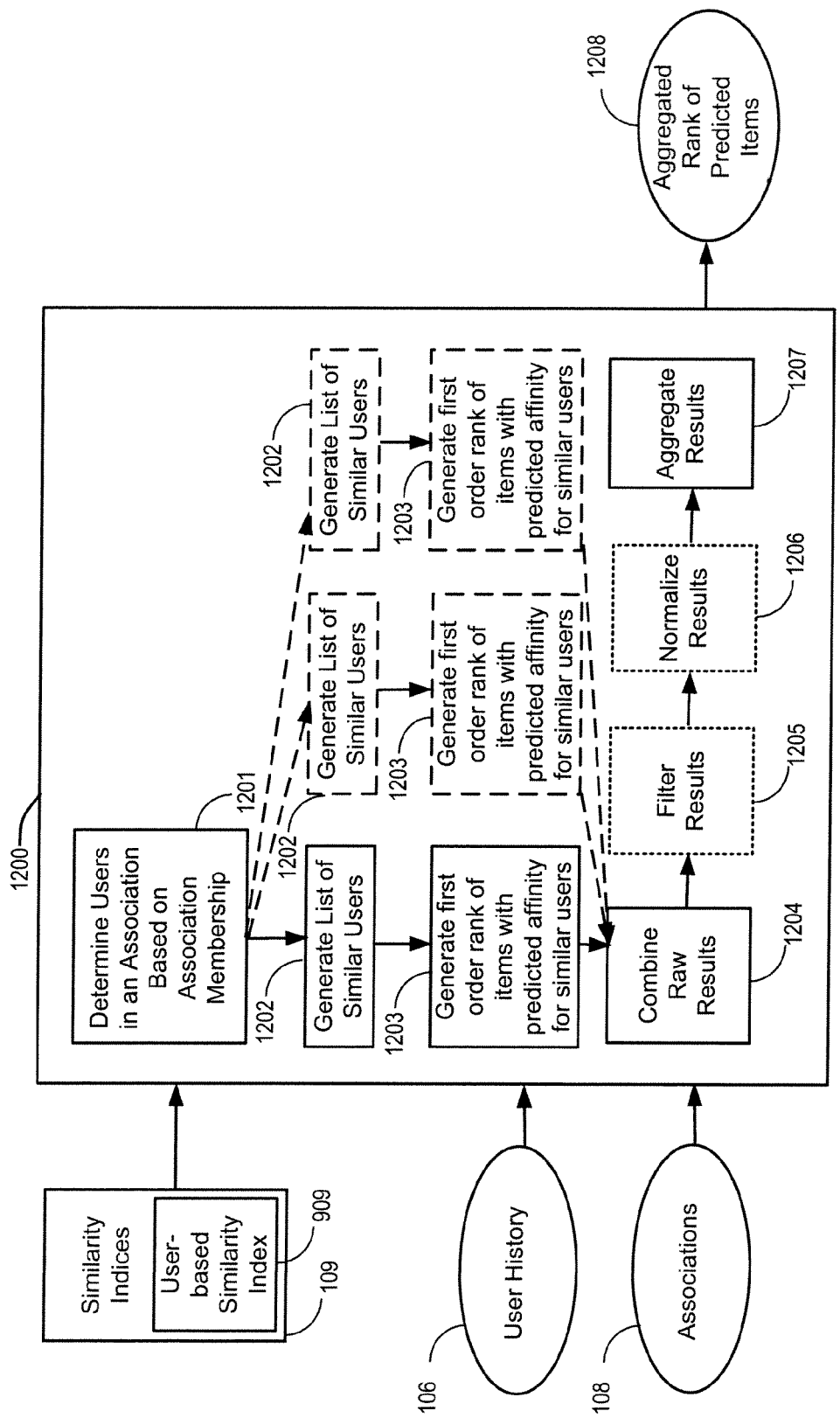
FIG. 12 is a block diagram depicting the generation of a second order rank of items that are predicted to have an affinity with a particular association.

FIG. 12 is a block diagram depicting the generation of a second order rank of items that are predicted to have an affinity with a particular association. More specifically, FIG. 12 depicts this process as generating the rank of items based upon users of the system. The similarity indices 109 may contain a user-based similarity index 909, such as one that has been computed using subsystem 900 in FIG. 9.

Subsystem 1200 determines users in an association based on association membership 1201. This determination may be based on user interactions that have been stored in the user history 106 that are related to the item.

Once the system searches the associations 108 to generate a list of users with association membership 1201, each individual user within the list serves as the original user (e.g., reference user or source user) in the computation of a distinct list of similar users 1202. Each individual list of similar users 1202 (i.e., list of users with similarity to an original user) can be calculated serially or in parallel. For each list of similar users 1202, a list of the items with a predicted affinity is produced 1203. The list of items 1203 can be constructed either serially or in parallel.

In some implementations, the user similarity score from the list of similar users can be propagated directly as a ranking or affinity value for each item. For instance, if the following list of similar users is constructed:

|       | Similarity to original user |
|-------|-----------------------------|
| User1 | .85                         |
| User2 | .79                         |

And the each user has the following item affinities:

|       | Item1 | Item2 | Item3 | Item4 |
|-------|-------|-------|-------|-------|
| User1 | 4     | 3     |       |       |
| User2 |       |       | 4     | 3     |

Then the affinity of the users to the items would be as follows:

|       | Item1        | Item2         | Item3          | Item4         |
|-------|--------------|---------------|----------------|---------------|
| User1 | .85 * 4 = 3.4 | .85 * 3 = 2.55 |                |               |
| User2 |              |               | .79 * 4 = 3.16 | .79 = 2.37    |

In some implementations, the item affinity values can be normalized before computing the predicted item scores. In some implementations, item affinity values can be represented in a binary value (i.e., 0 or 1).

In some implementations, the predicted affinity can be determined using other methods that employ broad data sampling techniques. Such techniques include K-Nearest Neighbors, Single Value Decomposition, or Slope One.

Upon generation of the lists of similar items at 1203, the raw results can then be combined and aggregated in a manner similar to that discussed in connection with FIG. 11, where there results were combined and aggregated to ensure that duplicate results are combined and weighted to a value representing the weight of the individual results.

In some implementations, the raw results may also be filtered and normalized in a manner similar to that discussed in connection with FIG. 11, where the raw results are filtered to remove results not meeting a particular criteria and normalized to a continuous range of values (i.e., a range from 0 to 1).

Figure 13:
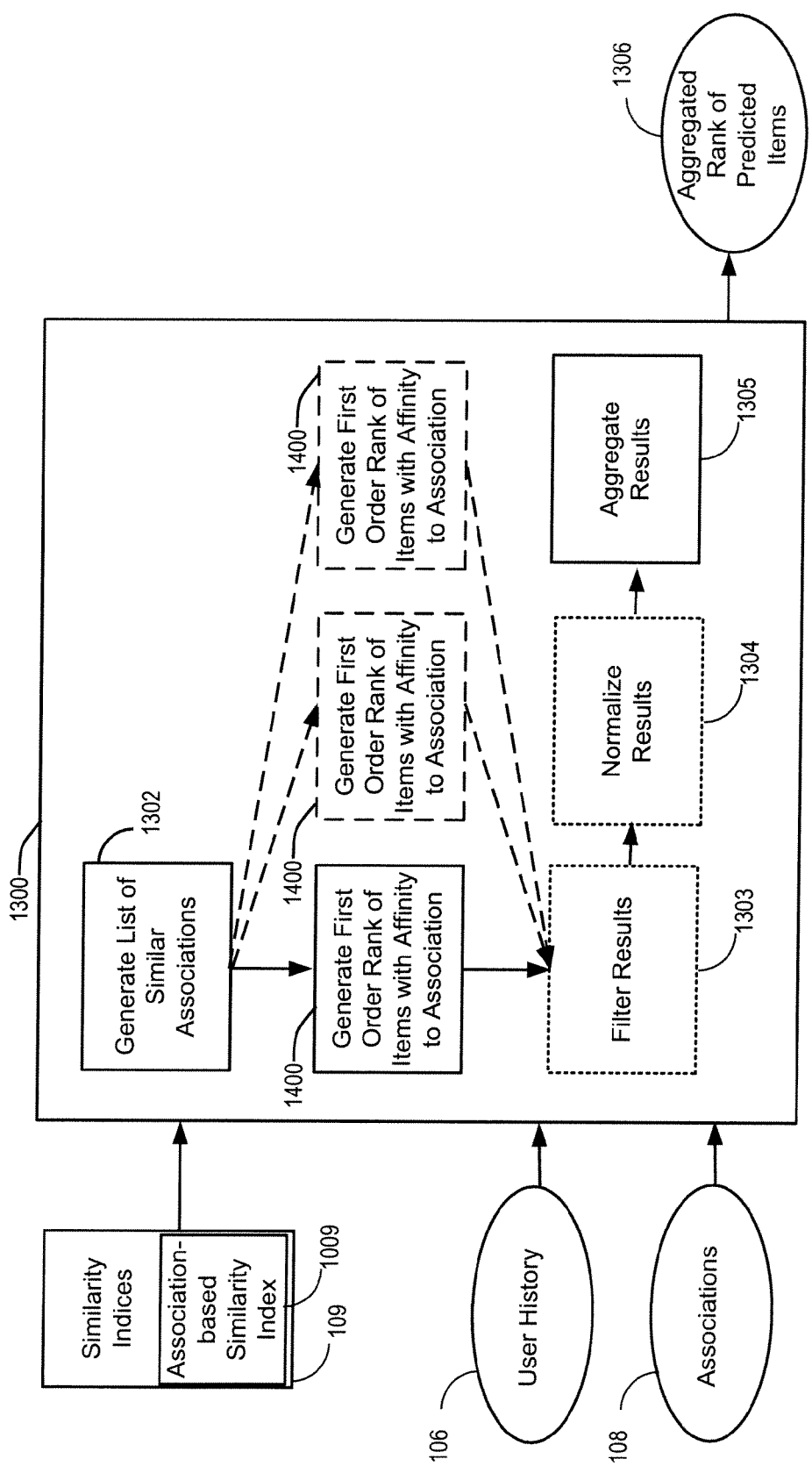
FIG. 13 is a block diagram depicting the generation of a second order rank of items that are predicted to have an affinity with a particular association.

FIG. 13 is a block diagram depicting the generation of a second order rank of items that are predicted to have an affinity with a particular association. More specifically, FIG. 13 depicts this process as generating the rank of items based upon association-to-association similarities. The similarity indices 109 may contain an association-based similarity index 1009 that has been computed using a subsystem such as the one described at 1000 in FIG. 10. The association-based similarity index 1009 is used to generate list of similar associations 1302 that is based upon how closely related a candidate association correlates to a particular association.

For each association in the list of similar associations 1302, a first order rank of items with an affinity by the association is produced using a system such as the one described at 1400 in FIG. 14. Each first order rank of items with an affinity by the association 1400 may be calculated by querying or searching the user history 106 and associations 108.

Based on the generated list of similar associations 1302, one or more first order rank of items with an affinity by the association 1400 are generated. Each individual first order rank of items with an affinity by the association 1400 can be calculated serially or in parallel.

Upon generation of the lists of items with affinity by and association 1400, the raw results can then be filtered, normalized and aggregated in a manner similar to that discussed in connection with FIG. 11, where the raw results are filtered to remove results not meeting a particular criteria, normalized to a continuous range of values (i.e., a range from 0 to 1) and aggregated to ensure that duplicate results are combined and weighted to a value representing the weight of the individual results.

FIG. 14 is a block diagram depicting the generation of a first order rank of items that have an affinity to a particular association. The user history 106 and associations 108 are synthesized in accordance with the association-centered query 1401 by following the steps in system 1400. The output from the system 1400 is a rank of items with affinity to the association 1406. In some implementations, the rank of items with affinity to the association 1406 will be an ordered list of items. In some implementations, the rank of items with affinity to the association 1406 will contain a score that depicts the relative affinity that each item has with the particular association.

The association-centered query 1401 is provided to the system 1400. Users who have an affinity to the association (e.g., users who have "joined" an association, users who follow the association leaders, users that have been grouped together based on user interactions, etc.) will be retrieved from the associations 108 in step 1402. Once the list of users has been generated, we can determine the item affinities for the enumerated users 1403 by listing item preferences from the user history 106. In some implementations, the system can optionally filter the results 1403 by reducing the records in either the user history 106 or associations 108 that are retrieved.

As each resulting item is stored in the results, a value corresponding to each user's affinity from the user history 106 will be added to the affinity score of the item's affinity score for the association. The system will then rank the items 1405 so that the rank of items with affinity to the association produces 1406.

In some implementations, this rank of items would be calculated as the frequency of a particular item being tied to users in the association with affinity to the content and would result in a table similar to the following:

|  | Item1 | Item2 | Item3 | Item4 |
|---|---|---|---|---|
| Affinity | 5 | 3 | 2 | 1 |

In some implementations, the rank could be a normalized representation of the data. In these implementations, and given the above table, the following normalization constant can be derived:

$$\text{norm} = \text{sqrt}(5^{\wedge}2 + 3^{\wedge}2 + 2^{\wedge}2 + 1^{\wedge}2)$$
$$= \text{sqrt}(25 + 9 + 4 + 1)$$
$$= \text{sqrt}(39)$$
$$= 6.24$$

The values of the table are then divided by the normalization function to generate the following normalized table:

|  | Item1 | Item2 | Item3 | Item4 |
|---|---|---|---|---|
| Affinity | 5/6.24 = .80 | 3/6.24 = .48 | 2 = .32 | 1 = .16 |

In some implementations, the system can be used to dynamically identify users that have the ability to exercise some influence over an association of users (an "influencer"). Such identifications are helpful in cases where the influencer adds validity or relevance to an item recommended to the influencer's association.

Figure 15A:
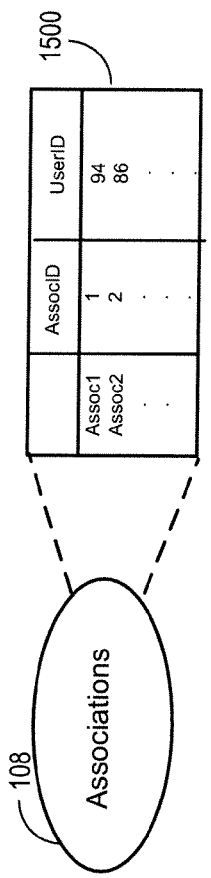
FIG. 15A is a block diagram depicting a direct association of a single influencer of an association.

FIG. 15A is a block diagram depicting a direct association of a single influencer of an association. In some implementations, associations 108 can be represented as a 2D table 1500. Each row in the 2D table 1500 corresponds to a unique association. Each column in the 2D table 1500 corresponds to a value associated with the association. In these implementations, an individual user can be tied directly to the association and is known to influence the members of the association. Examples of this influence include the dean of a school, the owner of a business, the founder of a charitable foundation, etc. The influencer of an association in this case could be the author of a blog or the administrator of a social networking group.

Figure 15B:
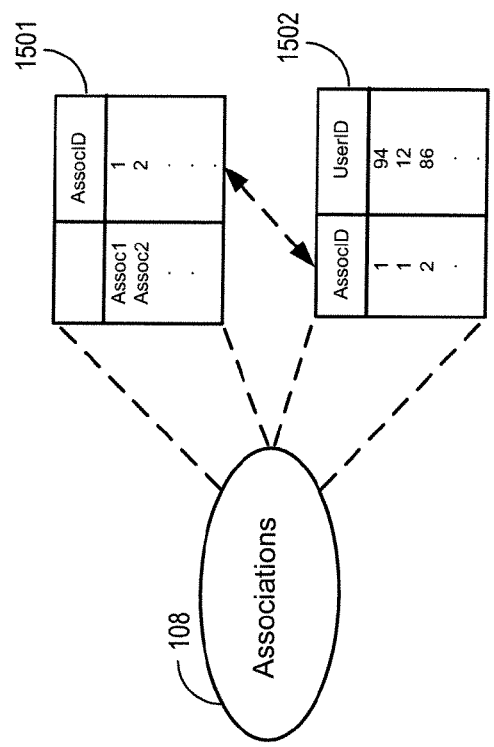
FIG. 15B is a block diagram depicting direct associations of influencers of an association.

FIG. 15B is a block diagram depicting direct associations of influencers of an association. In some implementations, Associations 108 can be represented as a pair of 2D tables. The first 2D table is the association table 1501. The second 2D table is the influencer table 1502. Each row in the association table 1501 corresponds to a unique association. Each column in the association table 1501 corresponds to a value associated with the association. The influencer table 1502 maps entries from the association table 1501 to a group of users that influence the association. Examples of this influence include the management team of a business, the board of a charitable organization or teachers in a particular school. The influences of an association in this case could be authors of a particular blog or administrators of a social networking group.

Figure 16:
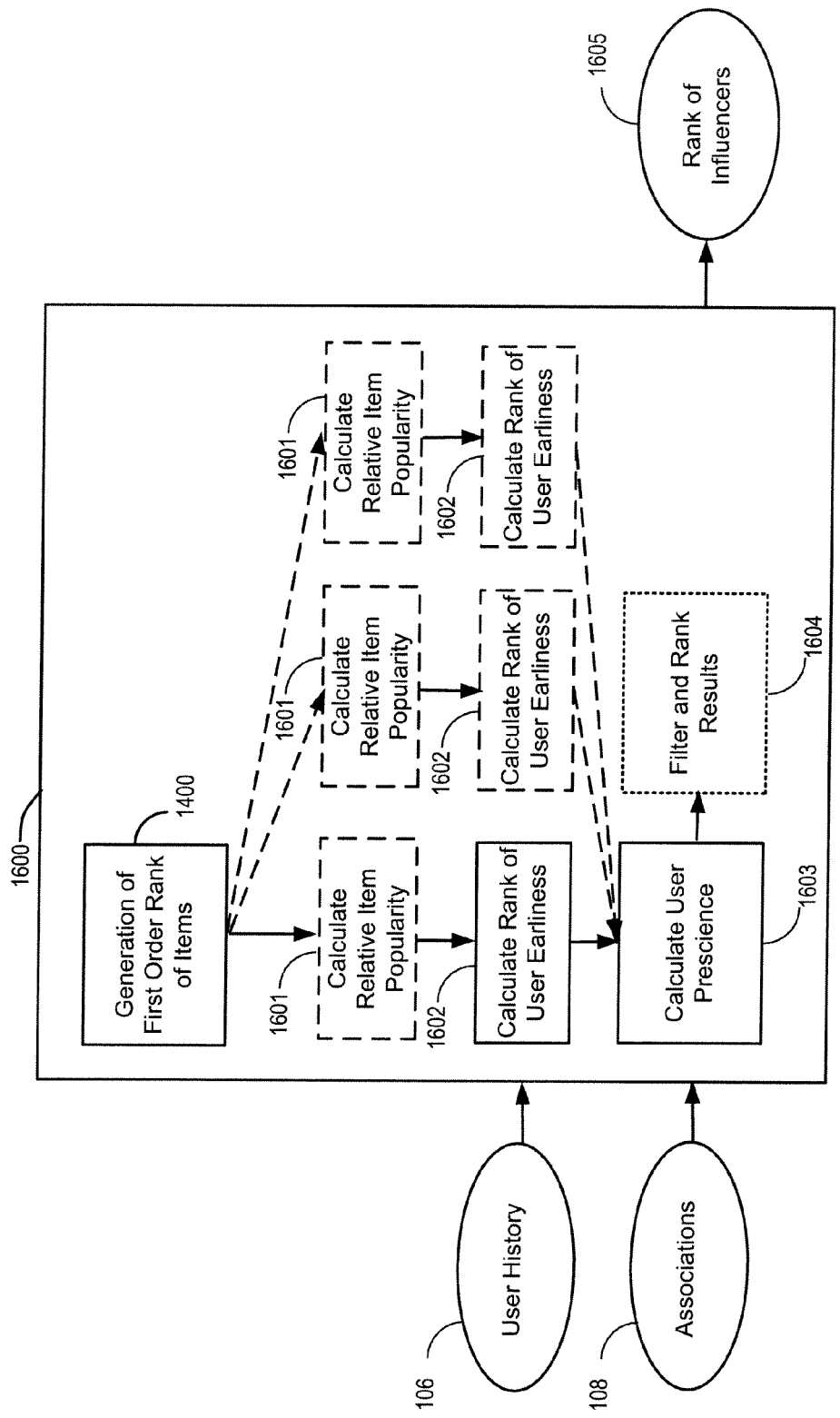
FIG. 16 is a block diagram depicting the determination of a rank of influencers of an association based on the user history and associations.

FIG. 16 is a block diagram depicting the determination of a rank of influencers of an association based on the user history and associations. Using these calculations, a system may measure the extent to which an individual user's personal affinities for an item will predict the affinity between the general population of an association and any particular item. In other words, using this calculation, a system may be able to determine the users with membership in a particular association that should be targeted before other users to determine to what extent the larger association will have affinity for an item. In many situations, users who can reliably predict how well the rest of the association will express an affinity for an item can provide an "editorial" or "curating" function for items on the system. Therefore, a user who "gets on board early" with items that have become popular later has prescience and is a good person to target as an influencer.

The subsystem 1600 generates a first order rank of items 1400 (e.g., as detailed in FIG. 14). Each identified item from the generated first order rank of items 1400 can be used to calculate user prescience 1603 by the calculation of relative item popularity 1601 and calculation of the rank of user earliness 1602. Once the calculation of user prescience is complete, the subsystem 1600 can optionally filter and rank results 1604, resulting in a rank of influencers 1605.

In some implementations, the calculation of relative item popularity 1601 and calculation of the rank of user earliness 1602 can be calculated serially in any order. In some implementations, the calculation of relative item popularity 1601 and calculation of the rank of user earliness 1602 can be calculated in parallel.

In some implementations, the calculation of relative item popularity 1601 can be done in parallel with other calculations of relative item popularity 1601. In some implementations, the calculation of relative item popularity 1601 can be done serially.

In some implementations, the calculation of rank of user earliness 1602 can be done in parallel with other calculations of rank of user earliness 1602. In some implementations, the calculation of rank of user earliness 1602 can be done serially.

In some implementations, the subsystem 1600 can calculate relative item popularity 1601 by calculating the sum of the user affinities of an item divided by the sum of all user affinities. In these implementations, the user affinities are the result of determining user affinities as stored in the user history 106 for all users who are associated with an association 108.

For example, users may express an affinity by rating a film on a scale from 1 to 5. If the users of an association have applied this scale to 3 separate films, then the relative item popularity can be expressed as follows:

Example User History:

|  | # ratings of '1' | # ratings of '2' | # ratings of '3' | # ratings of '4' | # ratings of '5' | Sum of ratings |
|---|---|---|---|---|---|---|
| Film1 | 50 | 250 | 200 | 150 | 250 | (50*1) + (250*2) + (200*3) + (150*4) + (250*5) = 3000 |
| Film2 | 90 | 275 | 220 | 175 | 300 | 3500 |
| Film3 | 200 | 150 | 400 | 200 | 500 | 5000 |
| Sum of all ratings |  |  |  |  |  | 3000 + 3500 + 5000 = 11500 |

Relative Item Popularity

|  | Sum of all ratings of individual film | Sum of all ratings for association | Relative item popularity |
|---|---|---|---|
| Film1 | 3000 | 11500 | .26 |
| Film2 | 3500 | 11500 | .30 |
| Film3 | 5000 | 11500 | .43 |

In some implementations, the subsystem 1600 can calculate relative item popularity 1601 by calculating to sum of all user interactions with an item divided by the sum of all user interactions. In these implementations, the user interactions are the result of determining the number of user interactions stored in the user history 106 for all users who are associated with an association within associations 108.

For example, user interactions could be the number of times a particular song is played by users in an association. If the user interactions are collected for 3 separate songs, then the relative item popularity can be expressed as follows:

Example User History:

|  | # of times played |
|---|---|
| Song1 | 3000 |
| Song2 | 3500 |
| Song3 | 5000 |

-continued

|  | # of times played |
|---|---|
| Sum of all interactions | 3000 + 3500 + 5000 = 11500 |

Relative Item Popularity

|  | Sum of all interactions of individual song | Sum of all interactions for association | Relative item popularity |
|---|---|---|---|
| Song1 | 3000 | 11500 | .26 |
| Song2 | 3500 | 11500 | .30 |
| Song3 | 5000 | 11500 | .43 |

In some implementations, the subsystem 1600 can calculate rank of user earliness 1602 by determining the number of user interactions with an item for users of an association that occurred after the interaction with an item of an individual user. This value can then be divided by the total number of user interactions with an item for users of an association. In these implementations, the larger the earliness value, the earlier the user.

For example, user interactions for a user could be the number of times a book is purchased. Calculating the purchase "earliness" of a user for 3 separate books could be expressed as follows:

|  | Total times purchased | Purchases by other users after user's initial purchase | Earliness of user |
|---|---|---|---|
| Book1 | 10000 | 1000 | 1000/10000 = .1 |
| Book2 | 15000 | 7500 | .5 |
| Book3 | 20000 | 19000 | .95 |

In some implementations, the subsystem 1600 can calculate rank of user earliness 1602 by dividing user interactions into "periods" which represent groups of loosely temporal related interactions. Examples of this may include "subsequent 1000 interactions," "transactions by day", "interactions*1/age of content", etc. Based on the period and its temporally related interactions, a period score can be assigned for the period. The period score can be a binary value (e.g., 0 or 1), a continuous value [0 . . . 1], or an unbounded value.

In these implementations, the system will divide sum of the period score occurring after the period for a specific user's transaction by the total period score for an item. This can be expressed as follows:

|  | Sum of period scores | Sum of period scores occurring after interaction period | Earliness of user |
|---|---|---|---|
| Item1 | 10000 | 1000 | 1000/10000 = .1 |
| Item2 | 15000 | 7500 | .5 |
| Item3 | 20000 | 19000 | .95 |

Once both the calculation of relative item popularity 1601 and calculation of rank of user earliness 1602 is complete, the system 1600 can calculate user prescience 1603.

In some implementations, the calculation of user prescience 1603 can be done by calculating the sum of the product of user earliness and the item's relative popularity for all items. This value will result in a list that favors users that pick many, popular items before other users in their association.

An example of this calculation of user prescience 1603 for a comparison of three video games can be expressed as follows:

|  | Count of all sales of individual game | Count of all sales for association | Relative item popularity |
|---|---|---|---|
| Game1 | 3000 | 11500 | .26 |
| Game2 | 3500 | 11500 | .30 |
| Game3 | 5000 | 11500 | .43 |

|  | Sum of all sales | Sum of all sales after user purchase | Earliness of user |
|---|---|---|---|
| Game1 | 10000 | 1000 | 1000/10000 = .1 |
| Game2 | 15000 | 7500 | .5 |
| Game3 | 20000 | 19000 | .95 |

|  | Earliness of User | Relative Item popularity | Prescience for individual item |
|---|---|---|---|
| Game1 | .1 | .26 | .1 * .26 = .026 |
| Game2 | .5 | .30 | .5 * .30 = .15 |
| Game3 | .95 | .43 | .95 * .43 = .41 |
| Total user prescience |  |  | .58 |

In this example, users with a greater prescience are considered to be more influential within a group.

In some implementations, the calculation of relative item popularity 1601 would be optional. In these cases, the value of the relative item popularity can be treated as '1' in the previous example.

Oftentimes, not all users will have an earliness value for each item in the generation of first order rank of times 1600. This could be due to the user not having interacted with the item. In these cases, the earliness of the user can be expressed as a '0' value in the previous example because the sum of all interactions in the calculation of rank of user earliness will be 0.

In some implementations, the subsystem 1600 can filter and rank results 1604 or the calculated user prescience 1603. Examples of filters would include excluding users whose prescience does not meet a particular threshold or storing only the top results from the calculation. Examples of ranking would include sorting the results so that the most prescient users are listed at the beginning or end of a list.

FIG. 17 is a block diagram depicting the granting of special status within the system to an influencer. In some implementations, this status is important because an influencer can be given certain incentives to evaluate an item for their association. This, in turn, enables the user responsible for a particular item to interact with the influencer in a way that is different than other members of the user community.

The subsystem 1700 generates a list of associations 1701 as contained in associations 108. In some implementations, this will be a complete list of all associations. In some implementations, this will be a partial list of associations where the list can be as small as a single association.

The generated list of associations 1701 allows the subsystem 1700 to determine influencers for association 1702. This in some implementations, determination of influencers for association 1702 can be done through methods described in FIGS. 15A, 15B, 16 or combinations thereof.

Once the subsystem 1700 has determined influencers for association 1702, the status of influencer can be granted within the system and the subsystem 1700 can store influencer status within the system. In some implementations, the persistence of influencer status within the system 1703 can be stored in an RDBMS or computer file. In some implementations, the persistence of influencer status within the system 1703 can be stored in an in-memory cache.

Figure 18A:
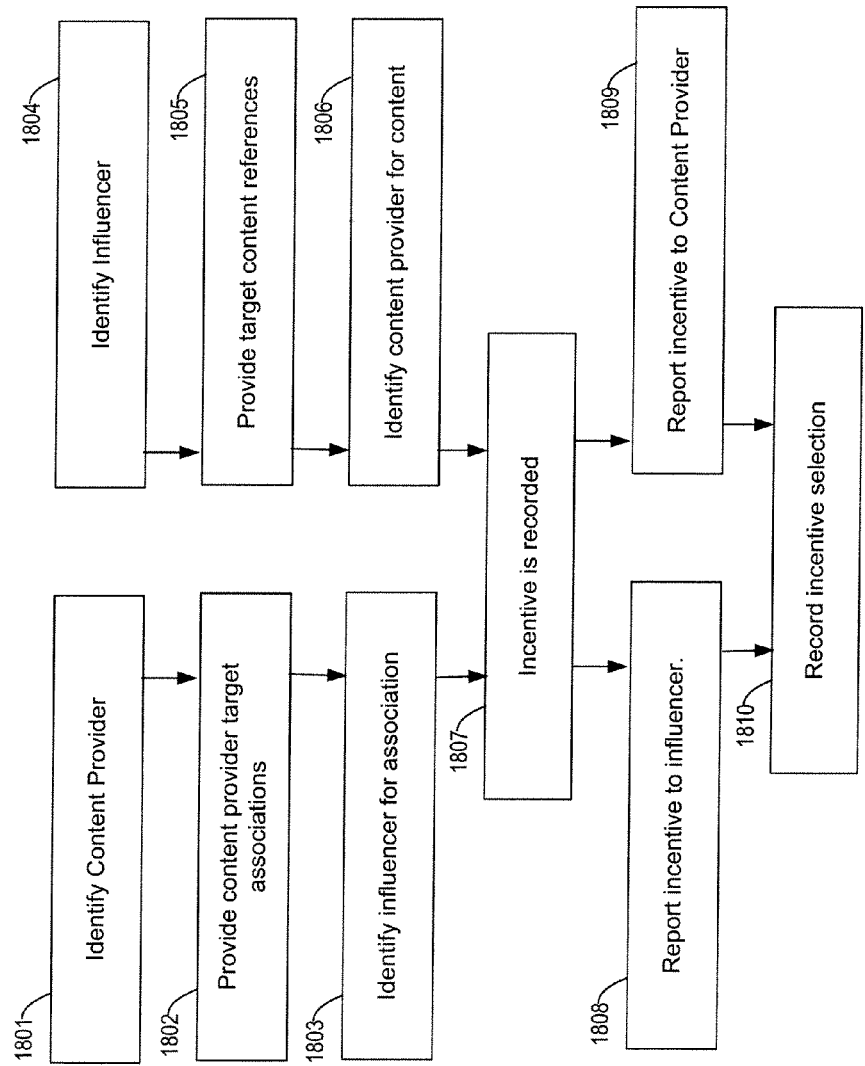
FIG. 18A is a block diagram depicting the generation, acceptance and fulfillment of influencer incentives.
Figure 18B:
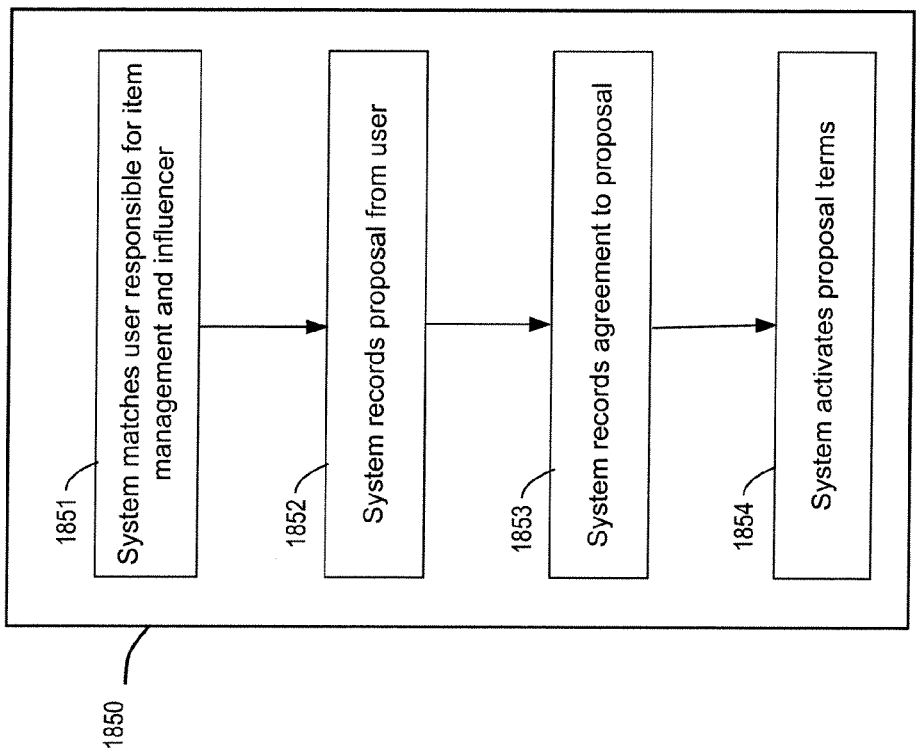
FIG. 18B is a block diagram depicting the generation, acceptance and fulfillment of influencer incentives on the system.

FIGS. 18A-18B depict alternate visualizations to describe the creation and management of influencer incentives.

FIG. 18A is a block diagram depicting the generation, acceptance and fulfillment of influencer incentives. Such incentives allow a content provider and influencer to collaborate to bring relevant content to users in an association influenced by influencer. This process is explained in greater detail herein. FIG. 18A provides a general overview of the process at the macro level.

The system can identify a content provider 1801, who may then be provided with target associations 1802 (e.g., associations that are expected to have an affinity for the content of the content provider). Once the target associations have been identified, the system can identify a plurality of influencers for one or more associations 1803. An incentive for the influencer to introduce the content to the association is then recorded 1807. For example, the content provider may offer 5% of any revenues generated from sales of the content provider's content by associations for which the influencer is an influencer. The incentive is reported to the influencer 158, and an incentive selection by the influencer is recorded 1810.

Alternatively, the system can identify an influencer 1804. Once the influencer has been identified, the system can provide target content references to the influencer 1805. Once the target content is selected, the content provider for the content can be identified 1806. An incentive to introduce the content to the association is then recorded 1807. For example, the principal of a school may offer to recommend the content provider's content to the parents of children attending that school if the content provider would be willing to share 5% of any revenues generated from sales to these parents. The incentive is reported to the content provider 1809, and an incentive selection by the content provider is recorded 1810.

FIG. 18B is a block diagram depicting the generation, acceptance and fulfillment of influencer incentives on the system. The subsystem 1850 is used to allow the user maintaining an item (such as a content provider) to work in conjunction with an influencer to provide incentives to the influencer, which in turn will allow the item to be introduced to the influencer's association.

The system matches a user responsible for item management and influencer 1851. In some implementations this can be done dynamically, such as by email introduction via an automated process. In some implementations, this can be done because one of the parties determined that there was a relevant item-to-association affinity. In some implementations, this matching may occur because the influencer selected the content.

Once the system matches user responsible for item management and influencer 1851, the system records a proposal made from either user 1852. In some implementations, the proposal can be a simple response to a question "please tell people about my item." In some implementations, the proposal can be the creation of a "promo code" that the users in an association could use because of economic considerations, such as cost savings. In some implementations, the proposal can include more details such as pricing, commissions, time restrictions, exclusivity, territories, and min-max transaction thresholds.

Once both parties agree to the proposal, the system records agreement to the proposal 1853 and the terms of the proposal are activated on the system 1854.

Figure 19:
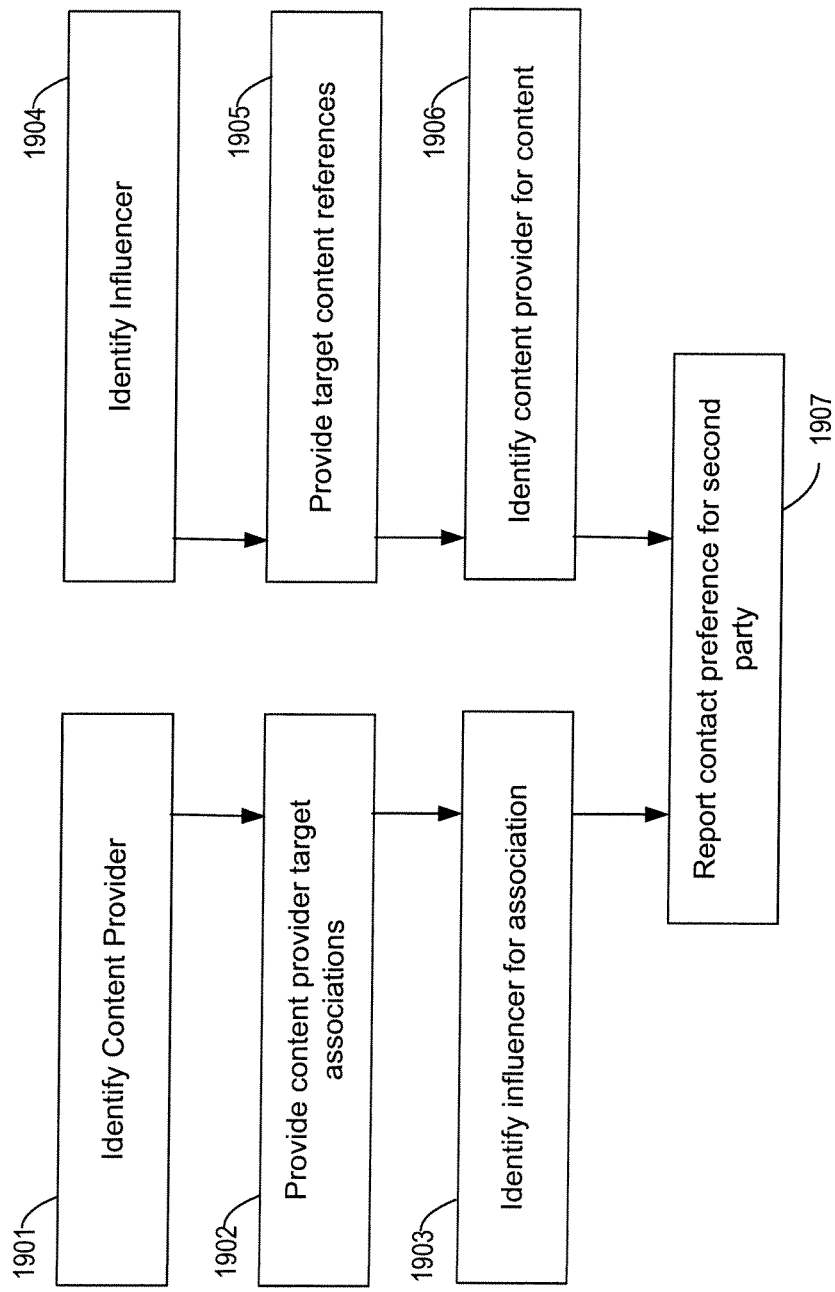
FIG. 19 is a block diagram depicting the introduction of a content provider and influencer where the content and association are likely to have an affinity for each other.

FIG. 19 is a block diagram depicting the introduction of a content provider and influencer where the content and association are likely to have an affinity for each other. The details of this process are explained in greater detail herein. FIG. 19 provides a general overview of the process at the macro level.

The system can identify a content provider 1901 who may then be provided with target associations 1902 (e.g., associations that are expected to have an affinity for the content of the content provider). Once the target associations have been identified, the system can identify a plurality of influencers for one or more associations 1903. Once the influencer for a target association has been identified, the system can report a contact preference for the influencer 1907.

Alternatively, the system can identify an influencer 1904. Once the influencer has been identified, the system can provide target content references to the influencer 1905. Once the target content is selected, the content provider for the content can be identified 1906. Once the content provider for the content has been identified, the system can report a contact preference for the content provider to the influencer 1907. This may be useful in cases where the influencer can derive economic or social gain from the introduction of content to the group that they influence. In some cases, the influencer may select an item and then receive communication from the content provider in an attempt to derive economic gain. For instance, if the influencer is a reseller of specialty content, the influencer might contact the content provider in order to negotiate a "wholesale price" for the content. In other cases, the influencer might select an item and then receive communication from the content provider in an attempt to derive social gain. For instance, the influencer may desire to have a discount available to members of their church/synagogue/mosque/temple or to have proceeds from the sale of the content donated to a charity in exchange for introducing the content to the influencer's association.

FIGS. 20-26 show exemplary interfaces for interacting with the content management system to generate and display reports. These reports are useful for users who manage items on the system and are interested in identifying new associations that will find those items relevant.

Figure 20:
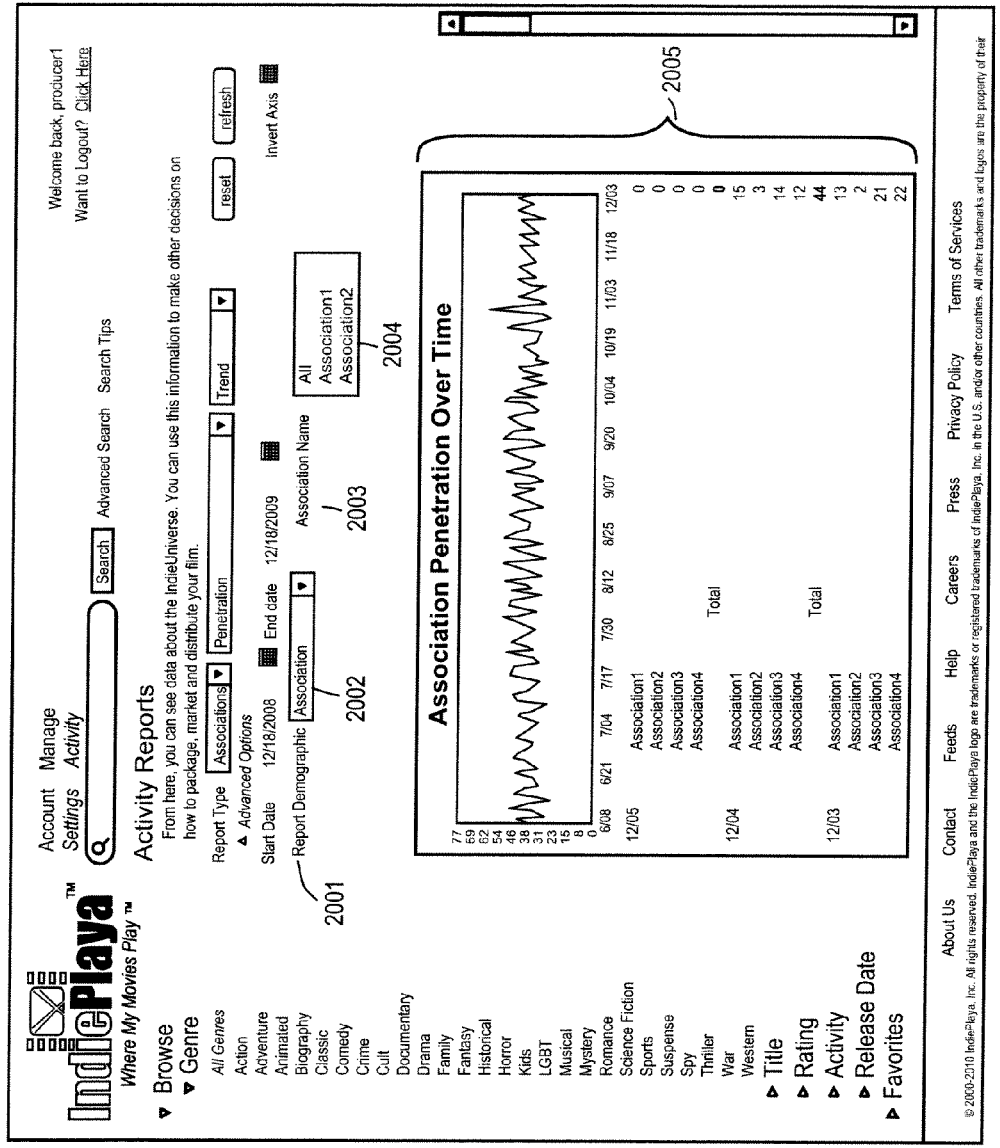
FIG. 20 shows exemplary interface with an example associations report.

FIG. 20 shows exemplary interface 2000 with an example associations report. In some implementations, an example associations report can include one or more selectable options for specifying report-type selection and for generating one or more graphic interpretations (e.g., line chart, scatter plot, bubble plot, pie chart, bar chart, etc.) of the selected content. In this example, an associations report has been generated based upon the report demographic 2001. Report demographic 2001 can include selectable region 2002 that can list one or more selectable report demographic options such as association, gender, country or age. In this example, an associations report has been generated based upon a selection 2002 of report demographic 2001 association. Additionally, a selection 2002 of a report demographic 2001 association can cause the system to generate one or more additional options (e.g., dropdown menu 2004, or a radio checkbox) for specifying association selection by association name. Example interface 2000 also includes a graphic interpretation 2005 of the selected content. In some implementations, an example associations report can generate links to influencers within an association so that the user viewing the report can initiate contact.

Figure 21:
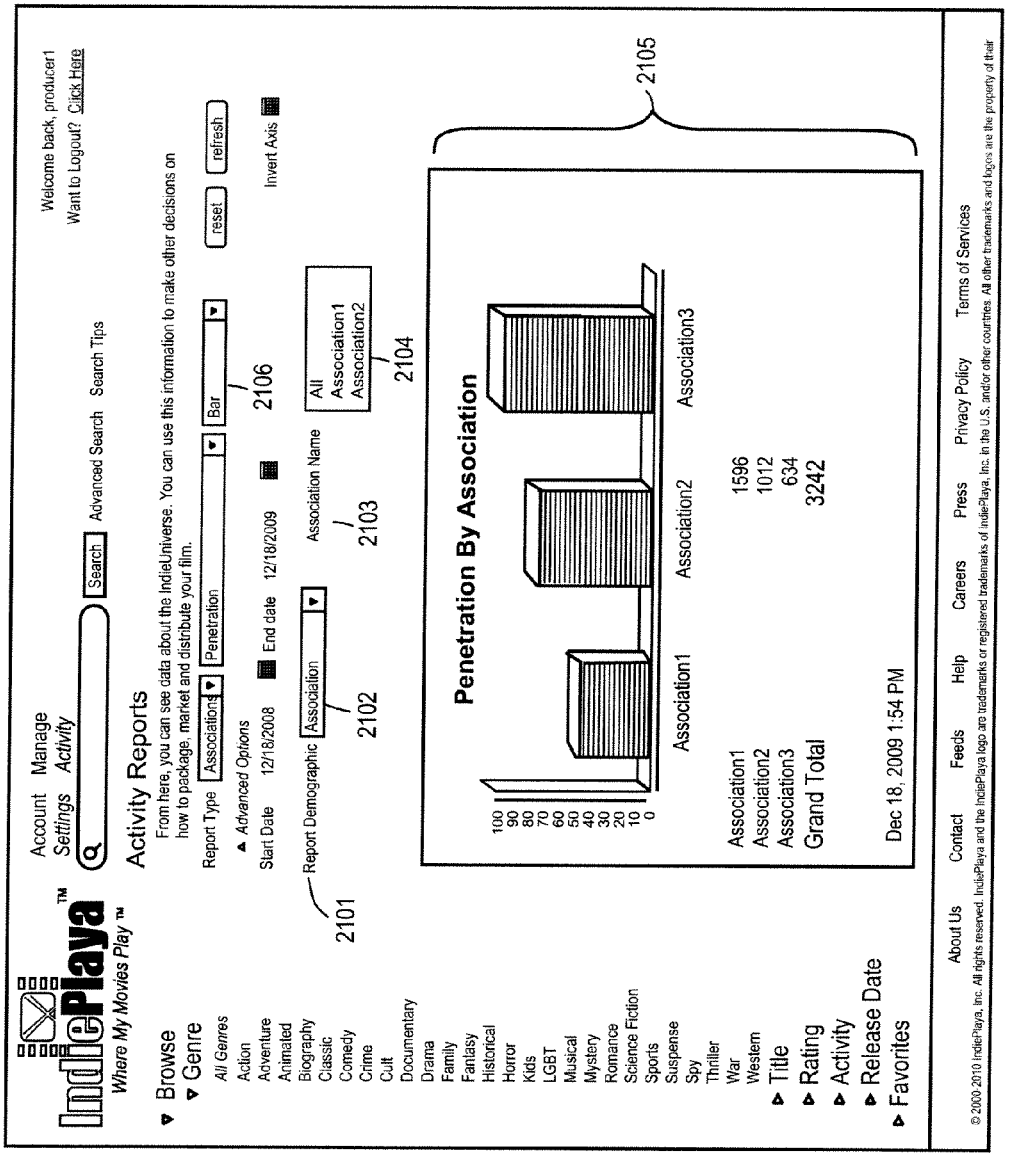
FIG. 21 shows exemplary interface with another example associations report.

FIG. 21 shows exemplary interface 2100 with another example associations report. In this example, an associations report has been generated based upon a selection of report display type Bar 2106. Example interface 2100 also includes a graphic interpretation 2105 of the selected report demographic.

Figure 22:
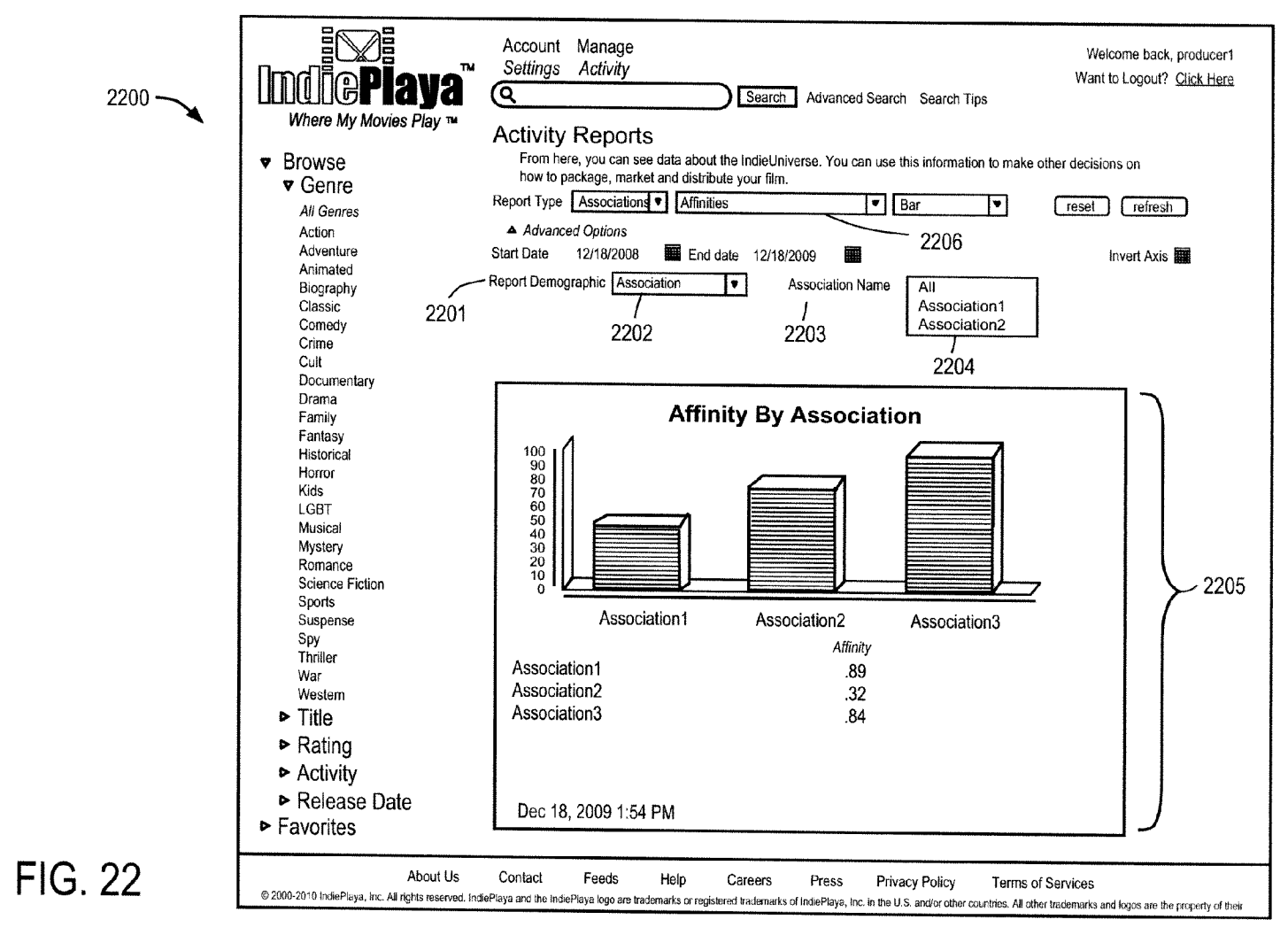

FIG. 22 shows exemplary interface 2200 with another example associations report. In this example, an associations report has been generated based upon a selection of report display type Affinities 2206. Example interface 2200 also includes a graphic interpretation 2205 of the selected report demographic.

Figure 23:
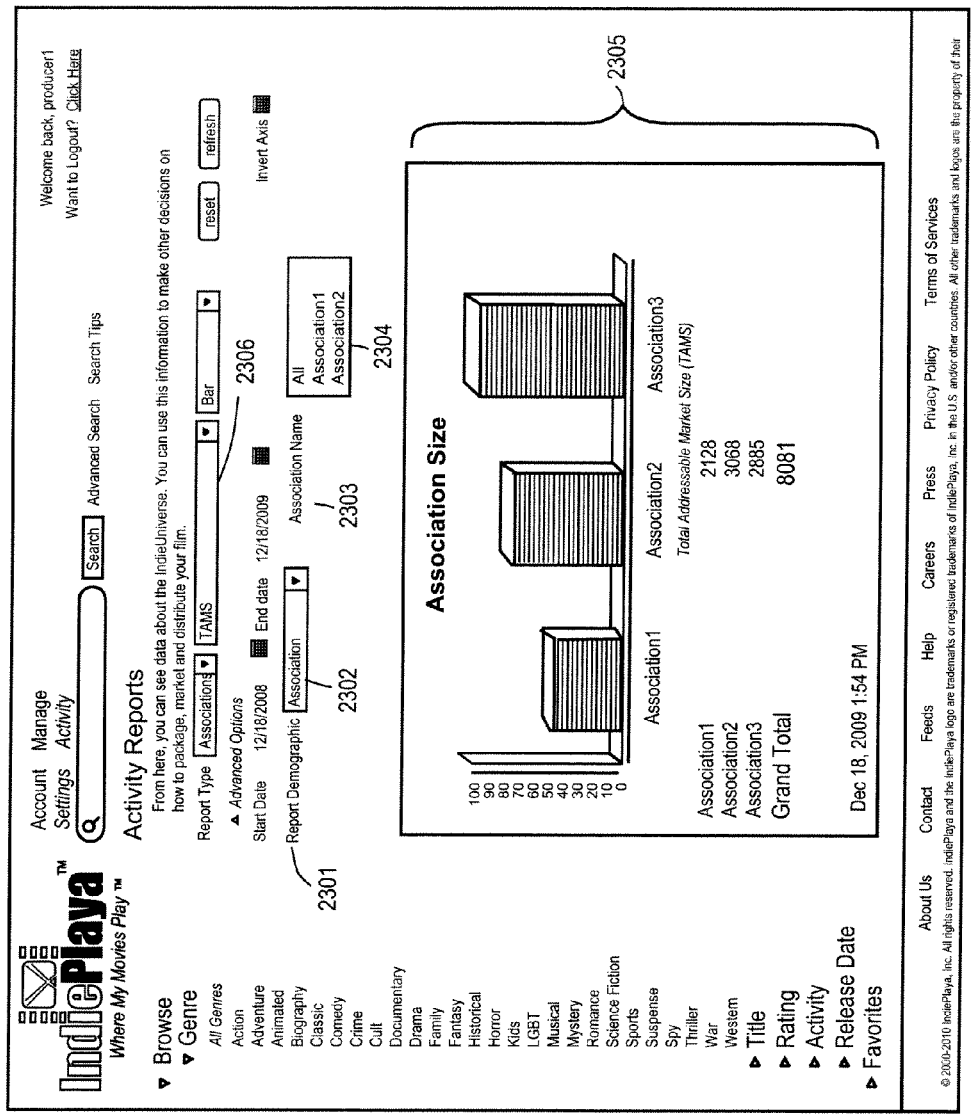
FIG. 23 shows exemplary interface with another example associations report.

FIG. 23 shows exemplary interface 2300 with another example associations report. In this example, an associations report has been generated based upon a selection of report display type TAMS (Total Addressable Market Size) 2306. Example interface 2300 also includes a graphic interpretation 2305 of the selected report demographic.

Figure 24:
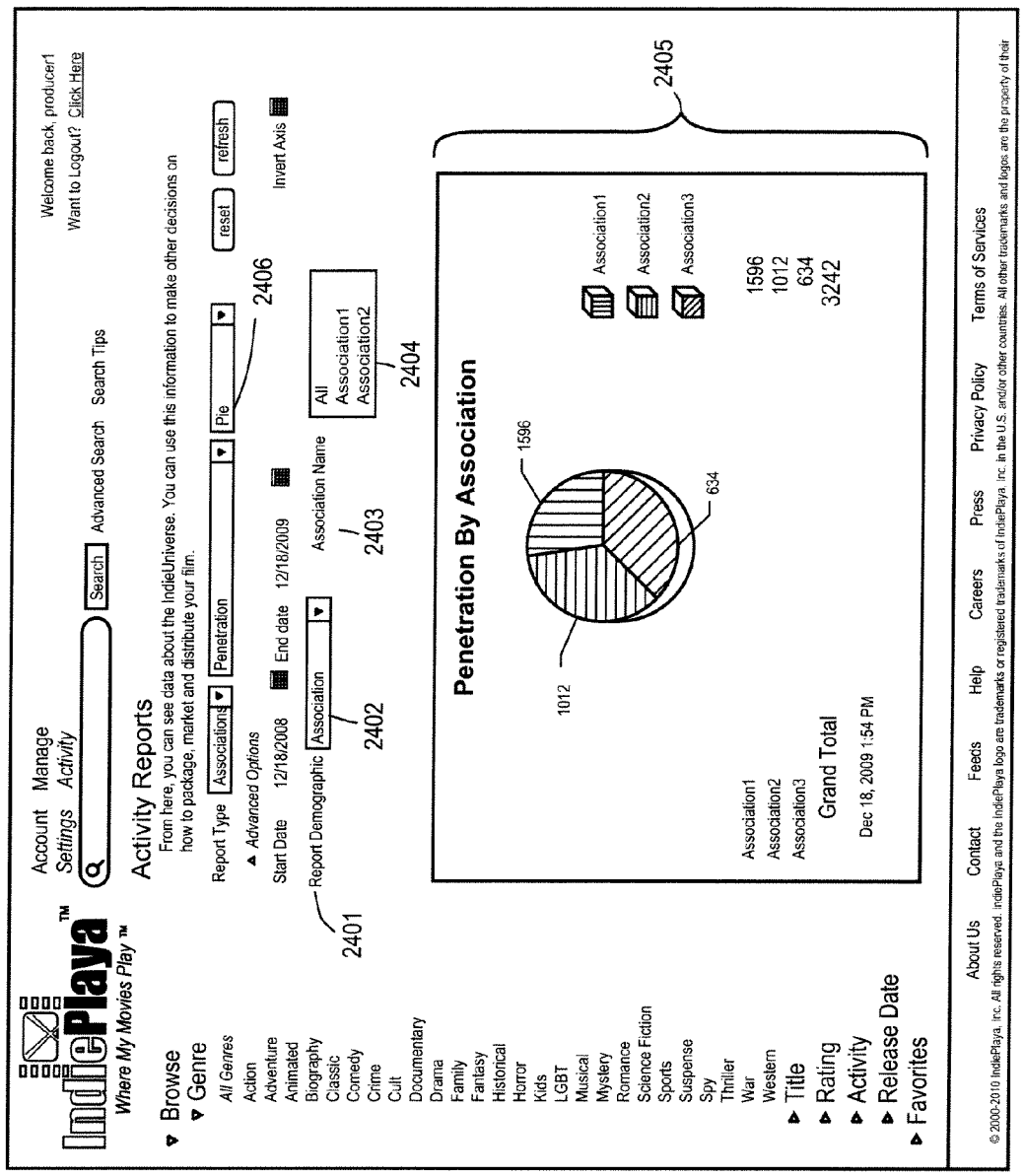
FIG. 24 shows exemplary interface with another example associations report.

FIG. 24 shows exemplary interface 2400 with another example associations report. In this example, an associations report has been generated based upon a selection of report display type Pie 2406. Example interface 2400 also includes a graphic interpretation 2405 of the selected report demographic.

Figure 25:
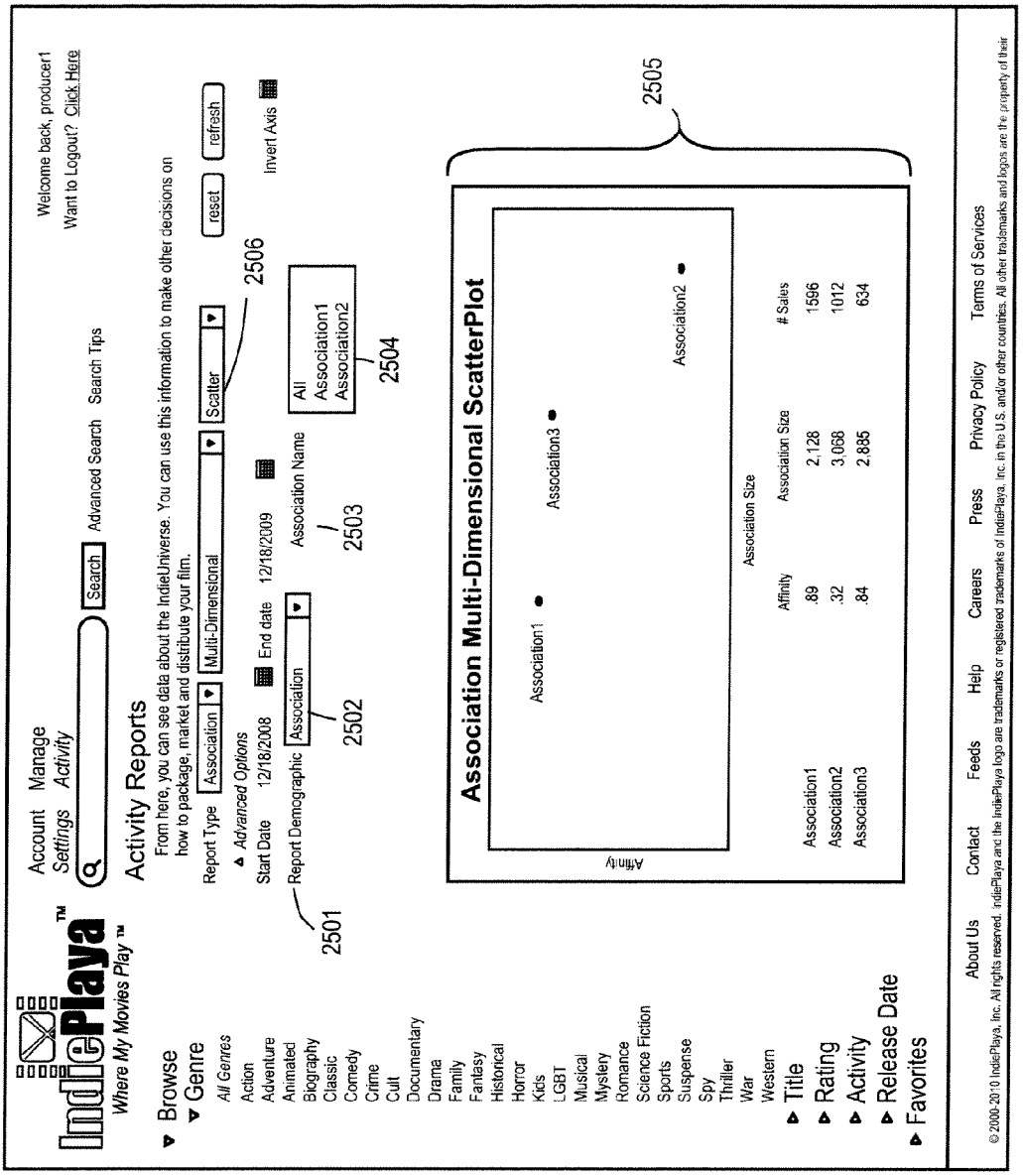
FIG. 25 shows exemplary interface with another example associations report.

FIG. 25 shows exemplary interface 2500 with another example associations report. In this example, an associations report has been generated based upon a selection of report display type Multi-Dimensional Scatter 2506. Example interface 2500 also includes a graphic interpretation 2505 of the selected report demographic.

Figure 26:
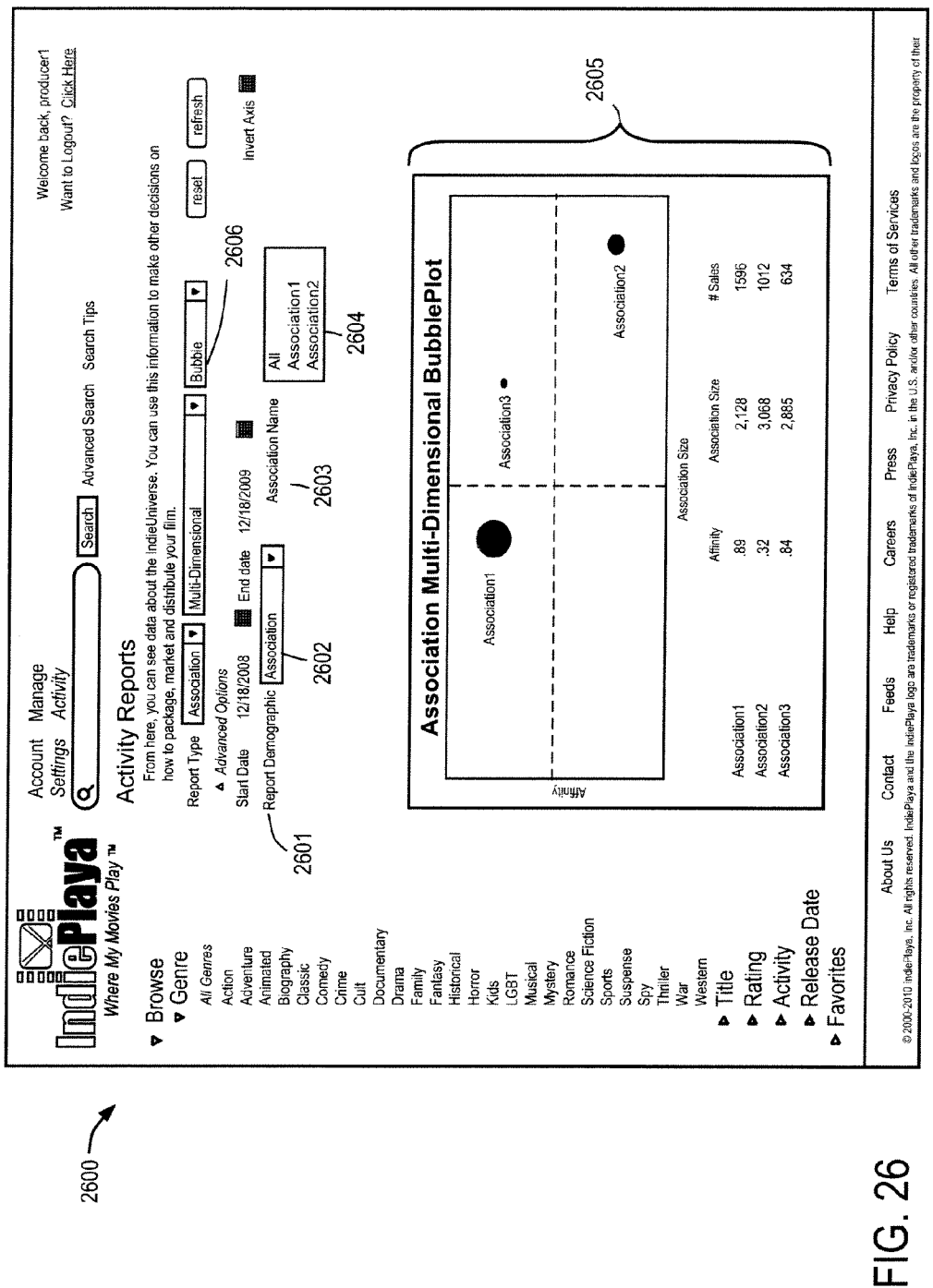
FIG. 26 shows exemplary interface with another example associations report.

FIG. 26 shows exemplary interface 2600 with another example associations report. In this example, an associations report has been generated based upon a selection of report display type Multi-Dimensional Bubble 2606. Example interface 2600 also includes a graphic interpretation 2605 of the selected report demographic.

Figure 27:
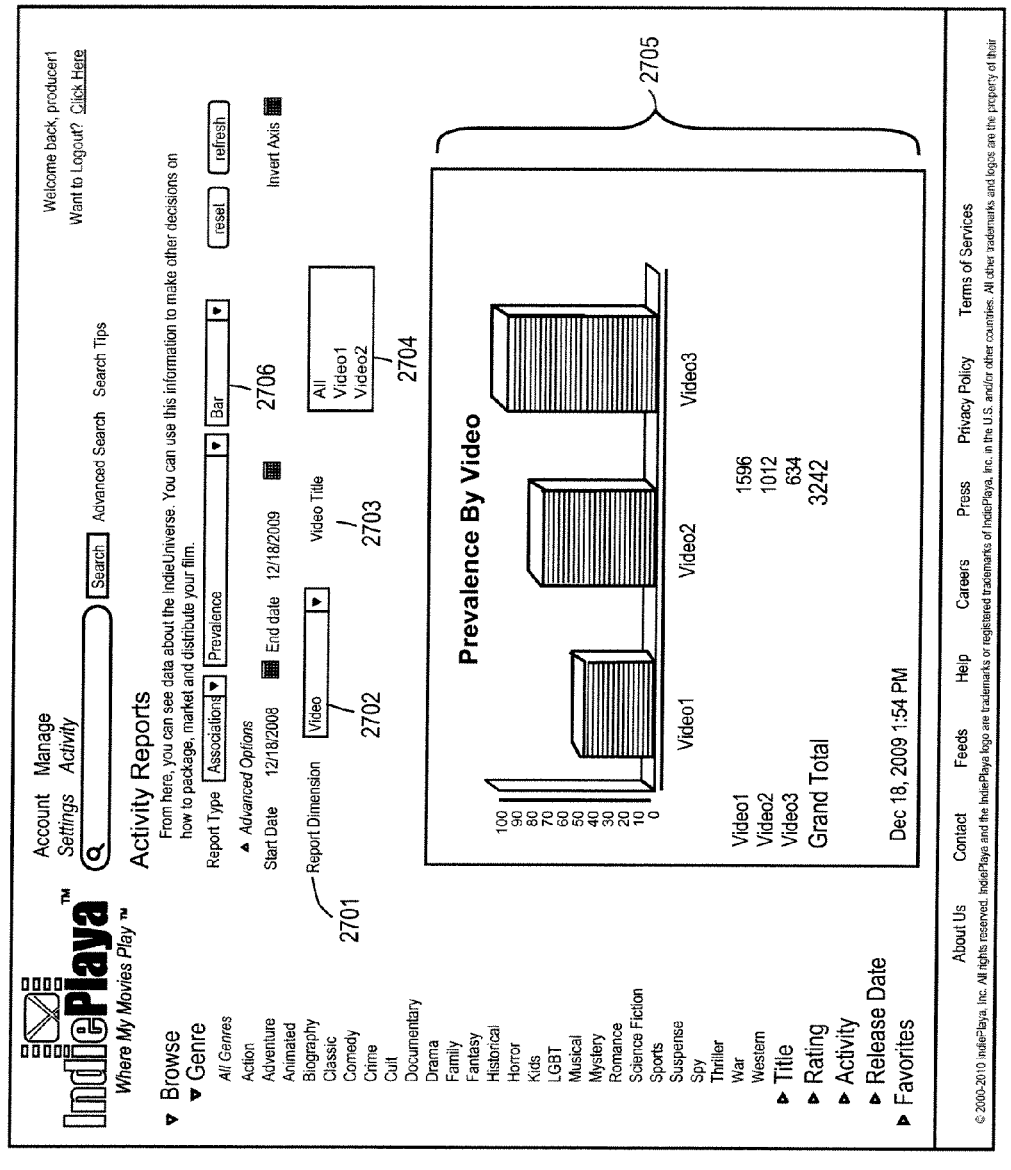
FIG. 27 shows exemplary interface including an example associations report.
Figure 28:
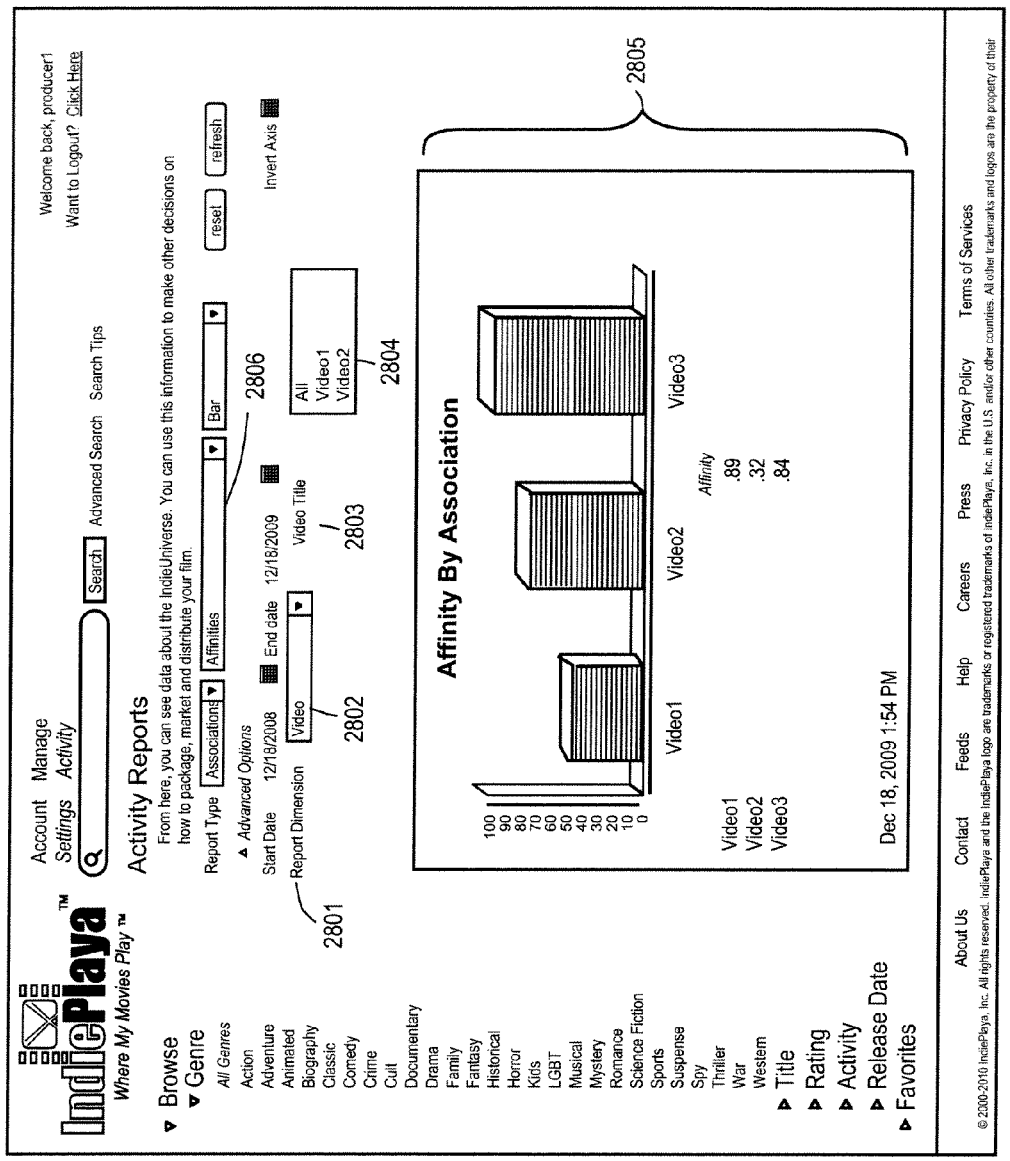
FIG. 28 shows exemplary interface with another example associations report.
Figure 29:
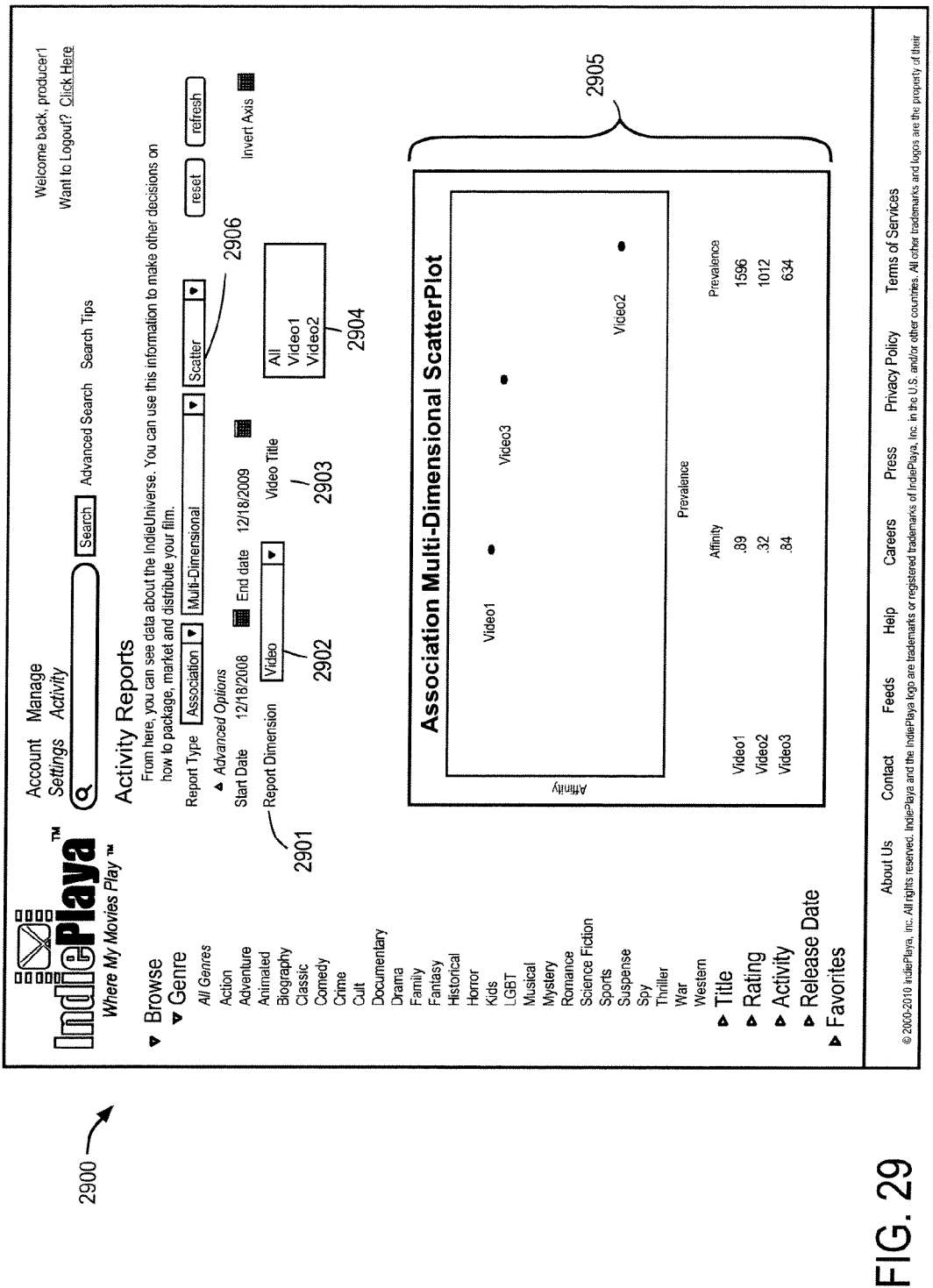
FIG. 29 shows exemplary interface with another example associations report.

FIGS. 27-29 show exemplary interfaces for interacting with the content management system to generate and display reports. These reports are useful for users who are influencers within an association and are interested in identifying new items that others in their association will find relevant. In some implementation, the user of the report may be the owner of a website. In these cases, the website owner would use these reports to determine a list of "candidate items" that could be licensed for sale or rental on the website owner's website. In some implementations, the user of the report may be a first provider of content on the content management system who is seeking additional content that can be bundled with their own content in order to provide a value-added benefit to their audience. In these cases, the first provider of content would use these reports to generate a list of "candidate content" from second providers of content that could be bundled with the content from the first provider of content.

FIG. 27 shows exemplary interface 2700 including an example associations report. In some implementations, an example associations report can include one or more selectable options for specifying report-type selection and for generating one or more graphic interpretations (e.g., line chart, scatter plot, bubble plot, pie chart, bar chart, etc.), of the selected content. In this example, an associations report has been generated based upon the report dimension 2701. Report dimension 2701 can include selectable region 2702 that can list one or more selectable report dimension options such as video, song, book, electronic device, or automobile. In this example, an associations report has been generated based upon a selection 2702 of report dimension 2701 video. Additionally, a selection 2702 of a report demographic 2701 association can cause the system to generate one or more additional options (e.g., dropdown menu 2704), for specifying video selection by video title. Example interface 2700 also includes a graphic interpretation 2705 of the selected content. In some implementations, an example associations report can generate links to users who have responsibility for management of an item so that the user viewing the report can initiate contact with the provider of the item.

FIG. 28 shows exemplary interface 2800 with another example associations report. In this example, an associations report has been generated based upon a selection of report display type Affinities 2806. Example interface 2800 also includes a graphic interpretation 2805 of the selected report demographic.

FIG. 29 shows exemplary interface 2900 with another example associations report. In this example, an associations report has been generated based upon a selection of report display type Multi-Dimensional Scatter 2906. Example interface 2900 also includes a graphic interpretation 2905 of the selected report demographic.

Figure 30A:
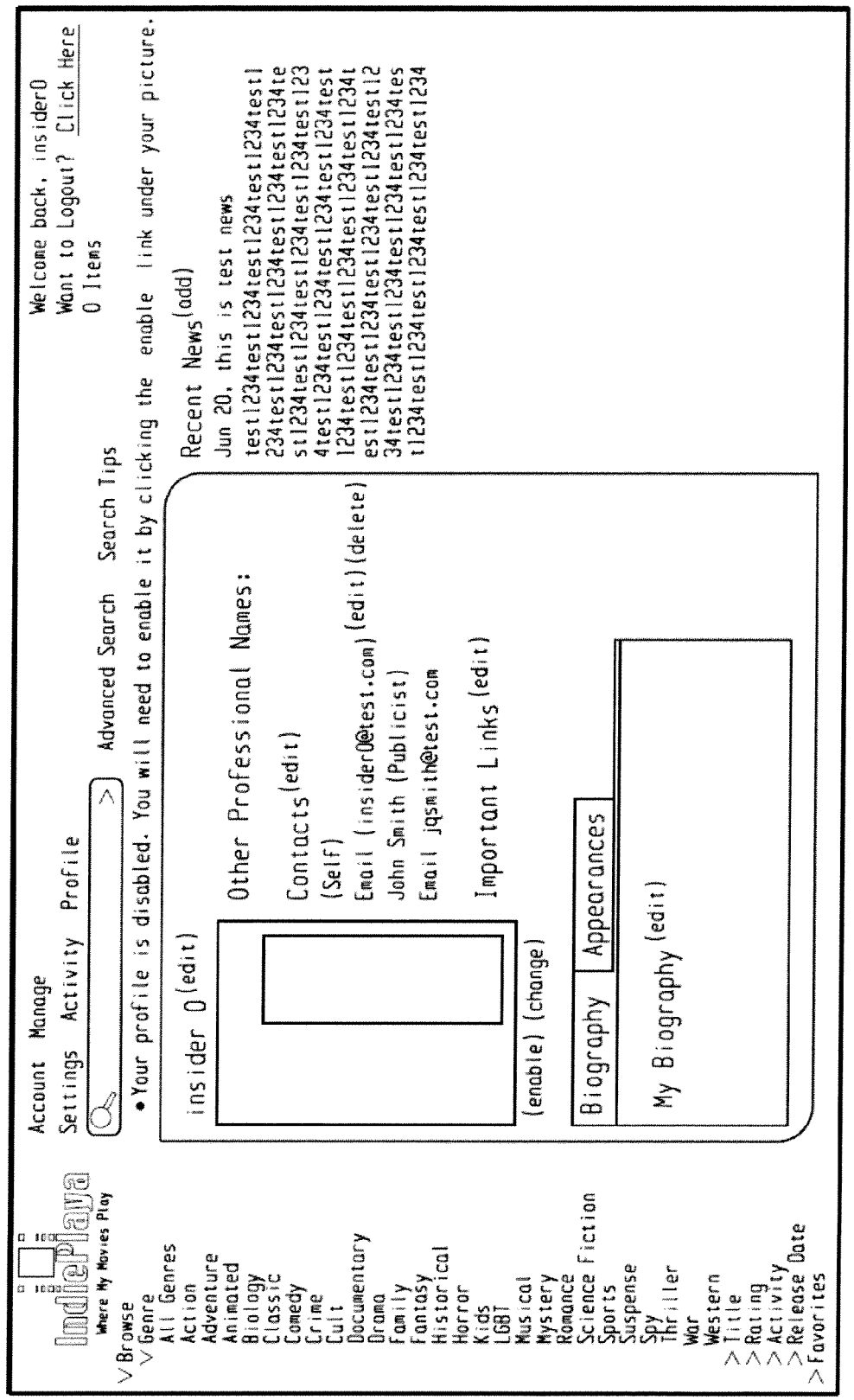
FIG. 30A shows exemplary interface.

FIGS. 30A and 30B show exemplary interfaces for interacting with the content management system to store contact information for users. This information is useful for users who are responsible to manage an item to initiate a contact with influencers and vice-versa.

FIG. 30A shows exemplary interface 3000. In some implementations, the system can store contact information 3001 such as email address, website, instant messaging, mailing address and phone numbers that can be used to contact users. This information can be displayed in the contact region 3002. Contact information 3001 can be publicly visible to all users of the system or can be displayed to only special users of the system such as influencers or to users who are responsible to manage an item.

FIG. 30B shows an exemplary interface 3050. In some implementations, the user can store contact information 3001 by inputting the values into form fields 3051. In some implementations, users can choose to show the information publicly or to display the contact information 3001 only to special users of the system by selecting the checkbox 3052.

Figure 31:
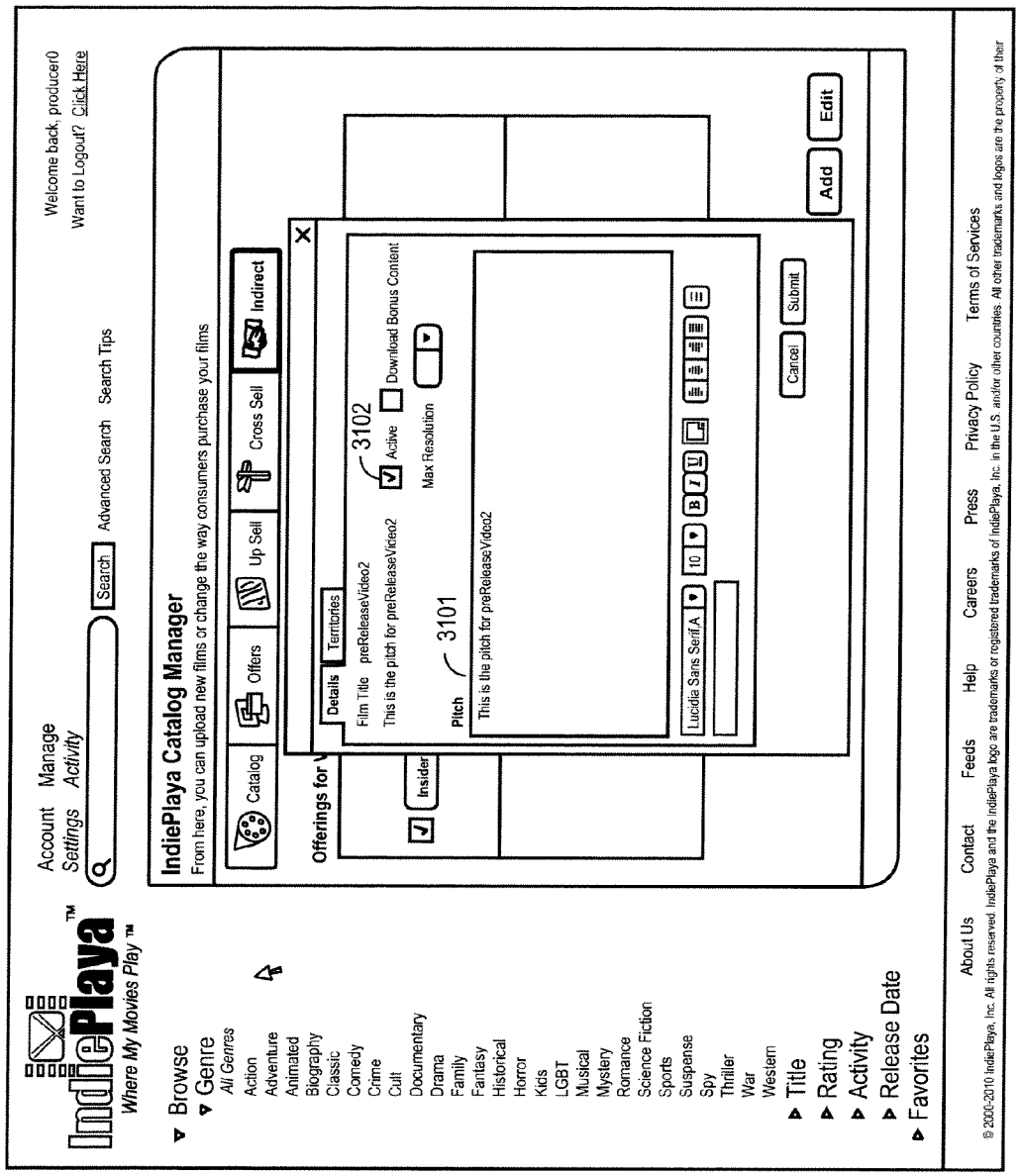
FIG. 31 shows an exemplary indirect interface for creating an insider offer.

FIG. 31 shows an exemplary indirect interface 3100 for creating an insider offer (e.g., a pitch licensing package). In some implementations, an insider offer (e.g., a license or permission to use the content for evaluation), can be dynamically created at any time (e.g., by a content creator) and offered as a licensing option (e.g., to a third party user such as an industry insider or to an influencer). In some implementations, interface 3100 can include one or more controls for defining an insider offer (e.g., a limited ability to promote content without the ability to sell the content). A content creator can create an insider offer for any content. Insider interface 3100 can include one or more areas for entering data corresponding to an insider offer. For example, insider interface 3100 can include pitch area 3101 for indicating one or more terms of a insider offer, and active control 3102 (e.g., for indicating whether the insider offer is active). Once submitted, the insider offer can be displayed.

Figure 32:
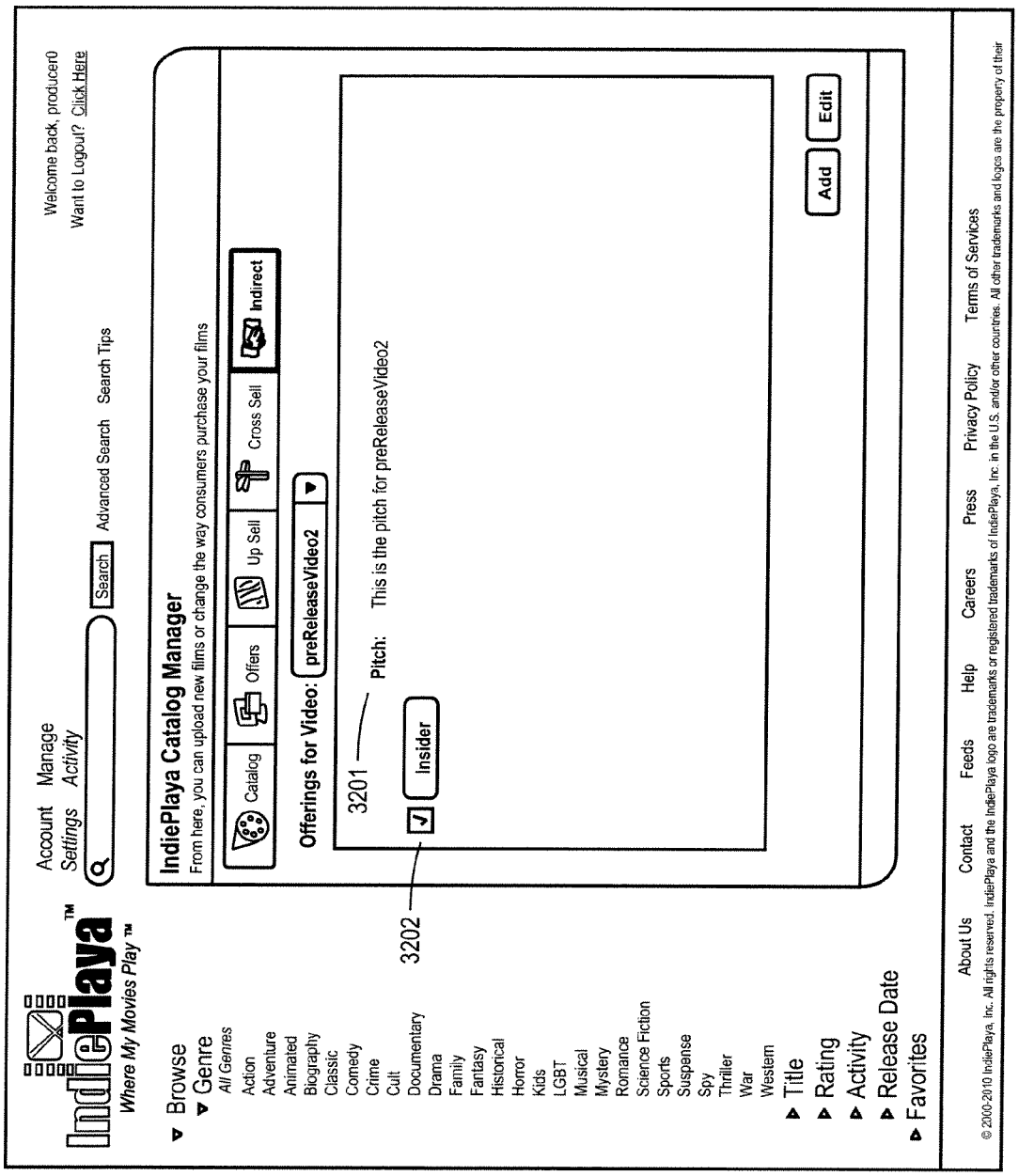
FIG. 32 shows an exemplary interface for use when interacting with one or more insider offers.

FIG. 32 shows an exemplary interface 3200 for use when interacting with one or more insider offers. As noted above, selecting the active control 3202 can cause the system to check the visual indication 3201 for the insider offer on interface 3200 (e.g., indicating that the insider offer is active). In some implementations, when a third party (e.g., an influencer, industry insider or promoter) indicates an interest in content (e.g., by selecting the content), the content creator can send the third-party an insider offer. In these implementations, the content creator can be notified of the third-party interest (e.g., by the system) or discover the third party interest by monitoring the system (e.g., by generating one or more reports).

In some implementations, an insider interest functionality allows the third-party to limit the number of insider offers they receive (e.g., offers or pitches are only sent when interest is expressly indicated). Additionally, content creators are able to monitor insider interest. For example, when an insider indicates interest in content, the content creator can run a report to see whether additional different insider interest exists. If the report is indicative of additional different insider interest, then the content creator can choose to negotiate with the third-party. If the report is indicative of no additional insider interest, then the content creator can choose to accept an insider offer without further negotiation.

In some implementations, the insider offer can also include the minimum terms that the content provider would agree to or could include terms on which the content provider would like to begin negotiations. Furthermore, in some implementations, the content provider can use the insider offer as a primary means of contact rather than the contact details described in FIGS. 30A and 30B. In other words, the content provider may determine that they want to remain anonymous to third parties on the system except in the case where they have shown an interest in a specific item displayed on the system.

Figure 33:
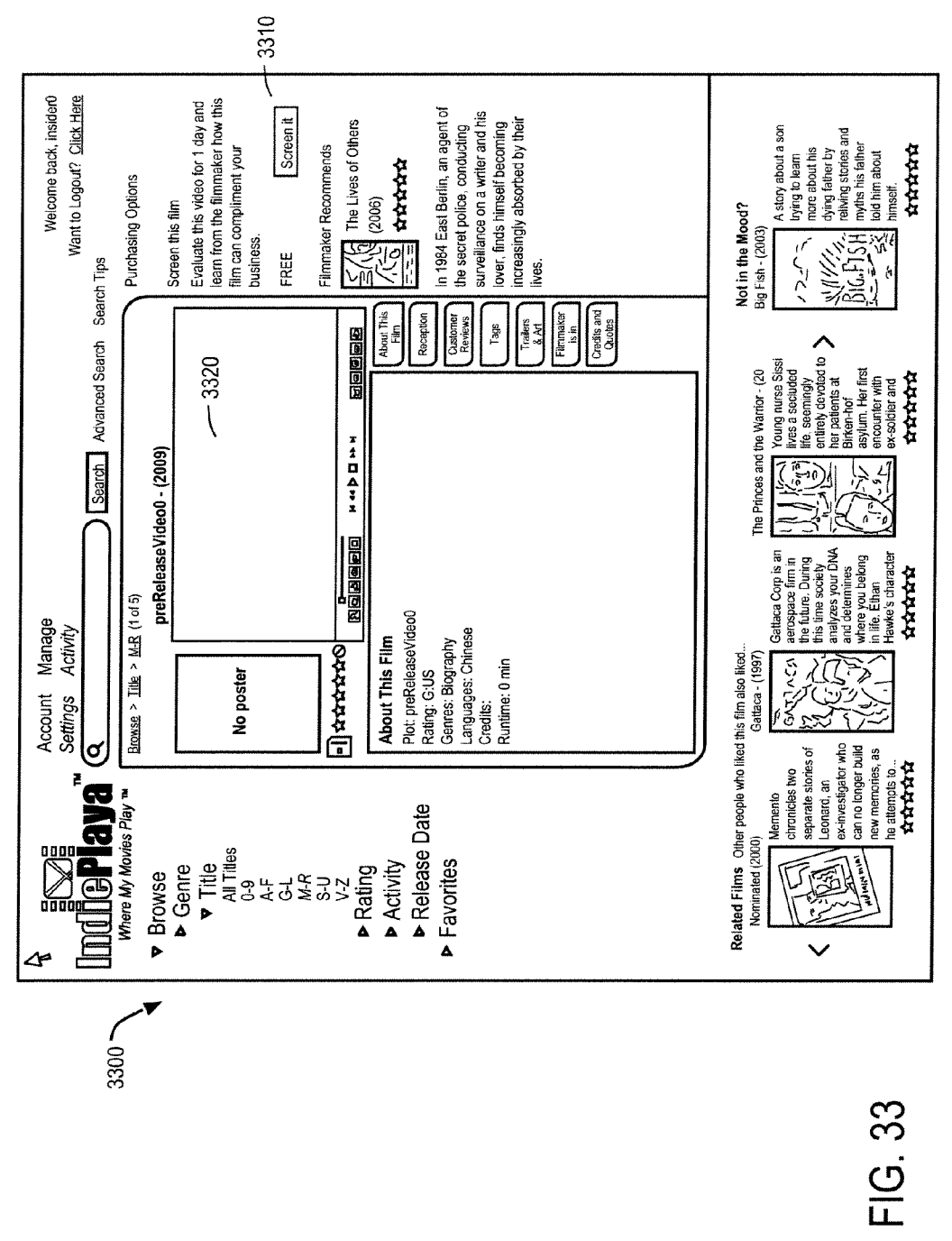

FIG. 33 shows an exemplary interface 3300 for use by an industry insider. Using a selection button 3310, an industry insider can indicate interest in licensing an item on the system. In the case of digital content (e.g., videos, music, games, electronic books, etc.) the industry insider can view or consume the content using a player control 3320

Figure 34A:
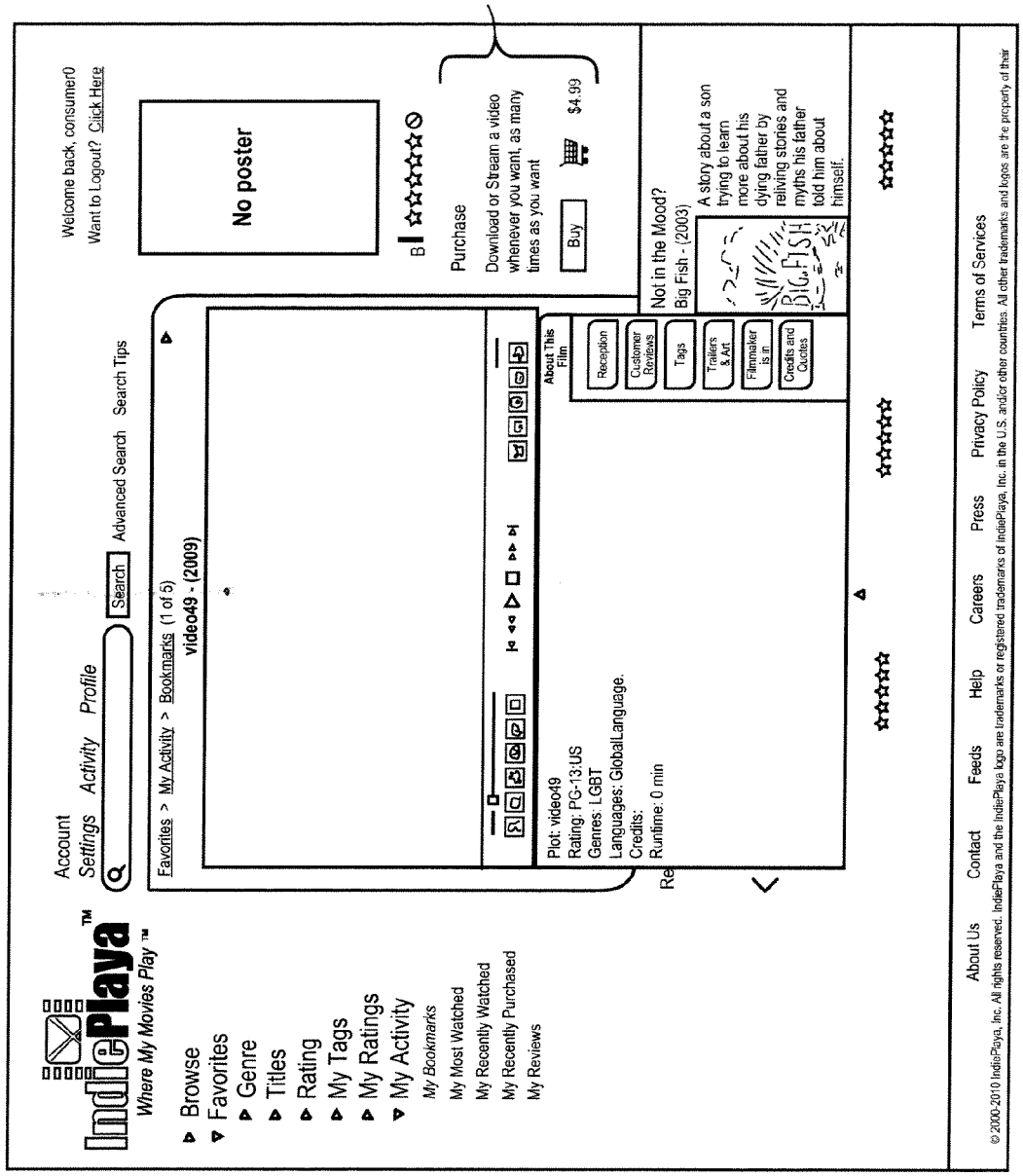
FIG. 34A shows an exemplary interface for use by a user when interacting with an item once an insider offer has been activated on the system.

FIG. 34A shows an exemplary interface 3400 for use by a user (e.g., a user belonging to an association) when interacting with an item once an insider offer has been activated on the system. In implementations where the proposal contains a pricing provision, the user can be shown a monetary transaction option for the item in accordance with the activated proposal. In these implementations, the user can select the item with the selection control 3401 and initiate a monetary transaction. In some implementations, the selection control 3401 would have a price that is lower than a price that would be available to users not belonging to the association. In some implementations, the selection control 3401 would have a price that is the same for all users, but where the user has a social incentive to make the retail purchase of the content. In such implementations, the association may receive a benefit from the purchase of an item (e.g., $0.25 from every sale goes to a particular charity).

Figure 34B:
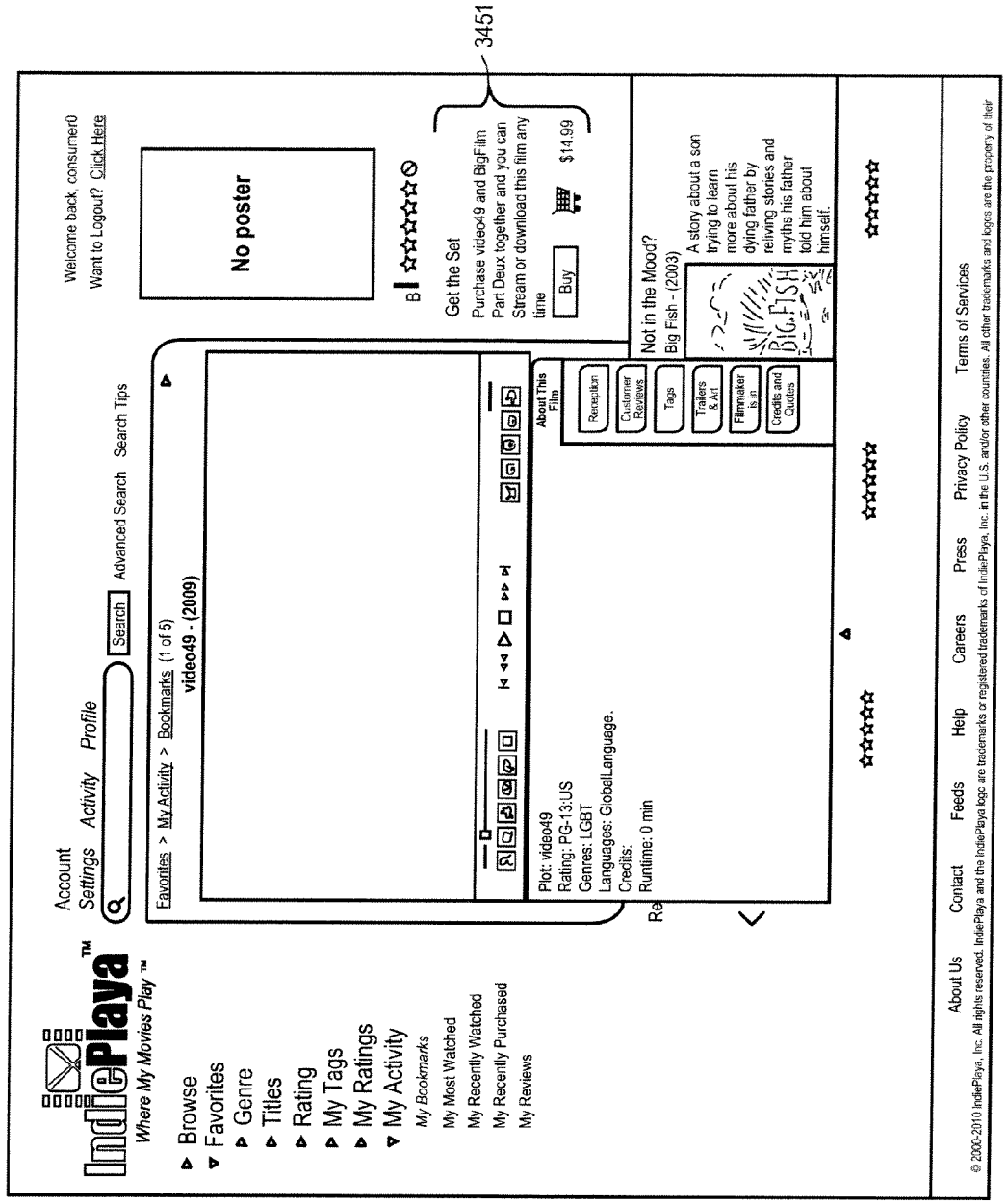
FIG. 34B shows an exemplary interface for use by a user when interacting with an item once an insider offer has been activated on the system.

FIG. 34B shows an exemplary interface 3450 for use by a user when interacting with an item once an insider offer has been activated on the system. In some implementations, where the proposal contains no pricing provision or where the pricing terms are identical to terms available to all users, the user can be shown a monetary transaction option for the item that is bundled with another item. In these implementations, the user can select the item with the selection control 3451 and initiate a monetary transaction. In some implementations, the insider could be a first provider of content (e.g., the filmmaker or musician that uploaded the content to the system or a distributor holding rights to the content). In such implementations, the insider could bundle their first content item with a second content item (e.g., content provided by a second provider of content on the system) in order to provide a value-add to users who might otherwise conduct a monetary transaction involving the second content item, but not the first content item. In these implementations, the insider (the first provider of content) may not be getting any additional revenue from the second content item, but both the first content item and the second content item benefit from increased conversions (e.g., where the user would purchase both items of content as part of a bundle). In some implementations, the insider may be able to obtain special pricing, which is then used to offer a special price to members of the association who purchase a first and second content item together. In some implementations, the insider may be able to obtain special pricing that allows the insider to subdistribute (e.g., re-sell, re-license, offer as part of a subscription service, etc.) content from a second content provider for a profit.

FIGS. 35-39 show exemplary interfaces for interacting with the content management system to allow one user to assign certain content management rights to other users. The ability of one user to assign rights to another user is useful because it can enable or facilitate incentives for multiple users to promote content. For example, by using these interfaces, two filmmakers could collaborate in order to bundle sales to a segment of their respective audiences that may be common to both of them rather than divide sales by competing for the same entertainment dollars from a common audience. As another example, a recording artist could delegate responsibility for the sale of their album to a music distributor, who may then take over all aspects of packaging, promotion and sale of their album in a particular territory, while at the same time allowing the recording artist to concentrate their efforts on selling their album in territories where rights have not been assigned.

Figure 35:
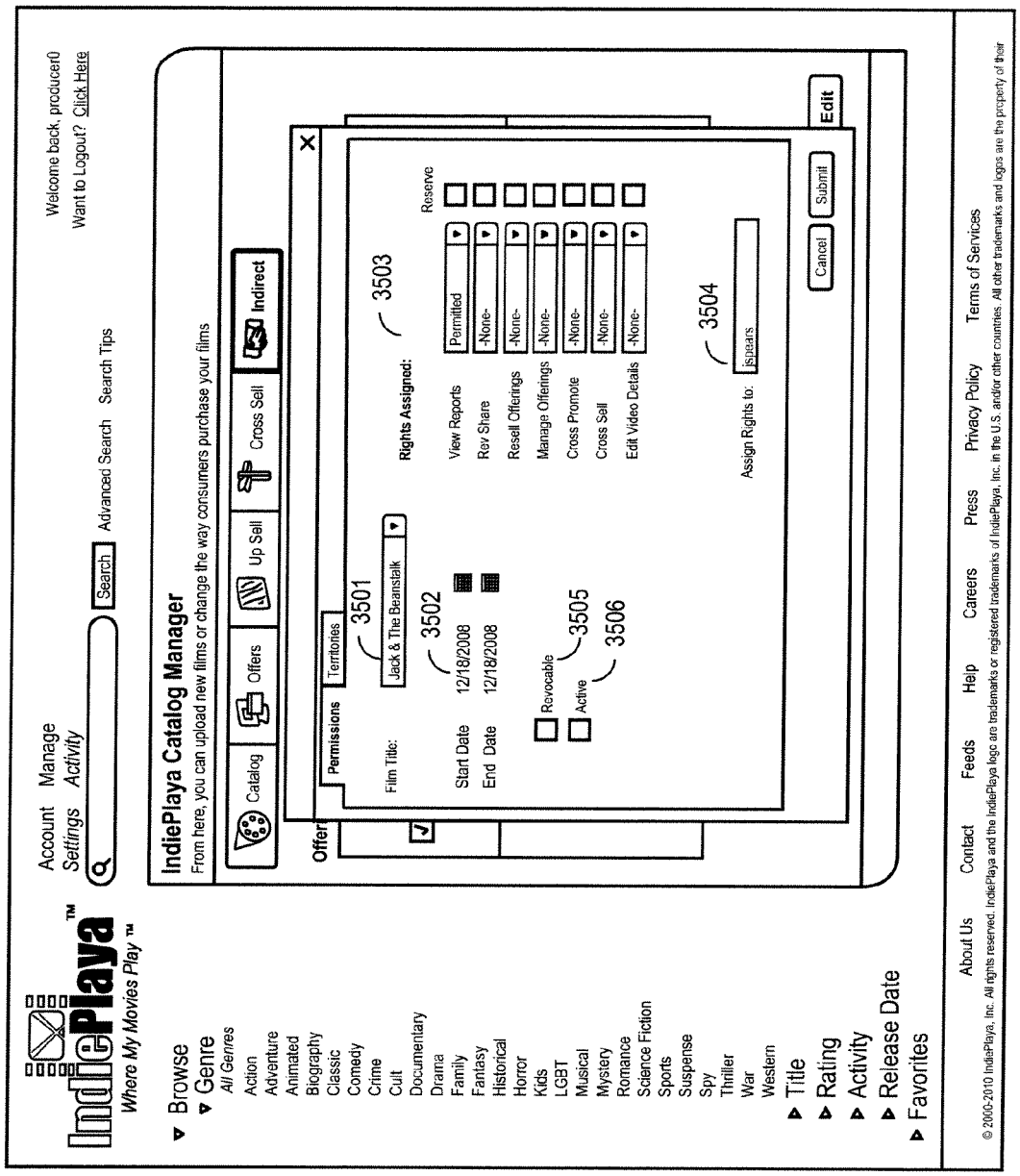
FIG. 35 shows an exemplary permissions interface enabling a first user of the system to assign permissions for a second user of the system to view reports and metrics about a particular content item.

FIG. 35 shows an exemplary permissions interface 3500 enabling a first user of the system to assign permissions for a second user of the system to view reports and metrics about a particular content item. In some implementations, the interface 3500 can include one or more controls for defining a set of permissions for a particular content item that are assigned to a particular user. For example, a permissions interface 3500 can include a control that specifies the title of a film 3501, which allows the first user to select the specific film for which the permission applies. A permissions interface 3500 can include a control that specifies a time period 3502. By setting a time period, the first user can specify a period of time during which this permissions is "active". The permissions interface 3500 can include one or more controls for selecting assignable permissions 3503. The controls for selecting assignable permissions 3503 can be have options to permit a user to view reports about content. In these examples, the second user would be permitted to view business metrics and business intelligence related to the content.

In some implementations, the controls for selecting assignable permissions 3503 can be built to allow very granular controls. For example, permissions can be: (a) "Permitted", meaning that the second user has the ability to perform the action and may share this permissions with other users of the system; (b) "Exclusive", meaning that the second user has the ability to perform the action while no other users of the system will also have the permission; or (c) "None", meaning that the second user does not have this permission. In some implementations, when a permission is granted as "Exclusive", the first user can "Reserve" the right for themselves so that the second and first users share the permission, but no other users on the system can share it.

In some implementations, the controls for selecting assignable permissions 3503 can be additive. When the controls for selecting assignable permissions 3503 are additive, users who had a permission assigned in non-exclusive manner can keep their permissions if the first user later assigns an exclusive privilege. In other implementations, the controls for selecting assignable permissions can be loosely non-additive or strictly non-additive. Loosely non-additive controls means that when the first user assigns a permission exclusively, those users who previously had a non-exclusive permissions would have their permissions revoked. Strictly non-additive controls means that when the first user attempts to assign a permission exclusively, the system will revoke non-exclusively assigned permissions that would otherwise be shared with the second user's permission and will produce an error if the first user attempts to assign a permission exclusively when a conflicting non-revocable permission exists.

The permissions interface 3500 can also include a control to assign the permission to a second user 3504. The permissions interface 3500 can also include a control to allow the permission to be revocable 3505. A control to allow a permission to be revocable means that if the first user chooses, the first user can remove or otherwise disable the ability of the second user to perform the actions assigned by the current permission. The permissions interface 3500 can also include a control to make the permission active or inactive 3506. In such implementations, the permission is not active until the control to make the permission active or inactive 3506 has been activated. Likewise, if the permission is revocable, the first user can revoke the permission by deactivating the control to make the permission active or inactive 3506.

Figure 36:
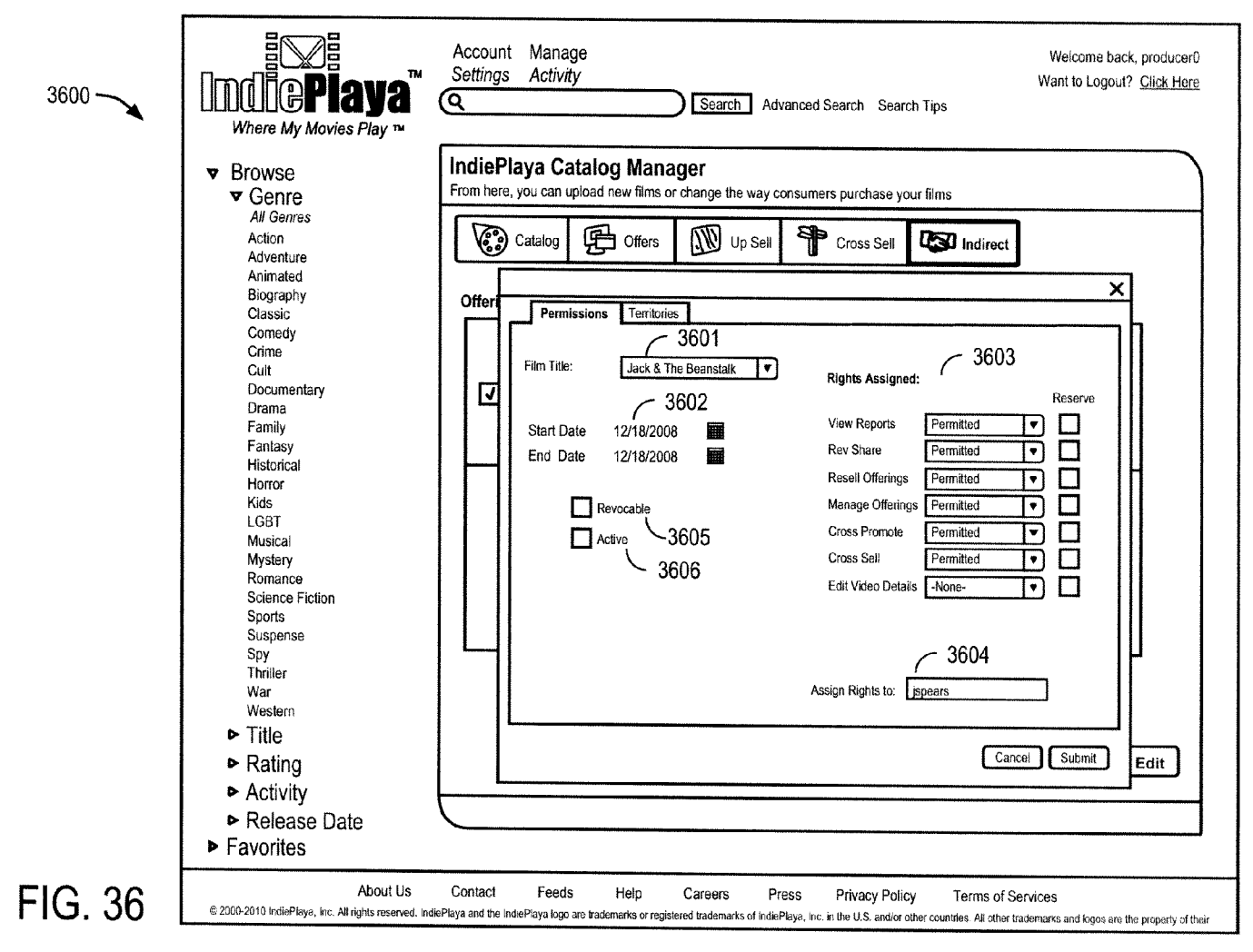

FIG. 36 shows an exemplary permissions interface 3600 enabling a first user of the system to assign permissions for a second user of the system to perform a broad set of transactional and promotion activities for a particular content item. In some implementations, the interface 3600 can include one or more controls for defining a set of permissions for a particular content item that are assigned to a particular user. For example, a permissions interface 3600 can include a control that specifies the title of a film 3601, which allows the first user to select the specific film for which the permission applies. A permissions interface 3600 can include a control that specifies a time period 3602. The permissions interface 3600 can include one or more controls for selecting assignable permissions 3603. The controls for selecting assignable permissions 3603 can be configured to allow the first user to assign rights to view reports, perform revenue share, resell existing offerings, manage the set of offerings for the content, cross-promote and cross-sell the particular content item. The permissions interface 3600 can have additional controls to assign the rights to a second user of the system 3604, allow the permission to be revocable 3605 or to make the permission active or inactive 3606.

Figure 37:
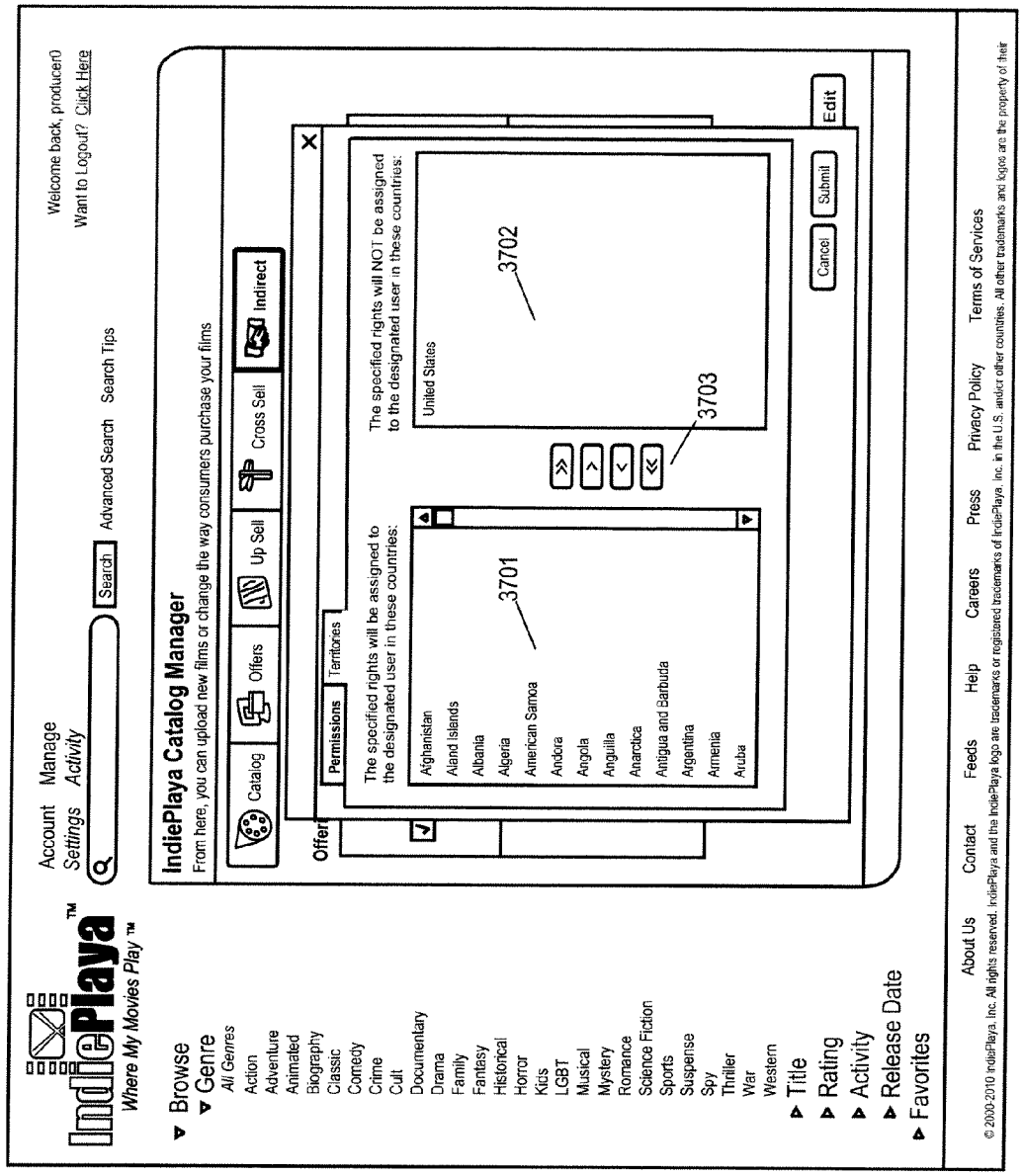
FIG. 37 shows an exemplary permissions interface for enabling a first user of the system to limit permissions delegated to a second user to be limited to a particular territory.

FIG. 37 shows an exemplary permissions interface 3700 for enabling a first user of the system to limit permissions delegated to a second user to be limited to a particular territory. For example, a video game creator may wish to assign a permission to promote a particular video game to a video game distributor, but would only assign the promotion rights for a particular set of countries in the world. In some implementations, the permissions interface 3700 would contain a list of permitted countries 3701, which lists the countries for which the permissions are assigned to the second user. In some implementations, the permissions interface 3700 would contain a list of excluded countries 3702 where the permissions are not assigned to the second user (e.g., where they are reserved by the first user or have been assigned to another user). In some implementations, the permissions interface 3700 would have a control that allows the first user to select territories for which the permissions are either assigned or not assigned to the second user.

Figure 38:
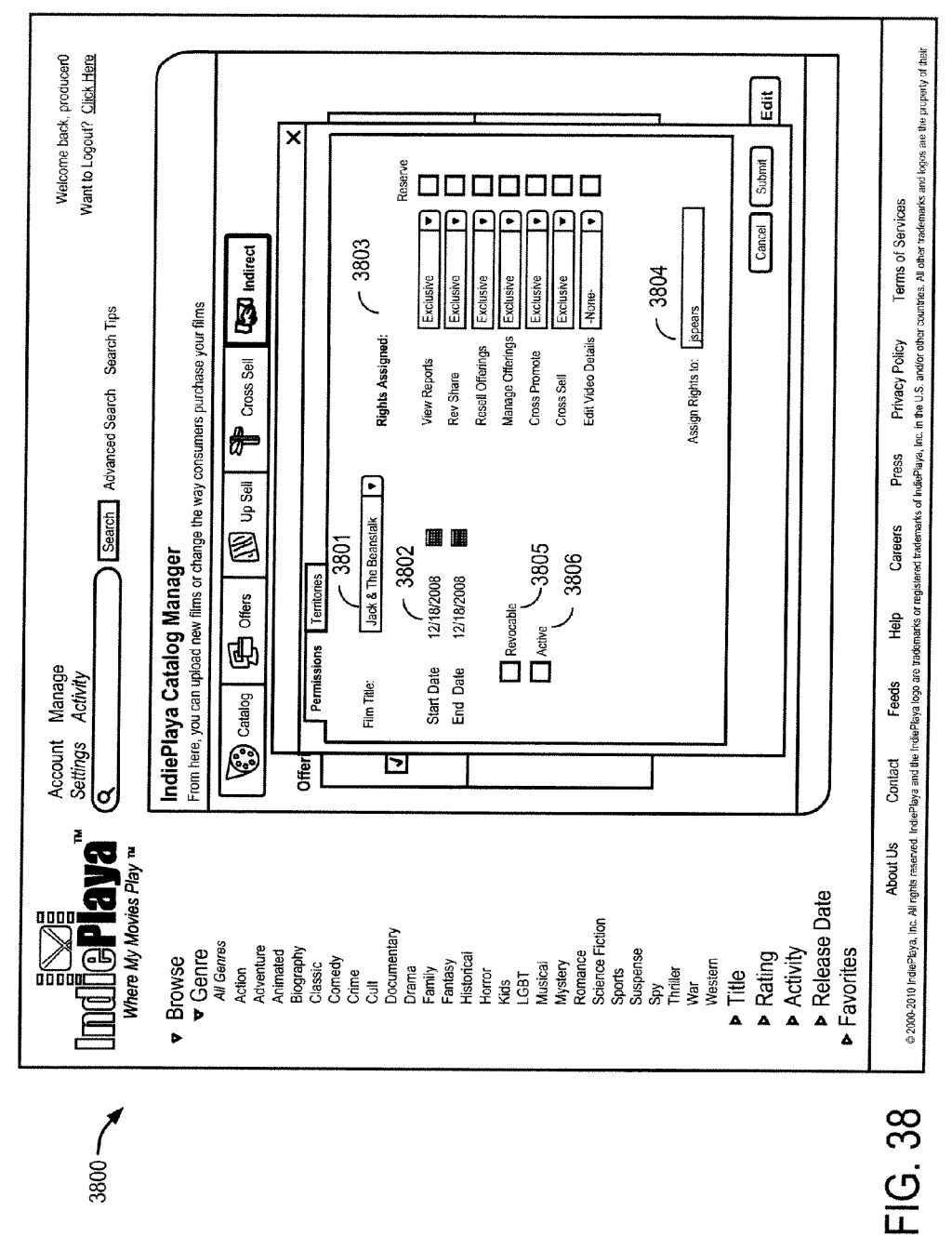

FIG. 38 shows an exemplary permissions interface 3800 enabling a first user of the system to assign exclusive permissions for a second user of the system to perform a broad set of transactional and promotion activities for a particular content item, meaning that once assigned, the second user will be the only user on the system who is permitted to perform the actions at the exclusion of all other users on the system (including the first user). In some implementations, the interface 3800 can include one or more controls for defining a set of permissions for a particular content item that are assigned to a particular user. For example, a permissions interface 3800 can include a control that specifies the title of a film 3801, which allows the first user to select the specific film for which the permission applies. A permissions interface 3800 can include a control that specifies a time period 3802. The permissions interface 3800 can include one or more controls for selecting assignable permissions 3803. The controls for selecting assignable permissions 3803 can be configured to allow the first user to assign exclusive rights to view reports, perform revenue share, resell existing offerings, manage the set of offerings for the content, cross-promote and cross-sell the particular content item. The permissions interface 3800 can have additional controls to assign the rights to a second user of the system 3804, allow the permission to be revocable 3805 or to make the permission active or inactive 3806.

Figure 39:
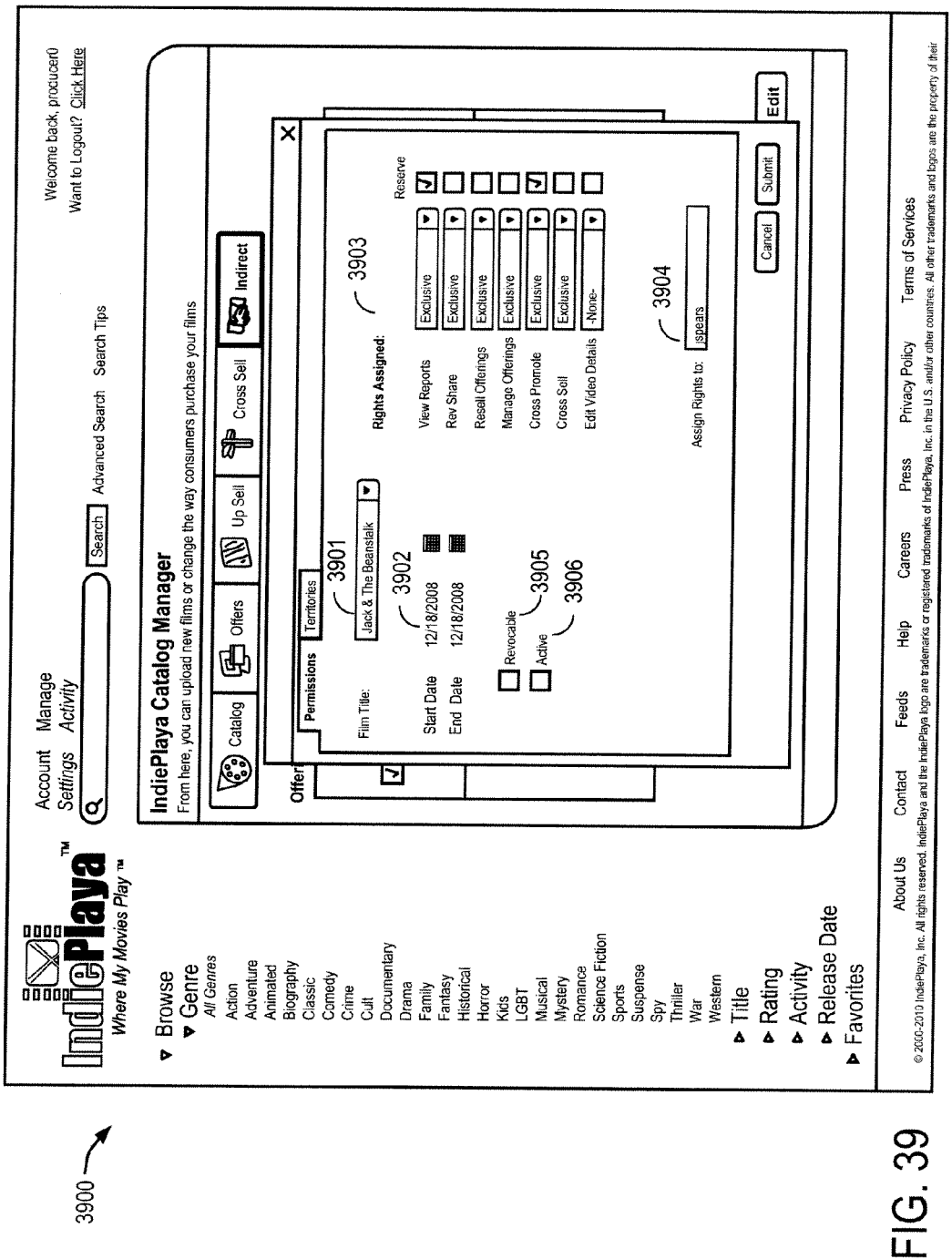
FIG. 39 shows an exemplary permissions interface enabling a first user of the system to assign a combination of exclusive permissions and exclusive reserved permissions for a second user of the system to perform a broad set of transactional and promotion activities for a particular content item.

FIG. 39 shows an exemplary permissions interface 3900 enabling a first user of the system to assign a combination of exclusive permissions and exclusive reserved permissions for a second user of the system to perform a broad set of transactional and promotion activities for a particular content item. Exclusive reserved permissions means that both the first user and second user will share the ability to perform the some actions on the system, while all other users of the system will be unable to perform the same action. As described for FIG. 38, exclusively assigned permissions means that the second user will be the only user on the system able to perform a particular action at the exclusion of all other users (including the first user). In some implementations, the interface 3900 can include one or more controls for defining a set of permissions for a particular content item that are assigned to a particular user. For example, a permissions interface 3900 can include a control that specifies the title of a film 3901, which allows the first user to select the specific film for which the permission applies. A permissions interface 3900 can include a control that specifies a time period 3902. The permissions interface 3900 can include one or more controls for selecting assignable permissions 3903. The controls for selecting assignable permissions 3903 can be configured to allow the first user to assign rights to view reports, perform revenue share, resell existing offerings, manage the set of offerings for the content, cross-promote and cross-sell the particular content item while reserving rights to view reports and cross-promote the particular content item. The permissions interface 3900 can have additional controls to assign the rights to a second user of the system 3904, allow the permission to be revocable 3905, or to make the permission active or inactive 3906.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products (i.e., one or more modules of computer program instructions encoded on a computer-readable medium for execution by, or to control the operation of, data processing apparatus).

The computer-readable medium can be a machine-readable storage device, a machine-readable storage substrate, a memory device, a composition of matter effecting a machine-readable propagated signal, or combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a database management system, an operating system, or combination of one or more of them). A propagated signal is an artificially-generated signal (e.g., a machine-generated electrical, optical, or electromagnetic signal) that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one or more computers located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, or a Global Positioning System ("GPS") receiver, to name just a few. Computer-readable media suitable for storing computer program instructions and data include all forms of nonvolatile memory, media, and memory devices, including by way of example semiconductor memory devices (e.g., EPROM, EEPROM, flash memory devices); magnetic disks (e.g., internal hard disks or removable disks; magneto optical disks); and CD ROM and DVD ROM disks. The processor and the memory can be supplemented by, or incorporated in, special purpose logic circuitry.

To provide for interaction with a user, embodiments of the subject matter described in this specification can be implemented on a computer having a display device (e.g., a CRT [cathode ray tube] or LCD [liquid crystal display] monitor) for displaying information to the user, and a keyboard and pointing device (e.g., a mouse or a trackball) with which the user can provide input to the computer. Other types of devices can be used to provide for interaction with a user as well—for example, feedback provided to the user can be any form of sensory feedback (e.g., visual feedback, auditory feedback, or tactile feedback); and input from the user can be received in any form, including acoustic, speech, or tactile input.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN") such as the Internet.

The computing system can include clients and servers. A client and server are generally remote from each other and typically interact through a communication network. The relationship of client and server arises by virtue of computer programs running on the respective computers and having a client-server relationship with each other.

In some implementations, an insider can be any third-party who exhibits an interest in one or more of the following: processing, marketing, promotion, management, packaging, merchandising, fulfillment, delivery, distribution, licensing, or enforcement of content and/or content-related data. In some implementations, an insider can be considered a content provider. A content provider is anyone who exhibits an interest in distributing, licensing, and/or sub-licensing content and/or content-related data. A content provider can include, but is not limited to, a distributor, a sub-distributor, and a licensee of content and/or content-related data. In some implementations, a content provider can perform any and all functions associated with the systems and methods provided herein. It should be understood that any and all functions performed by a content creator can also be performed by a content provider.

While this specification contains many specifics, these should not be construed as exhaustive of the invention's various implementations or as limitations on the scope of the invention or of what may be claimed, but rather as descriptions of features specific to particular embodiments of the invention. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, while particular embodiments of the invention have been described, other embodiments are within the scope of the following claims. For example, the actions recited in the claims can be performed in a different order and still achieve desirable results.

It is claimed:

1. A computer-implemented method of identifying an influencer from a pool of people based on past interactions with one or more items, comprising:
   determining a popularity metric for a particular item;
   determining an earliness of interaction metric for a person in the pool based on an interaction with the particular item by the person;
   calculating a prescience metric for the person based on the popularity metric and the earliness of interaction metric for the person, wherein the prescience metric is calculated according to:

$$U_{Prescience} = (P_{After}/P_{Total}) * (S_{Item}/S_{Pool})$$

where $U_{Prescience}$ is the prescience metric for the person, $P_{After}$ is a number of interactions with the particular item after the interaction with the particular item by the person, $P_{Total}$ is a total number of interactions with the particular item, $S_{Item}$ is a number of sales of the item, and $S_{Pool}$ is a number of sales of items in a pool of items; and
   identifying the influencer based on the prescience metric for the person and prescience metrics calculated for other people in the pool.

2. The method of claim 1, wherein the earliness of interaction metric is determined based on a time of interaction with the particular item for the person and times of interactions for other people in the pool.

3. The method of claim 1, wherein the earliness of interaction metric is determined based on a total number of interactions with the particular item and a number of interactions with the particular item subsequent to the interaction with the particular item by the person.

4. The method of claim 1, wherein the interaction with the particular item involves purchasing the item, liking or otherwise showing approval for the item, clicking on a link associated with the item, giving a rating of the item, providing feedback regarding the item, concurring with the interaction of another user for the item, or using the item.

5. The method of claim 1, wherein the interaction with the particular item involves disliking or otherwise showing disapproval of the item, removing an item from a page, disabling or otherwise disregarding the item, or reporting the item as inappropriate.

6. The method of claim 1, wherein the item is a digital good, a physical good, or a service.

7. The method of claim 6, wherein the digital good contains a video component, an audio component, a text component, or a game component.

8. The method of claim 1, wherein the pool of people comprises an association of people.

9. The method of claim 8, wherein the association is a target association to whom a second item is introduced.

10. The method of claim 9, wherein the second item is introduced to the influencer before the second item is introduced to other people in the target association.

11. The method of claim 10, wherein the influencer is provided the second item to facilitate introducing of the second item by the influencer.

12. The method of claim 10, wherein the influencer is provided an incentive to introduce the second item to other people in the target association.

13. A computer-implemented system for identifying an influencer from a pool of people based on past interactions with one or more items, comprising:
   one or more data processors;
   a non-transitory computer-readable medium encoded with instructions for commanding the data processor to execute steps that include:
      determining a popularity metric for a particular item;
      determining an earliness of interaction metric for a person in the pool based on an interaction with the particular item by the person;
      calculating a prescience metric for the person based on the popularity metric and the earliness of interaction metric for the person, wherein the prescience metric is calculated according to:

$$U_{Prescience} = (P_{After}/P_{Total}) * (S_{Item}/S_{Pool})$$

where $U_{Prescience}$ is the prescience metric for the person, $P_{After}$ is a number of interactions with the particular item after the interaction with the particular item by the person, $P_{Total}$ is a total number of interactions with the particular item, $S_{Item}$ is a number of sales of the item, and $S_{Pool}$ is a number of sales of items in a pool of items; and
      identifying the influencer based on the prescience metric for the person and prescience metrics calculated for other people in the pool.

14. A non-transitory computer-readable medium encoded with instructions for commanding one or more data processors to execute a method of identifying an influencer from a pool of people based on past interactions with one or more items, the method comprising:
   determining a popularity metric for a particular item;
   determining an earliness of interaction metric for a person in the pool based on an interaction with the particular item by the person;
   calculating a prescience metric for the person based on the popularity metric and the earliness of interaction metric for the person, wherein the prescience metric is calculated according to:

$$U_{Prescience} = (P_{After}/P_{Total}) * (S_{Item}/S_{Pool})$$

wherein $U_{Prescience}$ is the prescience metric for the person, $P_{After}$ is a number of interactions with the particular item after the interaction with the particular item by the person, $P_{Total}$ is a total number of interactions with the particular item, $S_{Item}$ is a number of sales of the item, and $S_{Pool}$ is a number of sales of items in a pool of items; and
   identifying the influencer based on the prescience metric for the person and prescience metrics calculated for other people in the pool.

* * * * *